US011184121B2

(12) United States Patent
Iyer et al.

(10) Patent No.: US 11,184,121 B2
(45) Date of Patent: *Nov. 23, 2021

(54) PHYSICAL CHANNELS IN NEW RADIO

(71) Applicant: Convida Wireless, LLC, Wilmington, DE (US)

(72) Inventors: Lakshmi R. Iyer, King of Prussia, PA (US); Allan Y. Tsai, Boonton, NJ (US); Tianyi Xu, San Jose, CA (US); Guodong Zhang, Woodbury, NY (US); Pascal M. Adjakple, Great Neck, NY (US); Qing Li, Princeton Junction, NJ (US); Wei Chen, San Diego, CA (US); Qian Zhang, Basking Ridge, NJ (US); Joseph M. Murray, Schwenksville, PA (US)

(73) Assignee: Convida Wireless, LLC, Wilmington, DE (US)

( * ) Notice: Subject to any disclaimer, the term of this patent is extended or adjusted under 35 U.S.C. 154(b) by 190 days.

This patent is subject to a terminal disclaimer.

(21) Appl. No.: 16/547,047

(22) Filed: Aug. 21, 2019

(65) Prior Publication Data

US 2020/0028632 A1    Jan. 23, 2020

Related U.S. Application Data

(63) Continuation of application No. 15/492,779, filed on Apr. 20, 2017, now Pat. No. 10,432,362.

(Continued)

(51) Int. Cl.
*H04L 1/18* (2006.01)
*H04L 1/16* (2006.01)
*H04W 72/04* (2009.01)

(52) U.S. Cl.
CPC .......... *H04L 1/1861* (2013.01); *H04L 1/1614* (2013.01); *H04L 1/1816* (2013.01); *H04W 72/042* (2013.01)

(58) Field of Classification Search
CPC ... H04L 1/1861; H04L 1/1614; H04L 1/1816; H04L 1/1819; H04L 1/1864; H04L 1/1621
See application file for complete search history.

(56) References Cited

U.S. PATENT DOCUMENTS 8,902,773 B2    12/2014    Anderson et al.
9,002,979 B2    4/2015    Hansen
(Continued)

FOREIGN PATENT DOCUMENTS

CN    101622891 A    1/2010
CN    101690271 A    3/2010
(Continued)

OTHER PUBLICATIONS

3rd Generation Partnership Project; (3GPP) TR 22.891 V1.1.0, 3rd Generation Partnership Project; Technical Specification Group Services and System Aspects; Feasibility Study on New Services and Markets Technology Enablers; Stage 1 (Release 14), Nov. 2015, 95 pages.

(Continued)

*Primary Examiner* — Diane L Lo
*Assistant Examiner* — Abusayeed M Haque
(74) *Attorney, Agent, or Firm* — BakerHostetler

(57) ABSTRACT

Hybrid automatic repeat request (HARQ) processes, indicators, and similar methods may be used improve new radio performance in a number of ways. For example HARQ processes may be retransmitted, even before a response is expected, a number of times. Separate acknowledgement may be provided for various code blocks within a single (Continued)

transport block. Multi-bit ACK/NACK signaling may be used to efficiently express the status of individual code blocks or groups of code blocks within a transmission block. Grantless transmissions may be acknowledged implicitly, e.g., via responses comprising downlink control information or sent via a physical hybrid automatic repeat request indicator channel.

16 Claims, 50 Drawing Sheets

Related U.S. Application Data

(60) Provisional application No. 62/325,335, filed on Apr. 20, 2016, provisional application No. 62/399,921, filed on Sep. 26, 2016.

(56) References Cited

U.S. PATENT DOCUMENTS

| | | |
|---|---|---|
| 9,198,181 B2 | 11/2015 | Blankenship et al. |
| 9,276,710 B2 | 3/2016 | Damnjanovic et al. |
| 9,338,700 B2 | 5/2016 | Schulist et al. |
| 9,413,451 B2 | 8/2016 | Park et al. |
| 9,559,797 B2 | 1/2017 | Liao et al. |
| 10,028,302 B2 | 7/2018 | Au et al. |
| 10,306,671 B2 | 5/2019 | Li et al. |
| 2007/0042784 A1 | 2/2007 | Anderson |
| 2008/0205351 A1 | 8/2008 | Lindoff et al. |
| 2009/0047902 A1 | 2/2009 | Nory et al. |
| 2009/0298497 A1 | 12/2009 | Lee |
| 2009/0323607 A1 | 12/2009 | Park et al. |
| 2010/0027466 A1 | 2/2010 | Mustapha |
| 2010/0035611 A1 | 2/2010 | Montojo et al. |
| 2010/0061361 A1 | 3/2010 | Wu |
| 2010/0227611 A1 | 9/2010 | Schmidt et al. |
| 2011/0077013 A1 | 3/2011 | Cho et al. |
| 2011/0222428 A1 | 9/2011 | Charbit et al. |
| 2011/0242997 A1 | 10/2011 | Yin |
| 2012/0009963 A1 | 1/2012 | Kim et al. |
| 2012/0127934 A1 | 5/2012 | Anderson et al. |
| 2012/0163335 A1 | 6/2012 | Chung et al. |
| 2012/0238264 A1 | 9/2012 | Jindal |
| 2013/0017833 A1 | 1/2013 | Sakamoto et al. |
| 2013/0034071 A1 | 2/2013 | Lee et al. |
| 2013/0077574 A1 | 3/2013 | Chandrasekhar et al. |
| 2013/0155847 A1 | 6/2013 | Li et al. |
| 2013/0188503 A1 | 7/2013 | Anepu et al. |
| 2013/0225184 A1 | 8/2013 | Liu et al. |
| 2013/0265932 A1 | 10/2013 | Huang et al. |
| 2014/0036806 A1 | 2/2014 | Chen et al. |
| 2014/0086217 A1 | 3/2014 | Park et al. |
| 2014/0204854 A1 | 7/2014 | Freda et al. |
| 2014/0206854 A1 | 7/2014 | Bennett et al. |
| 2014/0223095 A1 | 8/2014 | Storm et al. |
| 2014/0254544 A1 | 9/2014 | Kar et al. |
| 2014/0293901 A1 | 10/2014 | Hegde |
| 2014/0293942 A1 | 10/2014 | Kang et al. |
| 2014/0315593 A1 | 10/2014 | Vrzic et al. |
| 2014/0321375 A1 | 10/2014 | Agiwal et al. |
| 2014/0369201 A1 | 12/2014 | Gupta et al. |
| 2015/0103725 A1 | 4/2015 | Sun et al. |
| 2015/0223279 A1 | 8/2015 | Jiao et al. |
| 2015/0234708 A1 | 8/2015 | Storm et al. |
| 2015/0282130 A1 | 10/2015 | Webb et al. |
| 2015/0326484 A1 | 11/2015 | Cao et al. |
| 2015/0327245 A1 | 11/2015 | Zhu et al. |
| 2015/0382262 A1 | 12/2015 | Cho et al. |
| 2016/0020877 A1 | 1/2016 | Koutsimanis et al. |
| 2016/0036578 A1 | 2/2016 | Malladi et al. |
| 2016/0073302 A1 | 3/2016 | Yang et al. |
| 2016/0100395 A1 | 4/2016 | Xu et al. |
| 2016/0113039 A1 | 4/2016 | Hole et al. |
| 2016/0135153 A1 | 5/2016 | Suzuki et al. |
| 2016/0156397 A1 | 6/2016 | Onggosanusi et al. |
| 2016/0234736 A1 | 8/2016 | Kubota et al. |
| 2016/0234759 A1 | 8/2016 | Kubota et al. |
| 2016/0249269 A1 | 8/2016 | Niu et al. |
| 2016/0253240 A1 | 9/2016 | Cocagne |
| 2016/0270102 A1 | 9/2016 | Zeng et al. |
| 2016/0352545 A1 | 12/2016 | Johnson |
| 2016/0353343 A1 | 12/2016 | Rahman et al. |
| 2017/0013598 A1 | 1/2017 | Jung et al. |
| 2017/0034845 A1 | 2/2017 | Liu et al. |
| 2017/0118054 A1 | 4/2017 | Ma et al. |
| 2017/0134913 A1 | 5/2017 | Cui et al. |
| 2017/0164212 A1 | 6/2017 | Opsenica et al. |
| 2017/0164349 A1 | 6/2017 | Zhu et al. |
| 2017/0201980 A1 | 7/2017 | Hakola et al. |
| 2017/0230985 A1 | 8/2017 | Yamada et al. |
| 2017/0273063 A1 | 9/2017 | Kim et al. |
| 2017/0289791 A1 | 10/2017 | Yoo et al. |
| 2017/0290052 A1 | 10/2017 | Zhang et al. |
| 2017/0331670 A1 | 11/2017 | Parkvall et al. |
| 2017/0331785 A1 | 11/2017 | Xu et al. |
| 2017/0359731 A1 | 12/2017 | Soldati et al. |
| 2017/0366311 A1 | 12/2017 | Iyer et al. |
| 2018/0034612 A1 | 2/2018 | Lin et al. |
| 2018/0076994 A1 | 3/2018 | Lee et al. |
| 2018/0123763 A1 | 5/2018 | Yu |
| 2018/0124598 A1 | 5/2018 | Zeng |
| 2018/0139656 A1 | 5/2018 | Xu et al. |
| 2018/0167938 A1 | 6/2018 | Stephenne et al. |
| 2018/0184415 A1 | 6/2018 | Rong et al. |
| 2018/0198504 A1 | 7/2018 | Li et al. |
| 2018/0199361 A1 | 7/2018 | Zhang et al. |
| 2018/0220407 A1 | 8/2018 | Xiong et al. |
| 2018/0242304 A1 | 8/2018 | Rong et al. |
| 2018/0270696 A1 | 9/2018 | Duan et al. |
| 2018/0287722 A1 | 10/2018 | Takano |
| 2018/0294860 A1 | 10/2018 | Hakola et al. |
| 2018/0332632 A1 | 11/2018 | Vikberg et al. |
| 2018/0338277 A1 | 11/2018 | Byun et al. |
| 2018/0343043 A1 | 11/2018 | Hakola et al. |
| 2018/0368018 A1 | 12/2018 | Kim et al. |
| 2019/0045340 A1 | 2/2019 | Zhu et al. |
| 2019/0045577 A1 | 2/2019 | Kim et al. |
| 2019/0159107 A1 | 5/2019 | Kim et al. |
| 2019/0182856 A1 | 6/2019 | Moroga et al. |
| 2019/0190579 A1 | 6/2019 | Wang et al. |
| 2019/0208474 A1 | 7/2019 | Ali et al. |
| 2019/0281623 A1 | 9/2019 | Andgart et al. |
| 2019/0288789 A1 | 9/2019 | Li et al. |
| 2020/0092065 A1 | 3/2020 | Kuang et al. |
| 2021/0037561 A1* | 2/2021 | Lyu ........................ H04W 4/40 |
| 2021/0044385 A1* | 2/2021 | Hosseini ........... H04W 72/1289 |
| 2021/0045125 A1* | 2/2021 | Mondal ............... H04L 27/2601 |
| 2021/0045181 A1* | 2/2021 | Li ......................... H04L 5/0005 |
| 2021/0051646 A1* | 2/2021 | Maaref ................. H04W 72/14 |
| 2021/0068138 A1* | 3/2021 | Baldemair ........ H04W 72/0413 |
| 2021/0105104 A1* | 4/2021 | Cao ........................ H04L 1/1893 |
| 2021/0105833 A1* | 4/2021 | Freda ................... H04W 74/004 |

FOREIGN PATENT DOCUMENTS

| | | |
|---|---|---|
| CN | 101917765 A | 12/2010 |
| CN | 102026270 A | 4/2011 |
| CN | 102045849 A | 5/2011 |
| CN | 102090126 A | 6/2011 |
| CN | 102474394 A | 5/2012 |
| CN | 102577294 A | 7/2012 |
| CN | 102726109 A | 10/2012 |
| CN | 103069739 A | 4/2013 |
| CN | 103560936 A | 2/2014 |
| CN | 103563462 A | 2/2014 |
| CN | 104205930 A | 12/2014 |
| CN | 104394558 A | 3/2015 |
| CN | 104753780 A | 7/2015 |
| CN | 104869583 A | 8/2015 |
| CN | 104936189 A | 9/2015 |
| CN | 105050189 A | 11/2015 |
| CN | 105162557 A | 12/2015 |
| CN | 105284172 A | 1/2016 |

(56) References Cited

FOREIGN PATENT DOCUMENTS

| | | |
|---|---|---|
| CN | 105323049 A | 2/2016 |
| CN | 105471487 A | 4/2016 |
| EP | 2464076 A2 | 6/2012 |
| EP | 2553860 A1 | 2/2013 |
| EP | 2710844 A1 | 3/2014 |
| EP | 2869478 A1 | 5/2015 |
| EP | 2882110 A1 | 6/2015 |
| EP | 3051906 A1 | 8/2016 |
| EP | 3082362 A1 | 10/2016 |
| EP | 3101971 A1 | 12/2016 |
| EP | 3420659 A1 | 1/2019 |
| JP | 2010-519838 A | 6/2010 |
| JP | 2016-504798 A | 2/2016 |
| JP | 2016-504851 A | 2/2016 |
| JP | 2016-514416 A | 5/2016 |
| JP | 2019-525616 A | 9/2019 |
| KR | 10-2015-0118874 A | 10/2015 |
| KR | 10-1563469 B1 | 10/2015 |
| WO | 2007/125910 A1 | 11/2007 |
| WO | 2010/001474 A1 | 1/2010 |
| WO | 2011/097904 A1 | 8/2011 |
| WO | 2011/123805 A1 | 10/2011 |
| WO | 2012/155326 A1 | 11/2012 |
| WO | 2014/090200 A1 | 6/2014 |
| WO | 2014/090208 | 6/2014 |
| WO | 2015/045658 A1 | 4/2015 |
| WO | 2015/067196 A1 | 5/2015 |
| WO | 2015/080646 A1 | 6/2015 |
| WO | 2015/084048 A1 | 6/2015 |
| WO | 2015/100533 A1 | 7/2015 |
| WO | 2015/113205 A1 | 8/2015 |
| WO | 2015/122737 A1 | 8/2015 |
| WO | 2015/141982 A1 | 9/2015 |
| WO | 2016/130353 A2 | 8/2016 |
| WO | 2017/147515 A1 | 8/2017 |
| WO | 2017/191833 A1 | 11/2017 |
| WO | 2017/195478 A1 | 11/2017 |
| WO | 2018/028602 A1 | 2/2018 |

OTHER PUBLICATIONS

3rd Generation Partnership Project; (3GPP) TR 23.799, "Technical Specification Group Services and System Aspects; Study on Architecture for Next Generation System (Release 14)", vol. SA WG2, No. V0.5.0, Jun. 8, 2016, pp. 1-179.

3rd Generation Partnership Project; (3GPP) TR 38.913 V0.2.0, 3rd Generation Partnership Project; Technical Specification Group Radio Access Network; Study on Scenarios and Requirements for Next Generation Access Technologies; (Release 14), Feb. 2016, 19 pages.

3rd Generation Partnership Project; (3GPP) TS 36.211 V13.1.0, 3rd Generation Partnership Project; Technical Specification Group Radio Access Network; Evolved Universal Terrestrial Radio Access (E-UTRA); Physical Channels and Modulation (Release 13), Mar. 2016, 155 pages.

3rd Generation Partnership Project; (3GPP) TS 36.304 V13.0.0, 3rd Generation Partnership Project; Technical Specification Group Radio Access Network; Evolved Universal Terrestrial Radio Access (E-UTRA); User Equipment (UE) Procedures in idle Mode (Release 13), Dec. 2015, 42 pages.

3rd Generation Partnership Project; (3GPP) TS 36.331 V13.0.0, Technical Specification Group Radio Access Network; Evolved Universal Terrestrial Radio Access (E-UTRA); Radio Resource Control (RRC); Protocol specification (Release 13), Dec. 2015, 507 pages.

3rd Generation Partnership Project; (3GPP) TSG-RAN WG1 #86bis, R1-1610177, "DL Control Channels Overview", Qualcomm Incorporated, Oct. 10-14, 2016, Lisbon, Portugal, Discussion, Oct. 1, 2016, 6 pages.

Budisin S. "Decimation Generator of Zadoff-Chu Sequences", In: Carlet C., Pott A. (eds) Sequences and Their Applications—SETA 2010. SETA 2010. Lecture Notes in Computer Science, vol. 6338. Springer, Berlin, Heidelberg, 2010, 40 pages.

Budisin, "Decimation Generator of Zadoff-Chu Sequences", C. Carlet and A. Pott (Eds.): SETA 2010, LNCS 6338, pp. 30-40, 2010.

Chu, David, "Polyphase Codes With Good Periodic Correlation Properties", IEEE Transactions on Information Theory, Jul. 1972, 531-532.

IEEE P802.11, Wireless LANs, Proposed TGax draft specification, Comment Resolutions on UL MU Operation, Jul. 25, 2016, 27 pages.

International Telecommunication Union (ITU-R), "IMT Vision—Framework and overall objectives of the future development of IMT for 2020 and beyond", Recommendation ITU-R M.2083-0, Sep. 2015, 21 pages.

NGMN 5G Initiative White Paper v1.0, Feb. 17, 2015, 125 pages.

Qualcomm Incorporated: "Frame structure requirements", 3GPP Draft; vol. RAN WG1, no. Nanjing, China; May 14, 2016.

Qualcomm, 3GPP R1-1612062, TSG-RAN WG1 #87, Control Channel for slot format indicator, Nov. 14-18, 2016 (Year: 2016).

Samsung: "Signaling of Slot Structure", 3GPP Draft; R1-1609127, 3rd Generation Partnership Project (3GPP), Mobile Compeience Centre; 650, Route Des Lucioles; F-06921 Sophia Anti Polis Ceo Ex ; France, RAN WG1, no. Lisbon, Portugal; 20161010-20161014 Sep. 30, 2016.

Sesia et al., "LTE—The UMTS Long Term Evolution", Chapter 9.3.3., LTE-The UMTS Long Term Evolution : from theory to Practice; Jul. 20, 2011, pp. 198-200.

3GPP TSG GERA1 Adhoc #3 GPC150521, Samsung Electronics, "Discussions of Grant-Free Multiple Access in CIoT (Update GPC150512)", Jul. 2015, 9 pages.

3rd Generation Partnership Project (3GPP) R2-162571 TSGRAN WG2 Meeting #93bis, Introduction of Virtual Cell, CATT, Dubrovnik, Croatia, Apr. 11-15, 2016, 3 pages.

3rd Generation Partnership Project (3GPP) RP-160301 TSG RAN Meeting #71, Motivation for new WI on Light Connection in LTE, Huawei, HiSilicon, Goteborg, Sweden, Mar. 7-11, 2016, 14 pages.

3rd Generation Partnership Project (3GPP) RP-160425 TSG RAN Meeting #71, Further enhancements on signaling reduction to enable light connection for LTE, Intel Corporation, Gothenburg, Sweden, Mar. 7-10, 2016, 7 pages.

3rd Generation Partnership Project (3GPP) RP-160540 TSG RAN Meeting #71, New WI proposal: Signalling reduction to enable light connection for LTE, Gothenburg, Sweden, Mar. 7-10, 2016, 7 pages.

3rd Generation Partnership Project (3GPP) RP-161214 TSG RAN Meeting #72, Revision of SI: Study on New Radio Access Technology, NTT DOCOMO, Busan, Korea, Jun. 13-16, 2016, 8 pages.

3rd Generation Partnership Project (3GPP) S1-152395 Revision of S1-152074, ZTE Corporation et al., "Update the network slicing use case in Smarter", ZTE Smarter Update the Network Slicing Use case REV3, vol. SA WG1, no. Belgrade Serbia, Aug. 24, 2015, 3 pages.

3rd Generation Partnership Project (3GPP) S1-161323 TSG-SA WG1 Meeting #74, Editorial cleanup and alignment of eMBB TR22.863, Venice, Italy, May 9-13, 2016, 4 pages.

3rd Generation Partnership Project (3GPP) S2-161198 SA WG2 Meeting #113AH, Solution for optimized UE sleep state and state transitions, Sophia Antipolis, France, Feb. 23-26, 2016, 3 pages.

3rd Generation Partnership Project (3GPP) S2-161324 SA WG2 Meeting #113, Solution to Key Issue on Mobility Framework, Sophia Antipolis, FR, Feb. 23-26, 2016, 3 pages.

3rd Generation Partnership Project (3GPP) S2-162982 was S2-162717-MDD and Slice Selection in core and RAN V1, 3rd vol. SA WG2, , Nokia et al., no. Nanjing, P.R. China; May 27, 2016, 13 pages.

3rd Generation Partnership Project (3GPP) SA WG2 Meeting #115 S2-162511 "Common CP functions and dedicate CP function for simultaneous multiple Network Slice (update of solution 1.3)" May 23-27, 2016, 4 pages.

3rd Generation Partnership Project (3GPP) TR 22.861 V14.1.0, Technical Specification Group Services and Systems Aspects, Feasibility Study on New Services and Markets Technology Enablers for Massive Internet of Things, Stage 1 (Release 14), Sep. 2016, 28 pages.

(56) References Cited

OTHER PUBLICATIONS

3rd Generation Partnership Project (3GPP) TR 22.862 V14.1.0, Technical Specification Group Services and System Aspects, Feasibility Study on New Services and Markets Technology Enablers for Critical Communications, Stage 1 (Release 14), Sep. 2016, 31 pages.
3rd Generation Partnership Project (3GPP) TR 22.863 V0.3.1, Technical Specification Group Services and System Aspects, Feasibility Study on New Services and Markets Technology Enablers—Enhanced Mobile Broadband; Stage 1 (Release 14), Feb. 2016, 13 pages.
3rd Generation Partnership Project (3GPP) TR 22.863 V14.1.0, Technical Specification Group Services and System Aspects, Feasibility Study on New Services and Markets Technology Enablers—Enhanced Mobile Broadband, Stage 1 (Release 14), Sep. 2016, 21 pages.
3rd Generation Partnership Project (3GPP) TR 22.864 V14.1.0, Technical Specification Group Services and System Aspects, Feasibility Study on New Services and Markets Technology Enablers—Network Operation, Stage 1 (Release 14), Sep. 2016, 35 pages.
3rd Generation Partnership Project (3GPP) TR 22.891 V14.2.0, Technical Specification Group Services and System Aspects, Feasibility Study on New Services and Markets Technology Enablers, Stage 1 (Release 14), Sep. 2016, 95 pages.
3rd Generation Partnership Project (3GPP) TR 23.720 V13.0.0, Technical Specification Group Services and System Aspects, Study on architecture enhancements for Cellular Internet of Things, (Release 13), Mar. 2016, 94 pages.
3rd Generation Partnership Project (3GPP) TR 36.881 V14.0.0, Technical Specification Group Radio Access Network, Evolved Universal Terrestrial Radio Access (E-UTRA), Study on Latency Reduction Techniques for LTE (Release 14), Jun. 2016, 249 pages.
3rd Generation Partnership Project (3GPP) TR 36.897 V13.0.0, Technical Specification Group Radio Access Network, Study on Elevation Beamforming/Full-Dimension (FD) Multiple Input Multiple Output (MIMO) for LTE; (Release 13), Jun. 2015, 58 pages.
3rd Generation Partnership Project (3GPP) TR 36.912 V13.0.0, Technical Specification Group Radio Access Network, Feasibility study for Further Advancements for E-UTRA (LTE-Advanced) (Release 13), Dec. 2015, 273 pages.
3rd Generation Partnership Project (3GPP) TR 38.801 V0.2.0, Technical Specification Group Radio Access Network, Study on New Radio Access Technology: Radio Access Architecture and Interface (Release 14), Jun. 2016, 20 pages.
3rd Generation Partnership Project (3GPP) TR 38.913 V14.3.0, Technical Specification Group Radio Access Network, Study on Scenarios and Requirements for Next Generation Access Technologies, (Release 14), Jun. 2017, 39 pages.
3rd Generation Partnership Project (3GPP) TR 45.820 V13.1.0, Technical Specification Group GSM/EDGE Radio Access Network, Cellular system support for ultra-low complexity and low throughput Internet of Things (CIoT) (Release 13), Nov. 2015, 495 pages.
3rd Generation Partnership Project (3GPP) TS 23.060 V13.6.0, Technical Specification Group Services and System Aspects, General Packet Radio Service (GPRS), Service description, Stage 2 (Release 13), Mar. 2016, 362 pages.
3rd Generation Partnership Project (3GPP) TS 23.401 V13.6.1, Technical Specification Group Services and System Aspects, General Packet Radio Service (GPRS) enhancements for Evolved Universal Terrestrial Radio Access Network (E-UTRAN) access (Release 13), Mar. 2016, 365 pages.
3rd Generation Partnership Project (3GPP) TS 24.302 V13.5.0, Technical Specification Group Core Network and Terminals, Access to the 3GPP Evolved Packet Core (EPC) via non-3GPP access networks; Stage 3 (Release 13), Mar. 2016, 126 pages.
3rd Generation Partnership Project (3GPP) TS 36.133 V14.7.0, Technical Specification Group Radio Access Network, Evolved Universal Terrestrial Radio Access (E-UTRA), Requirements for support of radio resource management (Release 14), Mar. 2018, 2997 pages.
3rd Generation Partnership Project (3GPP) TS 36.213 V13.0.0, Technical Specification Group Radio Access Network, Evolved Universal Terrestrial Radio Access (E-UTRA), Physical layer procedures (Release 13), Dec. 2015, 326 pages.
3rd Generation Partnership Project (3GPP) TS 36.300 V13.3.0, Technical Specification Group Radio Access Network, Evolved Universal Terrestrial Radio Access (E-UTRA) and Evolved Universal Terrestrial Radio Access Network (E-UTRAN), Overall description; Stage 2 (Release 13), Mar. 2016, 295 pages.
3rd Generation Partnership Project (3GPP) TS 36.321 V13.0.0, Technical Specification Group Radio Access Network, Evolved Universal Terrestrial Radio Access (E-UTRA), Medium Access Conlrol (MAC) protocol specification (Release 13), Dec. 2015, 82 pages.
3rd Generation Partnership Project (3GPP) TSG RAN WG1 #84bis Meeting, R1-163757, Way Forward on Channel Coding Evaluation for 5G New Radio, Busan, Korea, Apr. 11-15, 2016, Agenda Item 8.1.6.1, 5 pages.
3rd Generation Partnership Project (3GPP) TSG RAN WG1 #85, R1-164013, Framework for Beamformed Access, Samsung, Nanjing, China, May 23-27, 2016, 4 pages.
3rd Generation Partnership Project (3GPP) TSG RAN WG1 #85, R1-164014, Discussion on RS for Beamformed Access, Samsung, Nanjing, China, May 23-27, 2016, 3 pages.
3rd Generation Partnership Project (3GPP) TSG RAN WG1 #85, R1-165669, Way Forward on Frame Structure, Qualcomm and etc., Nanjing, China, May 23-27, 2016, Agenda Item 7.1.4, 2 pages.
3rd Generation Partnership Project (3GPP) TSG RAN WG1 Meeting #83 R1-157351, Initial Views on Technical Design for NB-IoT, Nov. 15-22, 2015, 3 pages.
3rd Generation Partnership Project (3GPP) TSG RAN WG1 Meeting #84bis R1-162379, "Overview of new radio access technology requirements and designs" Apr. 11-15, 2016, 4 pages.
3rd Generation Partnership Project (3GPP) TSG RAN WG1 Meeting #84bis R1-162797, "Harq Enhancement for Improved Data Channel Efficiency", Busan, Korea, Apr. 11-15, 2016, 3 pages.
3rd Generation Partnership Project (3GPP) TSG RAN WG1 Meeting #85 R1-164871 "Frame structure for new radio interface", May 23-27, 2016, 3 pages.
3rd Generation Partnership Project (3GPP) TSG RAN WG1 Meeting #85 R1-165174 "Uplink multiple access schemes for NR", May 23-27, 2016, 4 pages.
3rd Generation Partnership Project (3GPP) TSG RAN WG1 Meeting #86bis R1-1610524, WF on NR RS Definition, Huawei, HiSilicon, Lisbon, Portugal, Oct. 10-14, 2016, Agenda Item: 8.1.4.4, 4 pages.
3rd Generation Partnership Project (3GPP) TSG-RAN WG1 #85, R1-164628, Frame Structure for NR, Ericsson, Nanjing, China, May 23-27, 2016, 3 pages.
3rd Generation Partnership Project (3GPP) TSG-RAN WG1 #85, R1-164694, Frame Structure Requirements, Qualcomm, Nanjing, China, May 23-27, 2016, 5 pages.
3rd Generation Partnership Project (3GPP) TSG-RAN WG1#85 R1-165027 "Basic Frame Structure Principles for 5G" May 23-27, 2016, 6 pages.
3rd Generation Partnership Project (3GPP) TSG-RAN WG1#85, R1-165363, Nokia, Alcatel-Lucent Shanghai Bell, Scalability of MIMO Operation Across NR Carrier Frequencies, Nanjing, P.R. China, May 23-27, 2016, 5 pages.
3rd Generation Partnership Project (3GPP) TSG-RAN WG2 Meeting #94 R2-163371, "System Information Signalling Design in NR", May 23-27, 2016, 7 pages.
3rd Generation Partnership Project (3GPP) TSG-RAN WG2 Meeting #94, R2-163718 "Control Plane functions in NR", Nanjing, China; May 23-27, 2016, 4 pages.
3rd Generation Partnership Project (3GPP), RI-165027, vol. RAN WG1, Nokia et al: "Basic frame structure 1 principles for 5G", 3GPP Draft; no. Nanjing, P.R. China; 20160523-20160527 May 13, 2016.
3rd Generation Partnership Project (3GPP), TS 36.212 V10.8.0, RAN WG1, Technical Specification Group Radio Access Network; Evolved Universal Terrestrial Radio Access (E-UTRA); Multiplexing and Channel Coding (Release 10), Jun. 17, 2013, pp. 1-79.

(56) References Cited

OTHER PUBLICATIONS

3rd Generation Partnership Project (3GPP), TSG RAN WG1 Meeting #86, "RAN1 Chairman's Notes", Gothenburg, Sweden, Aug. 22-26, 2016, 105 pages.
MediaTek Inc., "HARQ Enhancement for Improved Data Channel Efficiency" [online], 3GPP TSG-RAN WG1#84b, R1-162797, <URL:http://www.3gpp.org/ftp/tsg_ran/WG1_RL1/TSGR1_84b/Docs/R1-162797.zip>, Apr. 2016, 4 pages.
Huawei et al., "Discussion on frame structure for NR", 3 GPP TSG-RAN WG1#85, R1-164032, May 23-27, 2016, 8 pages.
NTT Docomo Inc., "Discussion on frame structure for NR", 3GPP TSG-RAN WG1#85, R1-165176, May 23-May 27, 2016, 10 pages.
ZTE et al., "Forward compatibilty for numerology and fr ame structure design", R1-164261, 3GPP TSG-RAN WG1#85, May 23-27, 2016, 7 pages.
3GPP TS 36.211 V13.0.0, "Technical Specification Group Radio Access Network; Evolved Universal Terrestrial Radio Access (E-UTRA); Physical Channels and Modulation (Release 13)", Dec. 2015, 141pages.
3GPP TSG-RAN WG2 Meeting #95 R2-164693, Samsung, "System Information Signalling Design in NR" Aug. 2016, 6 pages.
3GPP TSG-RAN2 meeting #95bis R2-166202, Huawei et al., "Further Discussions of Minimum SI" Oct. 2016, 3 pages.
3GPP TSG-RAN2 Meeting #95bis R2-166203, Huawei et al., "Delivery of "Other SI" in NR", Oct. 2016, 5 pages.
3GPP TSG-RAN WG2 Meeting #95bis, ETSI MCC, "Skeleton report", Oct. 2016, 5 pages.

Consideration on System Information Broadcast in New RAT, ZTE, 3GPPTSG-RANWG2 Meeting #93bis, R2-162629, Apr. 15, 2016.
"Nokia Networks Enhancements for MTC Paging", R3-151590 Discussion Paper MTC Paging vB, Aug. 14, 2015.
Huawei, HiSilicon LTE-NR tight interworking control plane, R2-164268 LTE-NR tight interworking control plane, May 14, 2016.
CATT: "On interference measurement enhancement for multi-user MIMO operation", 3GPP TSG RAN WG1 Meeting #85, R1-164223, May 14, 2016, 20160523-20160527, XP051096527.
CATT: "WF on Interference Measurement Enhancements", 3GPP TSG RAN WGI Meeting #86bis, R1-1610771, Oct. 18, 2016, 20161010-20161014, XP051160249.
Huawei et al., "Numerology and wideband operation in NR unlicensed", 3GPP Draft; R1-1803677, 3rd Generation Partnership vol. RAN WG1, no. Sanya, China; 20180416-20180420, Apr. 15, 2018, 20180416-20180420.
Huawei et al: "Initial access in NR unlicensed", 3GPP Draft R1-1808062 3rd Generation Partnership Project (3GPP), Mobile Competence Centre, vol. RAN WG1, no. Aug. 10, 2018, 20180820-20180824.
Nokia et al: Feature Lead's Summary on Channel Access Procedures 3GPP Draft; R1-1809801 NRU Channel Access Summary 3rd Generation Partnership Project (3GPP), Mobile Competence Centre, vol. RAN WG1, no. Gothenburg, Sweden; Aug. 23, 2018, 20180820-20180820.
ZTE: "Considerations on channel access procedure for NR-U", 3GPP Draft; R2-1811281 Considerations on Random Access Procedure for NR-U, 3rd Generation Partnership Project (3GPP), Mobile Competence Centre vol. RAN WG2, no. Gothenburg, Sweden; Aug. 9, 2018, 20180820-20180824.

* cited by examiner

FIG. 32
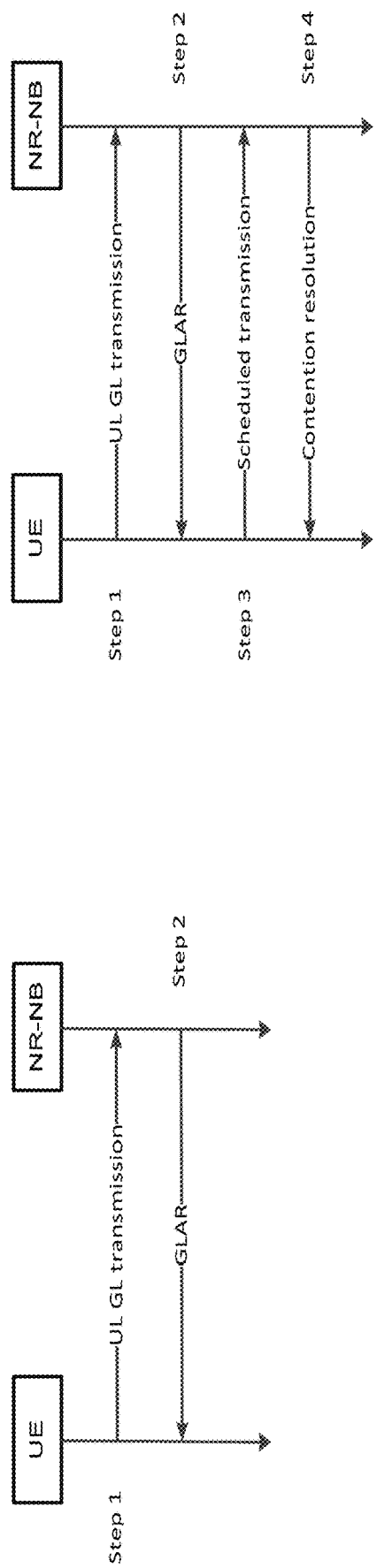
FIG. 34
FIG. 33

PHYSICAL CHANNELS IN NEW RADIO

CROSS REFERENCE TO RELATED APPLICATIONS

This application is a continuation of U.S. patent application Ser. No. 15/492,779 filed Apr. 20, 2017 which claims the benefit of priority to U.S. Provisional Patent Application No. 62/325,335, filed Apr. 20, 2016, and U.S. Provisional Patent Application No. 62/399,921, filed Sep. 26, 2016, the disclosures of which are incorporated by reference in their entireties.

BACKGROUND

Existing and proposed telecommunications networks and subnetwork, may operate in accordance with various standards, such as LTE, 4G, 5G, and 3GPP, to support diverse applications, such as live communication, entertainment media transmission, computer data transfer, and Internet-of-things (IoT), Web-of-things, and machine-to-machine (M2M) operations. Various standards include numerologies for the allocation of communications resources by subcarrier and timeslot. Various standards also include mechanisms for ensuring the receipt of transmissions, such as Hybrid Automatic Repeat Request (HARQ) and Physical Hybrid automatic repeat request Indicator Channel (PHICH) signaling.

SUMMARY

Various embodiments described herein improve reliability for various scenarios in NR. Example scenarios that are addressed include, without limitation: HARQ transmission methods for higher reliability, lower latency, erasure channels, grantless channels, and unequal error protection; improved reliability for control information, such as DL control information and A/N; and Resource provisioning for low latency and grantless operation.

In one example, an apparatus transmits, up to a transmission limit, a transmission that includes an HARQ process. If the transmission limit is reached or if a positive acknowledgment is received, the apparatus terminates the transmission that includes the HARQ process. In an example, at least two transmissions are transmitted before the positive acknowledgement is received. In another example, the apparatus receives a negative acknowledgement, and transmits the transmission after receiving the negative acknowledgement until the transmission limit is reached.

Physical hybrid automatic repeat request indicator channel signaling may be scheduled by determining a regular response period and selecting an irregular interval, which may be one of plural fixed opportunities within a short transmission time interval defined by the transmission time interval duration, resource blocks, and demodulation reference signal of the uplink transmission. The irregular interval may be selected from a sequence of opportunities associated with plural transmission time intervals multiplexed in an uplink. Transmissions may include multiple multiplexed numerologies. The opportunities may be defined by a radio resource control, a master information block, or a system information block, and modified via a medium access control's control element. ACK/NACK responses may be piggy-backed on physical downlink shared data channel signals at the time of a downlink grant, and multiple responses may be jointly encoded.

Multi-bit ACK/NACK signaling may be used to efficiently express the status of individual code blocks or groups of code blocks within a transmission block.

Grantless transmissions may be acknowledged implicitly, e.g., via responses comprising downlink control information or sent via a physical hybrid automatic repeat request indicator channel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

FIG. 32 shows an example of a MAC PDU containing responses to the grantless UL transmissions.

FIG. 33 shows an example of an implicit acknowledgement through a grantless response procedure.

FIG. 34 shows an example of an implicit acknowledgement through a grantless response procedure including contention resolution.

DETAILED DESCRIPTION

Figure 1:
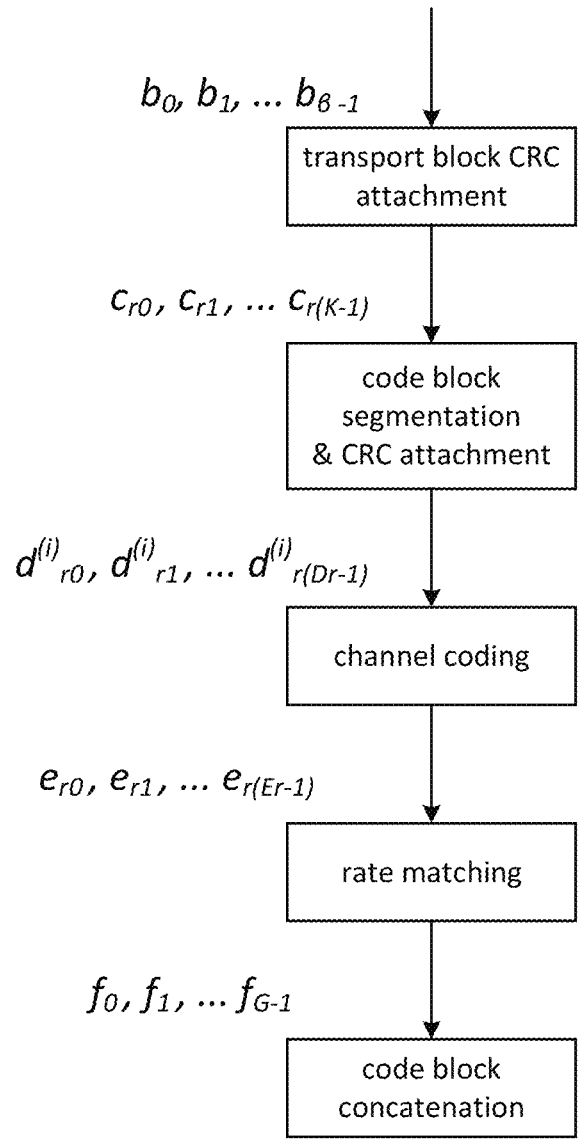
FIG. 1 is an example DL transmission chain for a transport block.

Hybrid automatic repeat request (HARQ) processes, indicators, and similar methods may be used to improve new radio performance in a number of ways. For example HARQ processes may be retransmitted, even before a response is expected, a number of times. Separate acknowledgement may be provided for various code blocks within a single transport block.

Multi-bit ACK/NACK signaling may be used to efficiently express the status of individual code blocks or groups of code blocks within a transmission block.

Grantless transmissions may be acknowledged implicitly, e.g., via responses comprising downlink control information or sent via a physical hybrid automatic repeat request indicator channel.

Physical HARQ indicator channel signaling may be scheduled by determining a regular response period and selecting an irregular interval, which may be one of plural fixed opportunities within a short transmission time interval defined by the transmission time interval duration, resource blocks, and demodulation reference signal of the uplink transmission.

Table 1 is a list of acronyms relating to service level technologies that may appear in the above description. Unless otherwise specified, the acronyms used herein refer to the corresponding term listed below.

TABLE 1

| Abbreviations | |
| --- | --- |
| A/N | ACK/NACK |
| API | Application Program Interface |
| ARQ | Automatic Repeat Request |
| AS | Access Stratum |
| BCCH | Broadcast Control Channel |
| BCH | Broadcast Channel |
| BL | Bandwidth reduced Low complexity |
| BRS | Beam Reference Signal |
| CB | Code Block |
| CE | Control Element |

TABLE 1-continued

Abbreviations

| | |
|---|---|
| CMAS | Commercial Mobile Alert System |
| CN | Core Network |
| CoMP | Coordinated Multi Point |
| CP | Cyclic Prefix |
| CRC | Cyclic Redundancy Check |
| C-RNTI | Cell Radio-Network Temporary Identifier |
| CSG | Closed Subscriber Group |
| DCI | Downlink Control Information |
| DL | Downlink |
| DL-SCH | Downlink Shared Channel |
| DMRS | De-Modulation Reference Signal |
| DRX | Discontinuous Reception |
| DTX | Discontinuous Transmission |
| E2E | End to End |
| EAB | Extended Access Barring |
| eCell | Extended Cell |
| eDRX | Extended Discontinuous Reception |
| eMBB | enhanced Mobile Broadband |
| ENB | Evolved Node B |
| eNodeB | evolved Node B |
| EPDCCH | Enhanced Physical Downlink Control Channel |
| ETWS | Earthquake and Tsunami Warning System |
| E-UTRA | Evolved Universal Terrestrial Radio Access |
| E-UTRAN | Evolved Universal Terrestrial Radio Access Network |
| FFS | For Further Study |
| GLAR | Grant-Less Access Response |
| GL-RNTI | Grant-Less Radio Network Temporary Identifier |
| GP | Guard Period |
| HARQ | Hybrid Automatic Repeat Request |
| HD | High Definition |
| IE | Information element |
| IMT | International Mobile Telecommunications |
| IOT | Internet of Things |
| KPI | Key Performance Indicators |
| LC-MTC | Low Cost or Low Complexity Machine-Type Communications |
| LTE | Long term Evolution |
| MAC | Medium Access Control |
| MBB | Mobile Broadband |
| MBSFN | Multicast-Broadcast Single-Frequency Network |
| MCL | Maximum Coupling Loss |
| MIB | Master Information Block |
| mMTC | massive Machine Type Communication |
| MTC | Machine-Type Communications |
| MVNO | Mobile Virtual Network Operator |
| NACK | Non-ACKnowledgement |
| NAS | Non-access Stratum |
| NB-IOT | Narrow band IoT |
| NGMN | Next Generation Mobile Networks |
| NR | New Radio |
| NR-A/N | NR A/N |
| NR-BID | NR Beam Index |
| NR-CQI | NR Channel Quality Indicator |
| NR-DCI | NR Downlink control information |
| NR-DD | NR Downlink data |
| NR-DRS | NR Reference signal in Downlink (typically used for channel estimation) |
| NR-PHICH | NR Physical HARQ Indicator Channel |
| NR-PMI | NR Precoder Matrix Index |
| NR-RI | NR Rank indicator |
| NR-SIR | NR Soft information on Reliability |
| NR-SR | NR Scheduling Request |
| NR-UCI | NR Uplink control information |
| NR-UD | NR Uplink data |
| NR-URS | NR Reference signal (typically used for channel estimation) |
| OFDM | Orthogonal frequency division multiplexing |
| PBCH | Physical Broadcast Channel |
| PCFICH | Physical Control Format Indicator Channel |
| PCI | Physical Cell Identity |
| PDCCH | Physical Downlink Control Channel |
| PDNICH | Physical Downlink Numerology Indication Channel |
| PDSCH | Physical Downlink Shared Data Channel |
| PDU | Protocol Data Unit |
| PHICH | Physical Hybrid ARQ Indicator Channel |
| PLMN | Public Land Mobile Network |
| PMCH | Physical Multicast Channel |
| PRACH | Physical Random Access Channel |
| PRB | Physical Resource Block |

TABLE 1-continued

Abbreviations

| | |
|---|---|
| PUCCH | Physical Uplink Control Channel |
| PUSCH | Physical Uplink Shared Channel |
| RAN | Radio Access Network |
| RAT | Radio Access Technology |
| RB | Resource block |
| RE | Resource Element |
| REG | Resource Element Group |
| RNTI | Radio Network Temporary Identifier |
| R-PDCCH | Relay-Physical Downlink Control Channel |
| RRC | Radio Resource Control |
| RS | Reference Signal |
| RV | Redundancy Version |
| SC-FDMA | Single carrier frequency division multiple access |
| SDU | Service Data Unit |
| SFN | System Frame Number |
| SI | System Information |
| SIB | System Information Block |
| SIBe | SIB Essential |
| SIPF | SI Provisioning Function |
| SI-RNTI | System Information RNTI |
| SMARTER | Feasibility Study on New Services and Markets Technology |
| SPS-RNTI | Semi persistent scheduling RNTI |
| SR | Scheduling Request |
| SSCH | Secondary Synchronization Channel |
| sTTI | Short TTI |
| TAU | Tracking Area Update |
| TB | Transport Block |
| TBS | Transport Block Size |
| TDD | Time Division Duplex |
| TRP | Transmission and Reception Point |
| TTI | Transmission Time Interval |
| UE | User Equipment |
| UHD | Ultra-High definition |
| UL | Uplink |
| UR/LL | Ultra-Reliable - Low Latency |
| URLLC | Ultra-Reliable and Low Latency Communications |
| vTTI | Transmission time interval of variable duration |
| WLAN | Wireless Local Area Network |
| WTRU | wireless transmit/receive unit |

It is expected that NR will target much lower BLER for data than LTE (e.g., BLER of 10 or less). Currently LTE's operating point is typically 10-1 for a single transmission although it is a proprietary configuration in the eNB. The target BLER for NR is expected to be achieved through more robust low rate codes and possibly retransmissions.

3GPP TR 38.913 defines scenarios and requirements for next generation access technologies. According to this requirement, for URLLC the target for user plane latency should be 0.5 ms for UL and 0.5 ms for DL. This implies that the BLER has to be achieved within these latency constraints.

LTE supports a minimum packet size of 40 bits. If the Transport Block (TB) is smaller than 40 bits, it is zero-padded to have 40 bits. A Cyclic Redundancy Check (CRC) is applied to the TB. At the receiver, if this CRC check fails, a non-acknowledgement (NACK) is sent and a retransmission follows.

Transport block sizes greater than 6144 are split into multiple code blocks not exceeding 6144 bits. A CRC is applied to each code segment. Even if a single CB is in error, HARQ retransmissions consist of the entire transport block. FIG. 1 shows an example of the data processing chain in LTE UL.

It has been agreed in NR that a subframe may contain a fixed number of symbols. It may support multiple control regions and one or more data transmissions. Multiple numerologies may be multiplexed in a subframe through TDM/FDM.

3GPP TS 36.300 summarizes the different characteristics of MAC and RRC control are as shown in Table 2 below.

TABLE 2

Summary of the difference between MAC and RRC control

| | MAC control | | RRC control |
|---|---|---|---|
| | Control entity | | |
| | MAC | | RRC |
| Signaling | PDCCH | MAC control PDU | RRC message |
| Signaling reliability | ~$10^{-2}$ (no retransmission) | ~$10^{-3}$ (after HARQ) | ~$10^{-6}$ (after ARQ) |
| Control delay | Very short | Short | Longer |
| Extensibility | None or very limited | Limited | High |
| Security | No integrity protection No ciphering | No integrity protection No ciphering | Integrity protection Ciphering |

A difference between MAC and RRC control lies in the signaling reliability. Due to the signaling reliability, signaling involving state transitions and radio bearer configurations should be performed by RRC. Basically, signaling performed by RRC in UTRA should also be performed by RRC also for E-UTRA.

Figure 2:
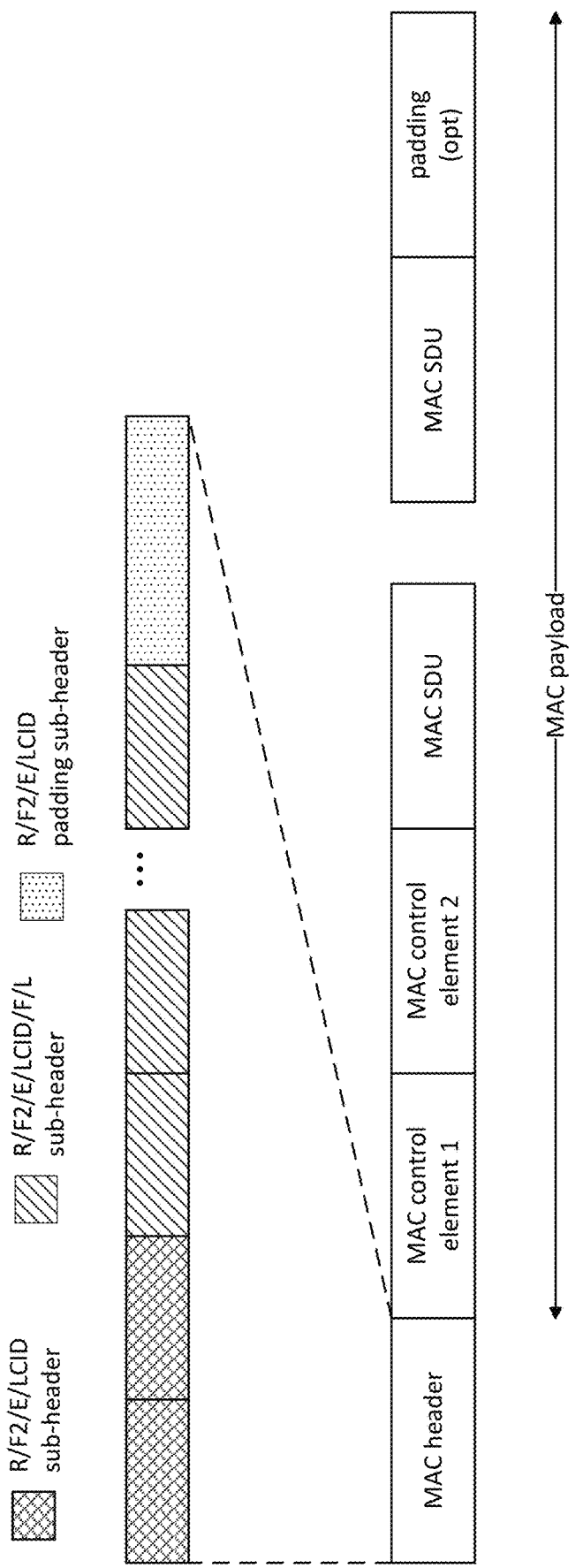
FIG. 2 is an example of a MAC PDU.

The MAC sublayer is responsible for the multiplexing/de-multiplexing of MAC Service Data Units (SDUs) belonging to one or more logical channels into/from transport blocks (TB) delivered to/from the physical layer on transport channels. A MAC Protocol Data Unit (PDU) consists of a MAC header, zero or more MAC SDUs, zero, or more MAC control elements, and optionally padding, as shown in FIG. 2.

Figure 3:
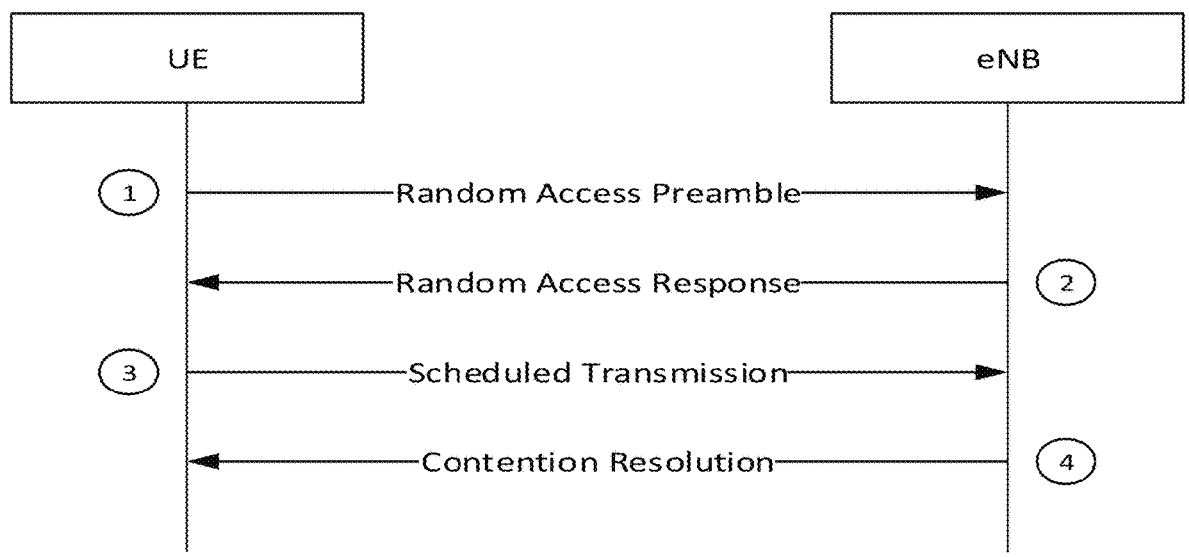
FIG. 3 shows an example of a contention based random access procedure.

FIG. 3 illustrates an example way to perform contention based random access. In Step 1, a random access preamble is sent on a RACH in uplink. This includes transmission of a RACH preamble, allowing eNB to estimate the transmission timing of the UE.

In Step 2, a random access response is generated by MAC on DL-SCH. The network transmits a timing advance command to adjust the UE transmit timing. The network also assigns UL resources to the UE to be used in Step 3.

In Step 3, a first scheduled UL transmission is made on UL-SCH. This includes transmission of the mobile-terminal identity to the network using the UL-SCH.

In Step 4, a contention-resolution message from the network is sent to the UE on the DL-SCH.

In some cases, contention-free random access is used for re-establishing uplink synchronization upon downlink data arrival, handover, and positioning. In an example, the first two steps of the procedure above are applicable, as there is no need for contention resolution when performing the contention-free random access procedure.

It is recognized herein that there is a need for a new HARQ mechanism. Retransmission in LTE has a minimum latency of 8 ms. URLLC may require lower latencies and higher reliability than LTE. Reliability can be defined by the success probability of transmitting X bytes within a latency bound. In other words, reliability can be defined such that the percentage of lost, erroneous, or delayed messages (e.g., exceeding the given latency bound) should be low. For example, for URLL the target for user plane latency is 0.5 mS for UL, and 0.5 ms for DL, which implies a 1 ms roundtrip delay, or equivalently a maximum of 1 ms retransmission latency. A reliability of 1-10-5 within 1 ms latency implies a reliability of 1-10-5 with retransmission latency of no more than 1 mS. This is the case for URLL applications with target reliability of 1-10-5 within 1 ms latency bound. For such applications, the reliable transmission of messages within a delay bound of 1 ms shall be provided at a reliability level of 1-10-5 which implies only 10-5 of the transmissions may either fail (including retransmissions), or lead to latencies exceeding the 1 mS bound.

It is recognized herein that low latency and high reliability are generally conflicting requirements. In some cases, existing HARQ mechanisms in LTE/LTE-A cannot meet these targets. Thus, it is recognized herein that NR may require new solutions to address HARQ design for higher reliability and lower latency. Furthermore, HARQ mechanisms are yet to be defined for grantless UL that may be used for URLL and mMTC. Similarly, with respect to the UL and DL, eMBB performance may be affected due to erasure (DL) or interference (UL) from a URLL transmission. Thus, it is further recognized herein that HARQ solutions to improve robustness for eMBB transmissions should be considered.

Given that data transmissions are required to be more robust for some use cases such as URLLC and mMTC in NR than in LTE, it is recognized herein that the A/N transmissions should also have increased robustness to errors. Otherwise, errors in A/N will affect the data BLER in retransmissions. LTE targets P (N->DTX/A)=0.1%, P (A->N/DTX)=1% (DTX is Discontinuous transmission). NR is likely to require P (N->DTX/A)=0.001%, P (A->N/DTX)=0.01% or lower for URLLC. Therefore, it is recognized herein that NR needs solutions that allow for higher A/N accuracy with minimal resources and latency. Similarly, it is further recognized herein that there is greater need for higher robustness in the control channel for URLLC and mMTC in order to support more robust data. This can be achieved, for example, through lower rate coding for the control information, but this may come at the cost of increased latency and resources. Therefore, it is recognized herein that NR needs solutions that provide the best performance with acceptable latency and resource overhead.

Given that the payload sizes can be lower than the smallest size that LTE provides (typically for URLL and mMTC) or greater than the largest code block size that LTE supports (typically for eMBB), the transmission chain for NR should evolve to support these modes with minimal latency or improved reliability or power conservation depending on the use case. For example, LTE supports a minimum TB (transmission block) size of 40 bits. If the payload is smaller, it is zero-padded to 40 bits. LTE supports at most 6144 bits as its largest CB (code block). A CRC is applied to the TB prior to segmentation into CBs. Each CB has a CRC applied as well. The receiver sends an A/N bit per TB. This design may be improved in NR to support other payload sizes, lower latency, and higher reliability.

Additionally, it is recognized herein that there is a need to improve the MAC CE reliability for some use cases. This can be accomplished, for example through redesign of the transmission chain in LTE/LTE-A. RAN2#94 preliminarily discussed mobility in NR and agreed that two levels of network controlled mobility may be supported: (1) RRC driven at 'cell' level. (A 'cell' refers to an FFS); and (2) Zero/Minimum RRC involvement (e.g., at MAC/PHY).

The signaling related to mobility needs to be very reliable. Cell level mobility, which may be managed in NR networks by the RRC layer, has a signaling reliability of $\sim 10^{-6}$. It is expected that mobility signaling proposed for NR systems at the MAC/PHY layers should have similar reliability. However, for LTE, the MAC control signaling has a reliability of $\sim 10^{-2}$ for signaling via the PDCCH and reliability of $\sim 10^{-3}$ for signaling via MAC control PDUs. Therefore, it is recognized herein that there is a need for more reliable MAC signaling to support MAC layer mobility management in NR networks. Note that various use cases (e.g., eMBB, URLL and mMTC) may require improved MAC CE reliability.

Higher MAC CE reliability may also be required to support SI (system information) signaling through MAC CEs especially for URLL and mMTC.

Methods and apparatuses providing additional Hybrid Automatic Repeat reQuest (HARQ) opportunities and Physical Hybrid Automatic Repeat reQuest Indicator CHannel (PHICH) resources are presented to, inter alia, reduce system overhead and provide lower retransmission latency in networks employing one or more numerologies. For example, flexible HARQACK and NACK (A/N) response times may be permitted when occurring within a provided tolerance window for uplink (UL) transmissions.

Multiple PHICH signaling occasions, each referred to as a "PHICH opportunity," may be provided within a short Transmission Time Interval sTTI duration. The configuration for the opportunities contained in system information such as a Master Information Block (MIB). Alternatively, the location of PHICH may be tied to the sTTI duration besides the uplink Resource Block (RB) location and De-Modulation Reference Signal (DMRS) cyclic code.

A/N responses may be piggy-backed with Physical Downlink Shared Data Channel (PDSCH) resources when a terminal is scheduled to have a downlink (DL) grant. This avoids additional signaling related to PHICH resource configuration. When multiple PHICH transmissions for one User Equipment (UE) are carried in a PDSCH, they may be jointly encoded.

Synchronous uplink HARQ signaling may be achieved with multiplexed sTTI via a priori sTTI scheduling or via Radio Resource Control (RRC) and Medium Access Control (MAC) handling of HARQ in multiplexed sTTI uplink. For the latter approach, when multiple sTTI durations are multiplexed by a terminal in the uplink, in order to maintain synchronous HARQ without requiring Downlink Control Information (DCI) signaling to indicate a HARQ process number for the uplink grant, the sequence of the HARQ process transmission to the terminal may be configured via RRC for the sTTI durations for the HARQ processes supported by the terminal. The terminal may be subsequently reconfigured via a MAC's Control Element (CE).

The $3^{rd}$ Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, commonly referred to as "5G". 5G development is expected to include the definition of next generation radio access technology (new RAT), which is expected to consist of multiple radio layers that work together in a multi-connectivity framework. This framework is expected to include the continued evolution of radio access ("5G Evolution") and the provision of new flexible radio access below 6 GHz ("5G Flexible Access"), and the provision of new ultra-mobile broadband radio access above 6 GHz ("5G Ultra-Mobile Broadband"). 5G Flexible Access is expected to consist of a new, non-backwards compatible radio access in new spectrum below 6 GHz, and it is expected to include different operating modes that can be multiplexed together in the same spectrum to address a broad set of 5G use cases with diverging requirements. 5G Ultra-Mobile Broadband is expected to include cmWave and mmWave spectrum that will provide the opportunity for ultra-mobile broadband access for, e.g., indoor applications and hotspots. In particular, the 5G Ultra-Mobile Broadband is expected to share a common design framework with the 5G Flexible Access, with cmWave and mmWave specific design optimizations. 5G is also expected to include the specification of non-3GPP radio access (e.g., WiFi).

3GPP has identified a variety of use cases that 5G is expected to support, resulting in a wide variety of user experience requirements for data rate, latency, and mobility. The proposed use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific use cases in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

With such a wide variety of use cases, the aspects of wireless communication disclosed and claimed herein may be embodied in a wide variety of wireless communication apparatuses, including user equipment (UE), a mobile station, a fixed or mobile subscriber unit, a pager, a cellular telephone, a personal digital assistant (PDA), a smartphone, a laptop, a tablet, a netbook, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

LTE defines the UL and DL Transmission Time Interval (TTI) to be 1 mS. Also referred to as a "subframe" in LTE, the TTI corresponds to the duration in which up to two transport blocks of dynamic size are delivered to the physical layer and transmitted over the radio interface for each component carrier. The number of transport blocks transmitted within a TTI depends on the configuration of the multi-antenna transmission scheme. In the case of no spatial multiplexing, there is at most a single transport block in a TTI. In the case of spatial multiplexing, with transmission on multiple layers in parallel to the same terminal, there are two transport blocks within a TTI.

In LTE, each 0.5 mS of the TTI is called a "slot". A Physical Resource Block (PRB) is defined as a block of resources corresponding to 180 kHz in the frequency domain and 0.5 mS in time. PRBs are allocated in pairs in the time domain by the scheduler in the UL and DL. A UL or DL grant is always at least one TTI long.

Figure 4:
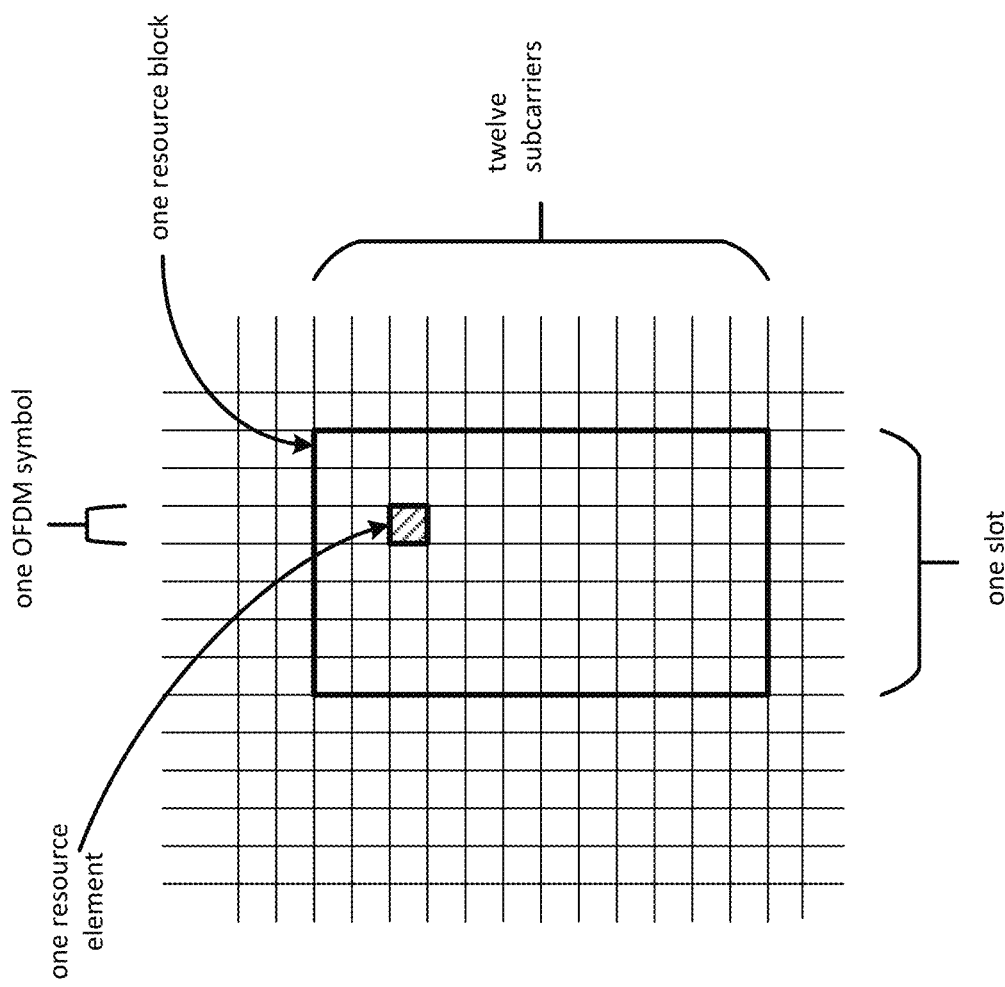
FIG. 4 illustrates the Physical Resource Block (PRB) structure in the Long Term Evolution (LTE) communications standard.
Figure 5:
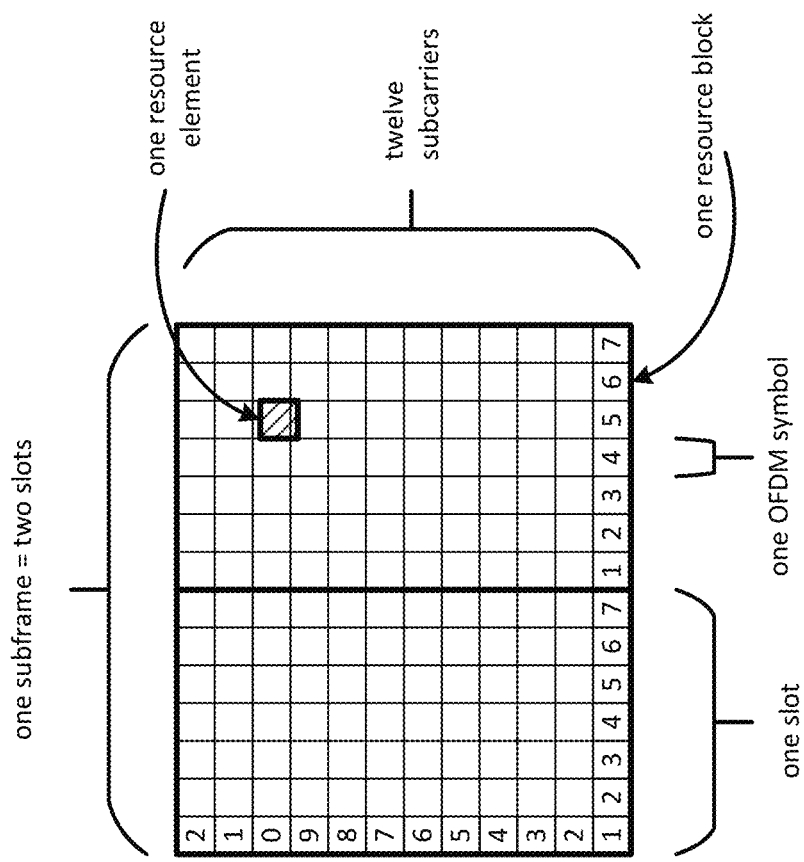
FIG. 5 shows an example resource grid structure for a Transmission Time Interval (TTI) using normal Cyclic Prefix (CP) symbols.

FIG. 4 shows the resource structure for a single PRB in LTE. Each slot contains 6 or 7 symbols depending on whether the configuration uses extended or normal CP. OFDM symbols are used in DL and SC-FDMA symbols are used in UL. A frame in LTE consists of 10 subframes, and is therefore 10 mS long. FIG. 5 shows the resource grid structure for 1 TTI assuming normal CP for the symbols. In the time domain structure in LTE, various physical channels are multiplexed into the resource elements of the TTI.

In the UL the physical layer, transmissions of the LTE uplink include the following PHY channels: a Physical Random Access CHannel (PRACH); a Physical Uplink Shared CHannel (PUSCH) carrying data and piggy-backed control information including ACK/NACK response to DL grant (A/N), channel state information (CSI), pre-coder matric index (PMI), rank indicator (RI) and scheduling request (SR) for the DL channel; and a Physical Uplink Control CHannel (PUCCH) carrying A/N, CSI, PI, RI and SR. PUCCH resources are allocated at the outer edge of the band which PUSCH resources occupy the remaining portion in the middle. In addition, two reference signals are also used in the UL. A De-Modulation Reference Signal (DM-RS) is used to estimate the UL channel. A Sounding Reference Signal (SRS) is used to obtain UL channel quality estimates.

Several physical-channel types are defined for LTE. The Physical Downlink Shared Channel (PDSCH) is the main physical channel used for unicast data transmission, and also for transmission of paging information. The Physical Broadcast Channel (PBCH) carries part of the system information, required by the terminal in order to access the network. The Physical Multicast Channel (PMCH) is used for MBSFN transmission. The Physical Downlink Control Channel (PDCCH) is used for downlink control information, mainly scheduling decisions, required for reception of PDSCH, and for scheduling grants enabling transmission on the PUSCH.

The Enhanced Physical Downlink Control Channel (EPDCCH) was introduced in release 11. It essentially serves the same purpose as the PDCCH, but allows for transmission of the control information in a more flexible way. The Relay Physical Downlink Control Channel (R-PDCCH) was introduced in release 10 and is used to carry L1/L2 control signaling on the donor-eNodeB-to-relay link. The Physical Hybrid-ARQ Indicator Channel (PHICH) carries the hybrid-ARQ acknowledgement to indicate to the terminal whether a transport block should be retransmitted or not. The Physical Control Format Indicator Channel (PCFICH) is a channel providing the terminals with information necessary to decode the set of PDCCHs. There is one PCFICH per component carrier. In DL L1/L2 control signaling, PCFICH, PHICH and PDCCH are located in the control region at the start of a subframe, while EPDCCH and R-PDCCH are located in the data region of a subframe. Additionally, various reference signals such as C-RS, CSI-RS and DMRS are multiplexed on to the PRBs to enable channel estimation and channel quality estimation. Different channels may be multiplexed on to a frame of LTE DL. The PHICH which may be used to signal hybrid-ARQ acknowledgements in response to uplink UL-SCH transmissions.

In LTE, PHICH is the downlink control channel that carries the hybrid-ARQ acknowledgement for the reception of the uplink transmission from the terminal. For every UL transport block, one PHICH is transmitted in every TTI. Thus, for UL spatial multiplexing, two PHICHs are required to acknowledge the uplink transmission.

Figure 6:
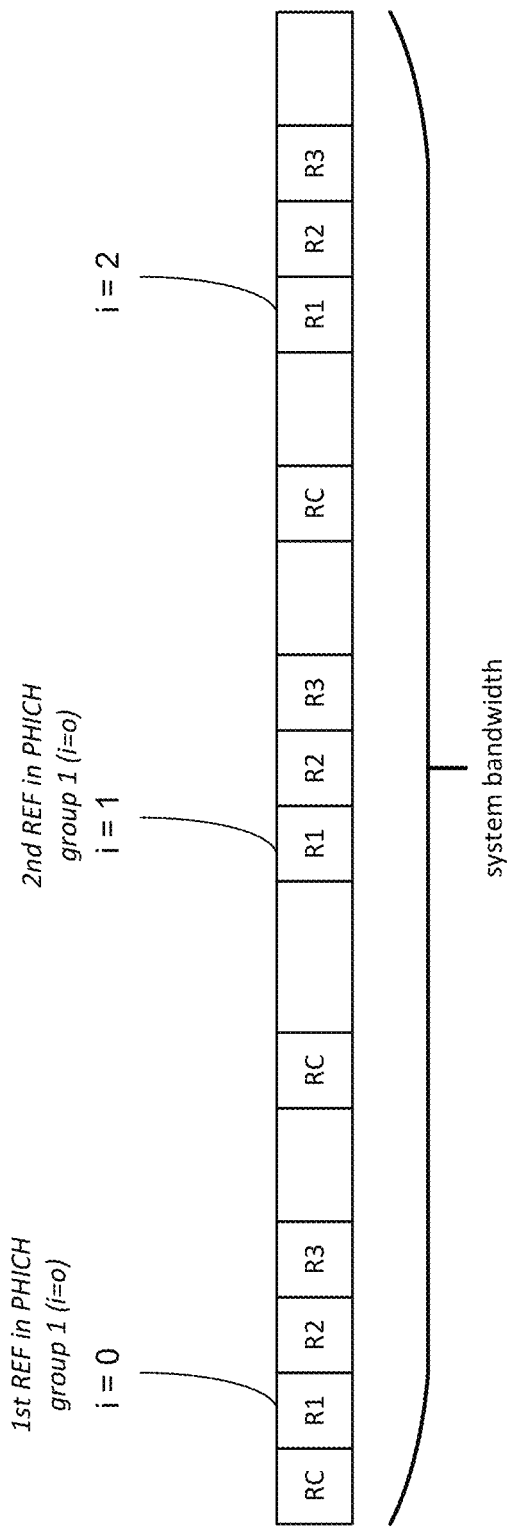
FIG. 6 shows an example timing sequence for a Physical Hybrid automatic repeat request Indicator Channel (PHICH) group which is mapped to three Resource Element Groups (REGs).

The PHICH is usually transmitted in the first OFDM symbol of each subframe, the same as PCFICH. In some cases, such as narrow bandwidths, the PHICH can be configured to an extended duration of up to 3 symbols. Multiple PHICHs can be mapped to the same set of resource element groups (REG), each of which consists of 4 REs. These PHICHs transmitted on the same set of REGs are called a PHICH group, and a PHICH group carries up to 8 and 4 PHICHs for normal and extended cyclic prefix, respectively. These multiple PHICHs in the same group are multiplexed by different orthogonal sequences. A PHICH group is mapped to three REGs, which are evenly distributed within the system bandwidth after allocated to PCFICH, as illustrated in FIG. 6.

The PHICH configuration is part of the Master Information Block (MIB) transmitted on the PBCH as information elements phich-Duration and phich-Resource as shown in the computer code of Example 1. The phich-Duration contains one bit indicating whether the normal duration or the extended duration is applied, and the phich-Resource contains two bits indicating the amount of resource in the control region reserved for PHICHs, expressed as a fraction of the downlink cell bandwidth in term of resource blocks.

Example 1

PHICH configuration in Master Information Block (MIB)

```
phich-Config ::= SEQUENCE {
    phich-Duration ENUMERATED {normal, extended},
    phich-Resource ENUMERATED {oneSixth, half, one, two}
}
```

In FDD, the number of PHICH groups $N_{PHICH}^{group}$ is constant in all subframes and given by $$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{Equation 1}$$

where the phich-Resource $N_g \in \{1/6, 1/2, 1, 2\}$ and the DL bandwidth in the number of RBs $N_{RB}^{DL}$ are provided by the MIB.

In TDD, the number of PHICH groups may vary between subframes and is given by $m_i \cdot N_{PHICH}^{group}$ where $N_{PHICH}^{group}$ is given by the expression above and $m_i$ is given by Table 3 with the uplink-downlink configuration provided by the higher-layer parameter subframeAssignment.

TABLE 3

The factor $m_i$ for frame structure for TDD

| Uplink-downlink configuration | Subframe number i | | | | | | | | | |
|---|---|---|---|---|---|---|---|---|---|---|
|  | 0 | 1 | 2 | 3 | 4 | 5 | 6 | 7 | 8 | 9 |
| 0 | 2 | 1 | 0 | 0 | 0 | 2 | 1 | 0 | 0 | 0 |
| 1 | 0 | 1 | 0 | 0 | 1 | 0 | 1 | 0 | 0 | 1 |
| 2 | 0 | 0 | 0 | 1 | 0 | 0 | 0 | 0 | 1 | 0 |

TABLE 3-continued

The factor $m_i$ for frame structure for TDD

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 3 | 1 | 0 | 0 | 0 | 0 | 0 | 0 | 0 | 1 | 1 |
| 4 | 0 | 0 | 0 | 0 | 0 | 0 | 0 | 0 | 1 | 1 |
| 5 | 0 | 0 | 0 | 0 | 0 | 0 | 0 | 0 | 1 | 0 |
| 6 | 1 | 1 | 0 | 0 | 0 | 1 | 1 | 0 | 0 | 1 |

For the PUSCH transmissions scheduled in subframe n, the corresponding PHICH resource is in subframe $n+k_{PHICH}$, where $k_{PHICH}$ is always 4 for FDD, and could be 4, 6 or 7 for TDD depending on different configurations.

A PHICH resource for the terminal is determined by two parameters, the PHICH group number $n_{PHICH}^{group}$ and the orthogonal sequence index $n_{PHICH}^{seq}$ within the group. These two parameters are derived by the terminal from the lowest PRB index in the first slot of the corresponding PUSCH transmission and the DMRS cyclic shift in the uplink grant. For spatial multiplexing, the resource for the second PHICH is derived not from the first but from the second lowest PRB index of the corresponding PUSCH transmission.

Figure 7:
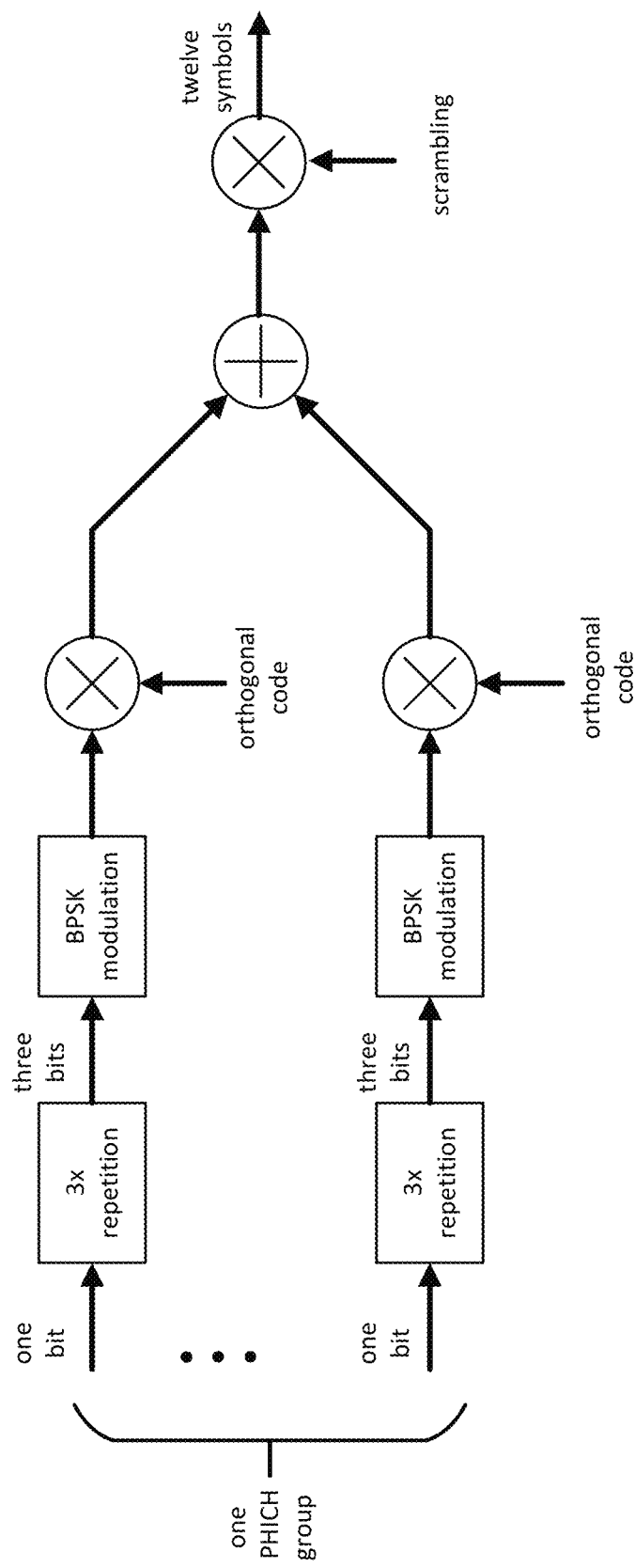
FIG. 7 shows an example PHICH process flow.

The one-bit hybrid-ARQ acknowledgement is first repeated three times, and then modulated in BPSK. Each modulation symbol is symbol-wise multiplied by a length-four orthogonal sequence, and the cell-specific scrambling is applied to the resulting symbols. At last, the sequence of 12 scrambled modulated symbols is mapped to three REGs corresponding to their PHICH group number. The overall PHICH processing is demonstrated in FIG. 7.

For the normal duration, all 12 modulated symbols are transmitted in the first OFDM symbol, and the mapping of the PHICH group number to resource elements are defined from the Physical layer cell identity and the number of available REGs not assigned to PCFICH in the first OFDM symbol. For the extended duration, 4 symbols are transmitted in each of the first three OFDM symbols, and the mapping of the PHICH group number to resource elements are defined from the Physical layer cell identity and the number of available REGs not assigned to PCFICH in each of the three OFDM symbols.

To support carrier aggregation, where a terminal receives or transmits on multiple component carriers, the terminal has to know which component carriers a certain DCI is associated with. With cross-carrier scheduling, the PDSCH and PUSCH transmissions are on a component carrier other than the carrier the PDCCH is transmitted on, so that a carrier indicator in the PDCCH is required to provide which component carrier is used for the PDSCH and PUSCH. Without cross-carrier scheduling, each uplink component carrier is scheduled on its corresponding downlink component carrier.

Figure 8:
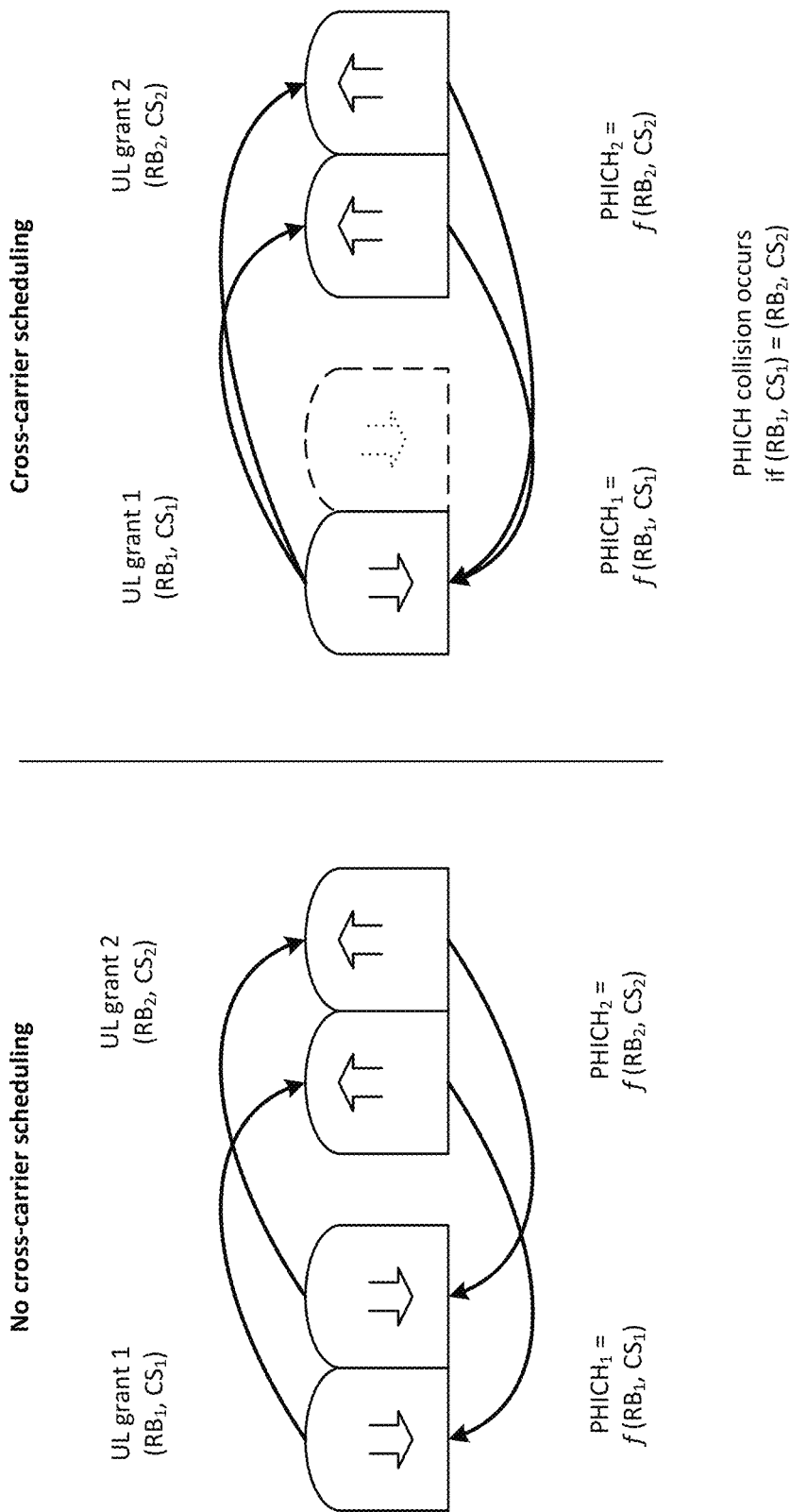
FIG. 8 illustrates uplink component carriers with associated downlink component carriers for the PHICH, with and without cross-carrier scheduling.

The PHICH is transmitted on the same component carrier that was used for sending uplink grant. Without the presence of cross-carrier scheduling, every uplink component carrier has its associated downlink component carrier for the PHICH, as illustrated in FIG. 8. In the case of cross-carrier scheduling, PHICHs for uplink transmissions on multiple component carriers have to be sent on one single downlink component carrier. To avoid PHICH collision, the scheduler has to assign different DMRS cyclic shift or different lowest PRB index for the different uplink component carriers.

UL HARQ process configures UL retransmission of packets when a NACK is received. There are 8 parallel HARQ processes in LTE. Retransmission occurs in subframe n+8 for FDD and at n+k for TDD where k depends on the subframe configuration.

UL HARQ is synchronous. This implies that the timing of the retransmission is implicitly known at the DL and no additional control signaling is required to indicate the process number.

UL HARQ can also be adaptive or non-adaptive. In adaptive HARQ operation, transmission attributes, such as modulation order, code rate, and the amount of resource allocation, may be changed during retransmissions. By applying those attributes adaptively with varying channel conditions, scheduling can be more flexible. Thus, it is easy to get scheduling gain in adaptive HARQ mode. However, adaptive HARQ operation requires more control singling overhead than non-adaptive HARQ operation because transmission attributes shall be informed to receiver at every retransmission.

In case of non-adaptive HARQ, the packet format for retransmissions is not changed or is known to both UE and eNodeB. Hence, no further control signaling is required, however it may be difficult to get scheduling gain because of the fixed characteristics in packet formats.

Figure 9:
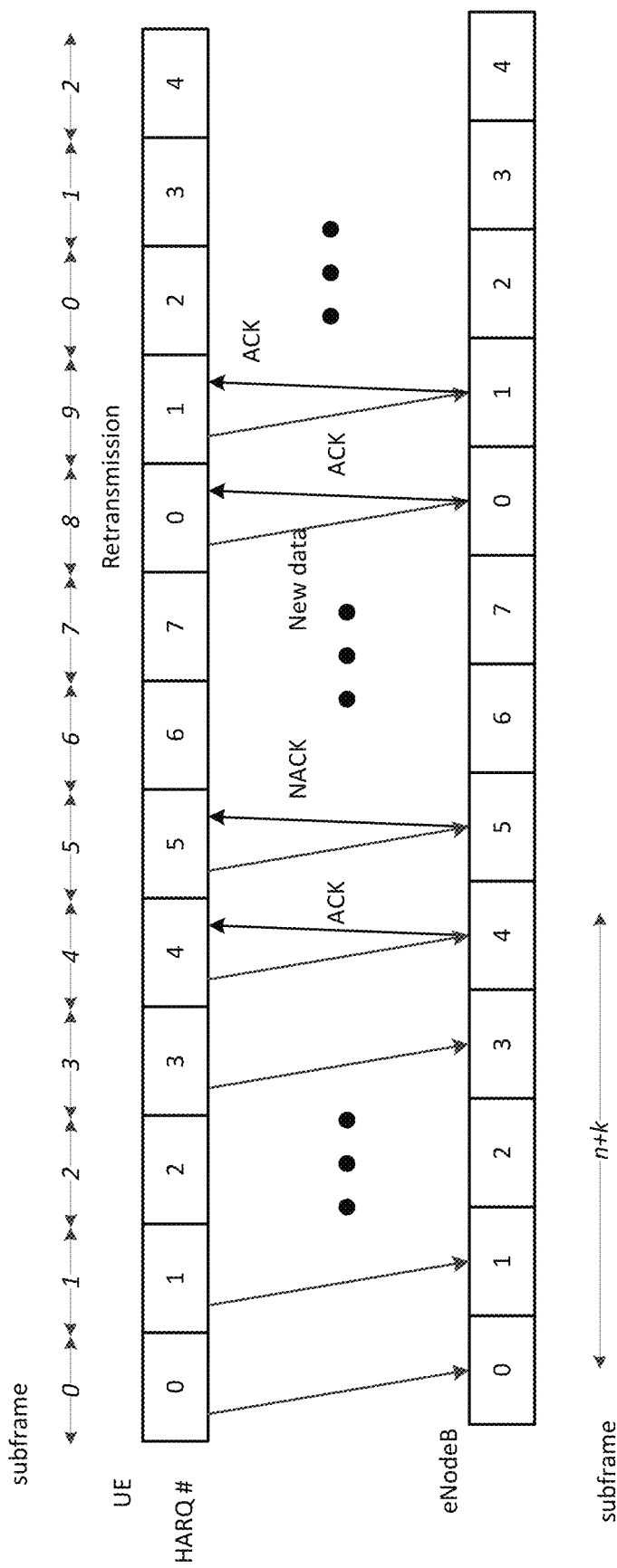
FIG. 9 is an example timing sequence for eight parallel synchronous Hybrid Automatic Repeat Request (HARQ) processes.

FIG. 9 is an example timing sequence for eight parallel synchronous Hybrid Automatic Repeat reQuest (HARQ) processes. A UE sends data to eNodeB in the form of a Transport Block. If the Transport Block is received correctly, the eNodeB sends an ACK. Otherwise the eNodeB sends a NACK. The PHICH physical channel is used to carry HARQ in the downlink direction for the received uplink data. Then retransmissions are scheduled at fixed time intervals and use specific processes in specific subframes. Every 8 subframes the UE repeats the process ID. As a result, the eNodeB knows exactly when each HARQ process comes. The UL HARQ Process ID=(SFN×10+subframe) modulo 8. The HARQ process may occur in cycles even if no resources are allocated during a specific sub frame. As a result, the first process will repeat every 8 mS. Since the UE has to use a specific HARQ process ID at a specific subframe, the receiving eNodeB knows exactly which HARQ process comes when. Further, the eNodeB may also know about Redundancy Version (RV) because the UL Grant (DCI 0) from eNodeB can specify RV using the MCS field. As mentioned, above HARQ is synchronous in the UL. Whenever, a retransmission occurs in UL, it can be either adaptive or non-adaptive.

LTE may use semi-persistent scheduling (SPS) without increasing the size of the PDCCH to support more applications. With SPS, the UE is pre-configured by the eNodeB with an SPS-RNTI allocation ID and a periodicity. Once pre-configured, if the UE were to receive an allocation (DL/UL) using the SPS-RNTI, e.g., instead of the typical C-RNTI, this allocation would repeat according to the pre-configured periodicity. During SPS, certain things remain fixed for each allocation, such as RB assignments, and the Modulation and Coding Scheme. Therefore, if the radio link conditions change, a new allocation will have to be sent (PDCCH). Also, any incremental redundancy, such as subsequent HARQ transmissions, will be separately scheduled using dynamic scheduling via PDCCH instead of PHICH.

There is significant interest in reducing latency in future releases of LTE, over and beyond what can be currently achieved. Use cases include delay sensitive M2M applications, critical low latency applications and more robust real time applications such as Voice over LTE (VoLTE), gaming, and conference.

As part of Rel. 14 the 3GPP working group has recently approved a work item on latency reduction techniques in LTE. See 3GPP 36.881 "Study on Latency reduction techniques for LTE," V13.0.0. In the corresponding study item the group investigated proposals and performance of various latency reduction schemes that are backwards compatible with LTE up to release 13. One of the proposals that is considered crucial is introduction of short TTIs (sTTI) that are much less than 1 mS in duration to provide reduced user-plane latency. The study item considered different TTI numerologies, i.e., various sTTI lengths from 1 symbol duration to 1 slot duration. sTTIs enable reducing user plane latency because the signaling duration decreases and, correspondingly, the processing times at the receiver, A/N response times, and HARQ retransmission latencies are also reduced.

Table 4 shows an exemplary configuration of sTTIs based on the proposals in 3GPP 36.881. Because backwards compatibility is a requirement for these designs, all configurations assume 15 kHz carrier spacing. The one way delay for signaling between UL and DL scales nearly linearly as the sTTI duration is scaled.

TABLE 4

3GPP 36.881 sTTI configurations to enable user-plane latency reduction in

| | | sTTI Numerology (# of symbols in sTTI assuming 15 kHz subcarrier spacing) | | | |
|---|---|---|---|---|---|
| Step | Description | 14 (LTE) | 7 | 4 | 1 |
| 1 | eNodeB Processing Delay = 1 * TTI | 1 ms | 0.5 ms | 0.28 ms | 0.07 ms |
| 2 | UE Processing Delay = 1.5 * TTI | 1.5 ms | 0.75 ms | 0.42 ms | 0.105 ms |
| 3 | Frame Alignment = 0.5 * TTI | 0.5 ms | 0.25 ms | 0.14 ms | 0.035 ms |
| 4 | sTTI duration = 1 * sTTI | 1 ms | 0.5 ms | 0.28 ms | 0.07 ms |
| 5 | HARQ delay (BLER @ 10%) = 8 * 0.1 * TTI | 0.8 ms | 0.4 ms | 0.23 ms | 0.056 ms |
| | Total one way delay | 4.8 ms | 2.4 ms | 1.35 ms | 0.34 ms |

It is expected that ultra-reliable, low-latency applications such as drone control and remote surgery, and some mMTC applications such as robotic control and industry automation, will significantly benefit from reduced control and user plane latencies. Therefore there is considerable interest in having the UL and DL numerologies for 5G accommodate such use cases without requiring backward compatibility with LTE.

3GPP TR 38.913, "Study on Scenarios and Requirements for Next Generation Access Technologies," Release 14 V0.2.0, defines scenarios and requirements for next generation access technologies. The following are excerpts of the Key Performance Indicators (KPI) section of 3GPP TR 38.913 that are relevant to low latency design.

"7.5 User Plane Latency. For URLLC the target for user plane latency should be 0.5 ms for UL, and 0.5 ms for DL. Furthermore, if possible, the latency should also be low enough to support the use of the next generation access technologies as a wireless transport technology that can be used within the next generation access architecture." Id.

"NOTE1: The reliability KPI also provides a latency value with an associated reliability requirement. The value above should be considered an average value and does not have an associated high reliability requirement." Id. "For eMBB, the target for user plane latency should be 4 ms for UL, and 4 ms for DL." Id.

"NOTE2: For eMBB value, the evaluation needs to consider all typical delays associated with the transfer of the data packets in an efficient way (e.g. applicable procedural delay when resources are not preallocated, averaged HARQ retransmission delay, impacts of network architecture)." Id.

Figure 10:
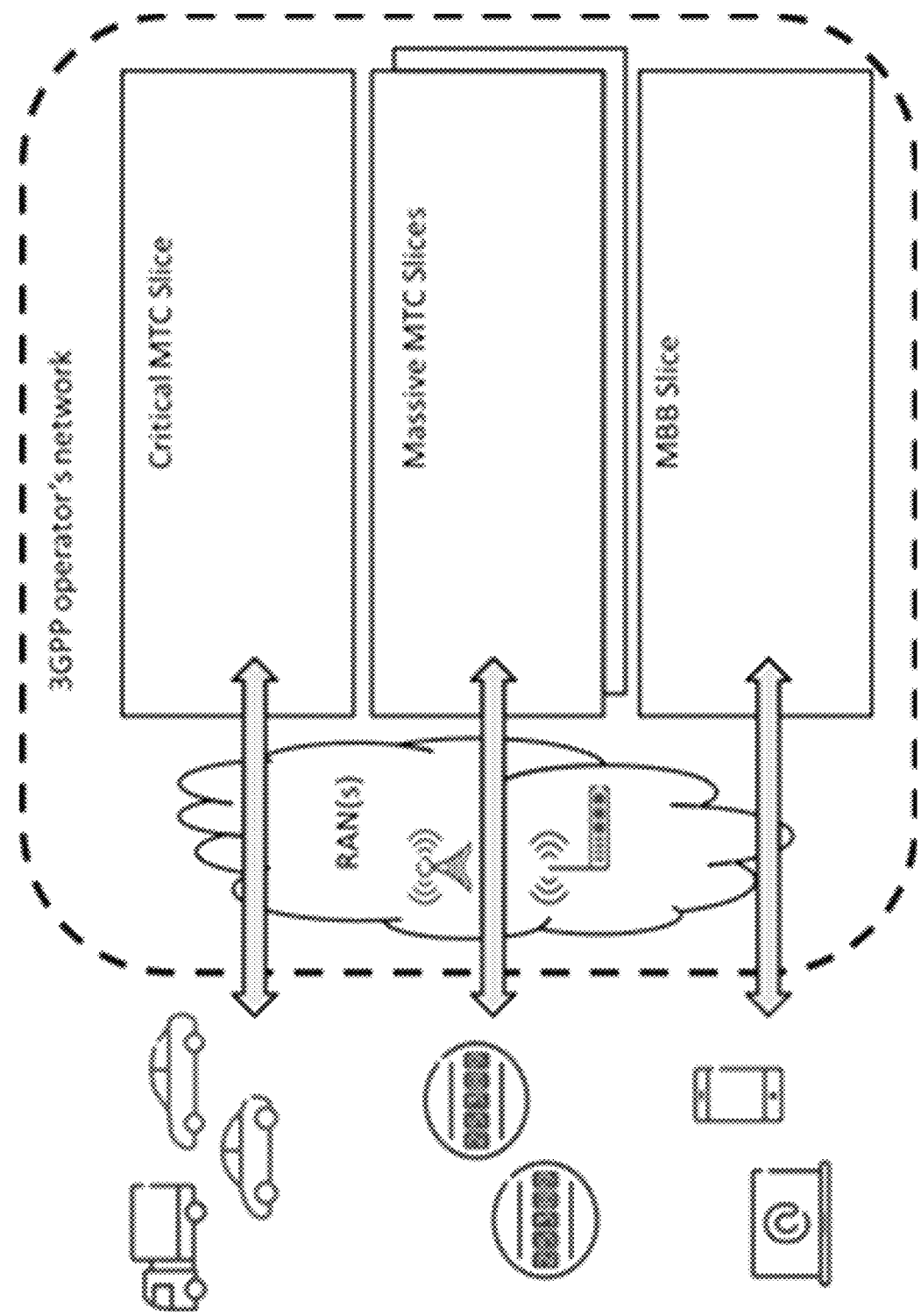
FIG. 10 is an illustration of the concept of network slicing.

FIG. 10 is a high level illustration of the concept of network slicing. A network slice is composed of a collection of logical network functions that supports the communication service requirements of particular use cases. It shall be possible to direct UEs to selected slices in a way that fulfil operator or user needs, e.g. based on subscription or UE type. The network slicing primarily targets a partition of the core network, but it is not excluded that Radio Access Network (RAN) may need specific functionality to support multiple slices or even partitioning of resources for different network slices. See 3GPP TR 22.891 "Feasibility Study on New Services and Markets Technology Enablers (SMARTER)," Stage 1, Release 14, V-1.1.0.

Potential network slicing service requirements are defined in 3GPP TR 22.891. The 3GPP System shall allow the operator to compose network slices, i.e. independent sets of network functions, e.g. potentially from different vendors, and parameter configurations, e.g. for hosting multiple enterprises or Mobile virtual network operators (MVNOs) etc. The operator shall be able to dynamically create a network slice to form a complete, autonomous and fully operational network customized to support different diverse market scenarios. The 3GPP System shall be able to identify certain UEs and subscribers to be associated with a particular network slice. The 3GPP System shall be able to enable a UE to obtain service from a specific network slice, e.g. based on subscription or UE type.

Figure 11:
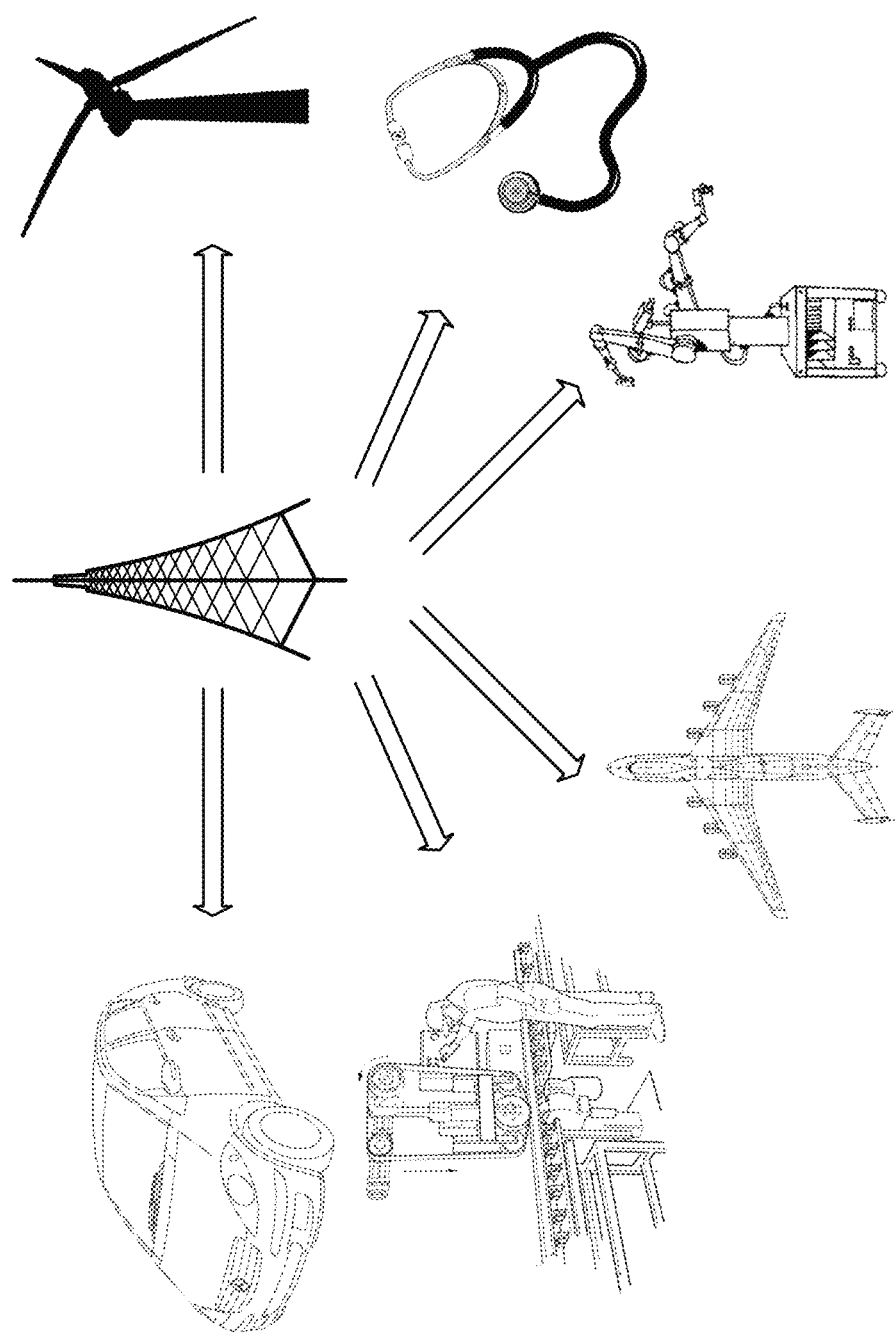
FIG. 11 illustrates telecommunications in applications that may require low latency in uplink (UL) or downlink (DL) transmissions.

FIG. 11 illustrates projected applications requiring low latency in UL and DL in a 5G network. It is projected that 5G will support URLLC applications such as smart vehicle control, drone control, robotic surgery and MTC applications like industry automation, etc. that require new solutions to address the demands for lower latency.

Figure 12:
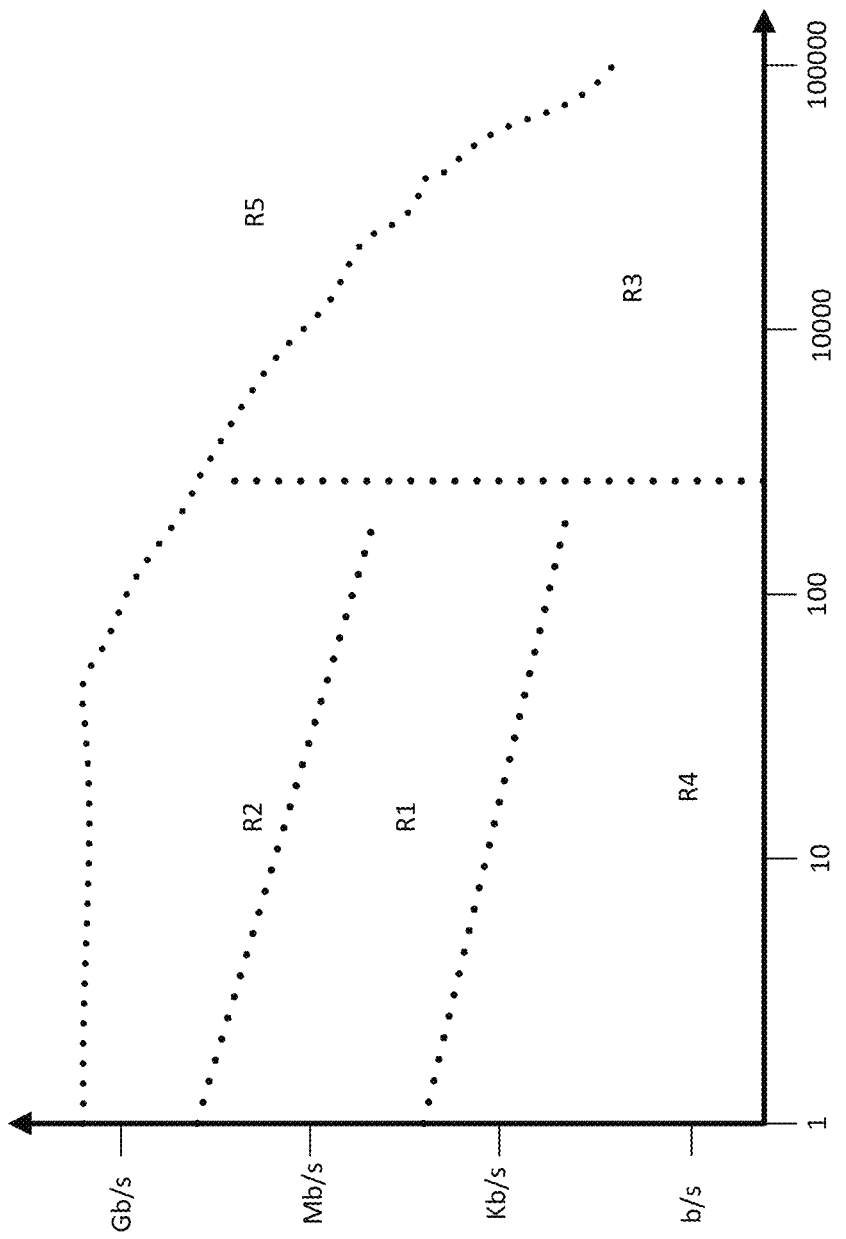
FIG. 12 is a graph of the number of users and bit rates supported by various network technologies, divided into general ranges of various applications using those bit rates and user volumes.
Figure 13:
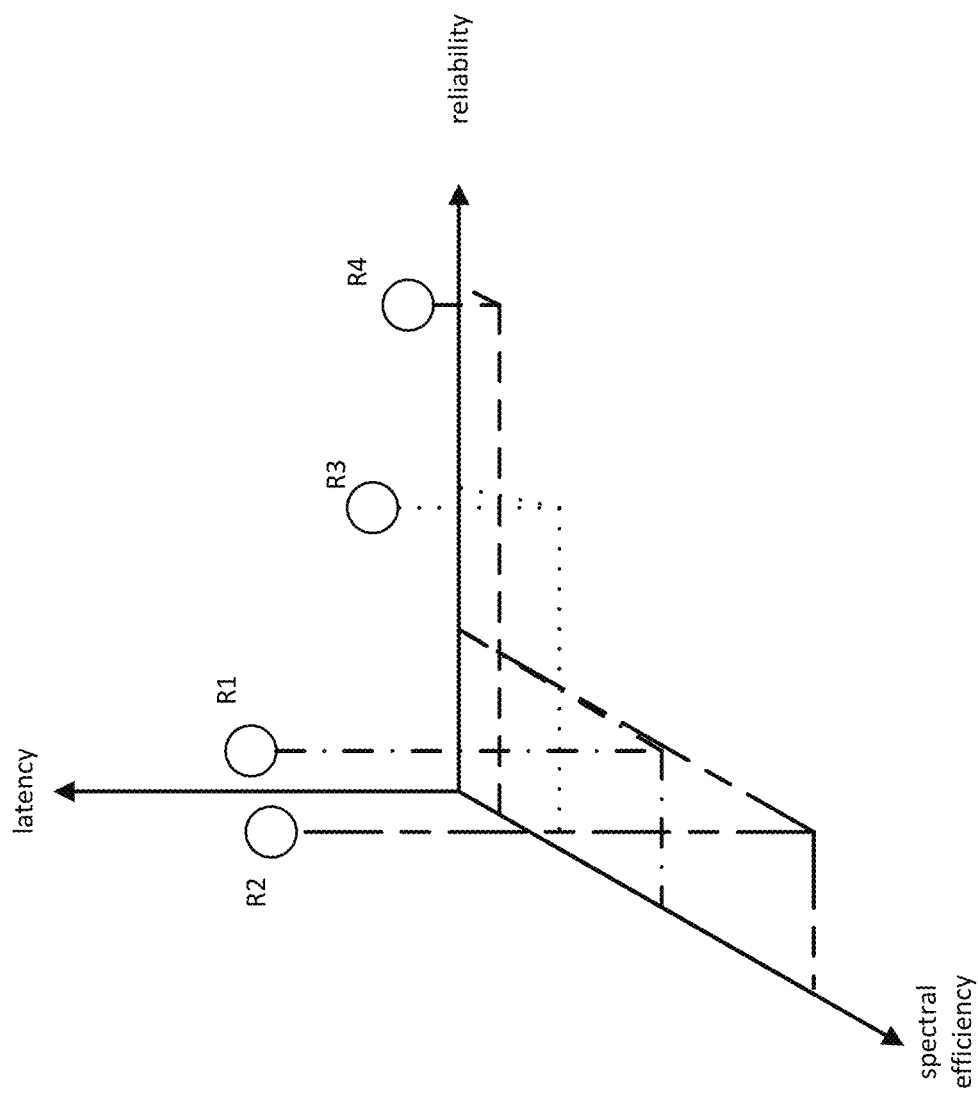
FIG. 13 is a 3D graph of the general latency, reliability, and spectral efficiency of the groups identified in FIG. 33.

FIGS. 12 and 13 shows a projection of various applications with different deployment density and latency requirements in 5G.

Figure 14:
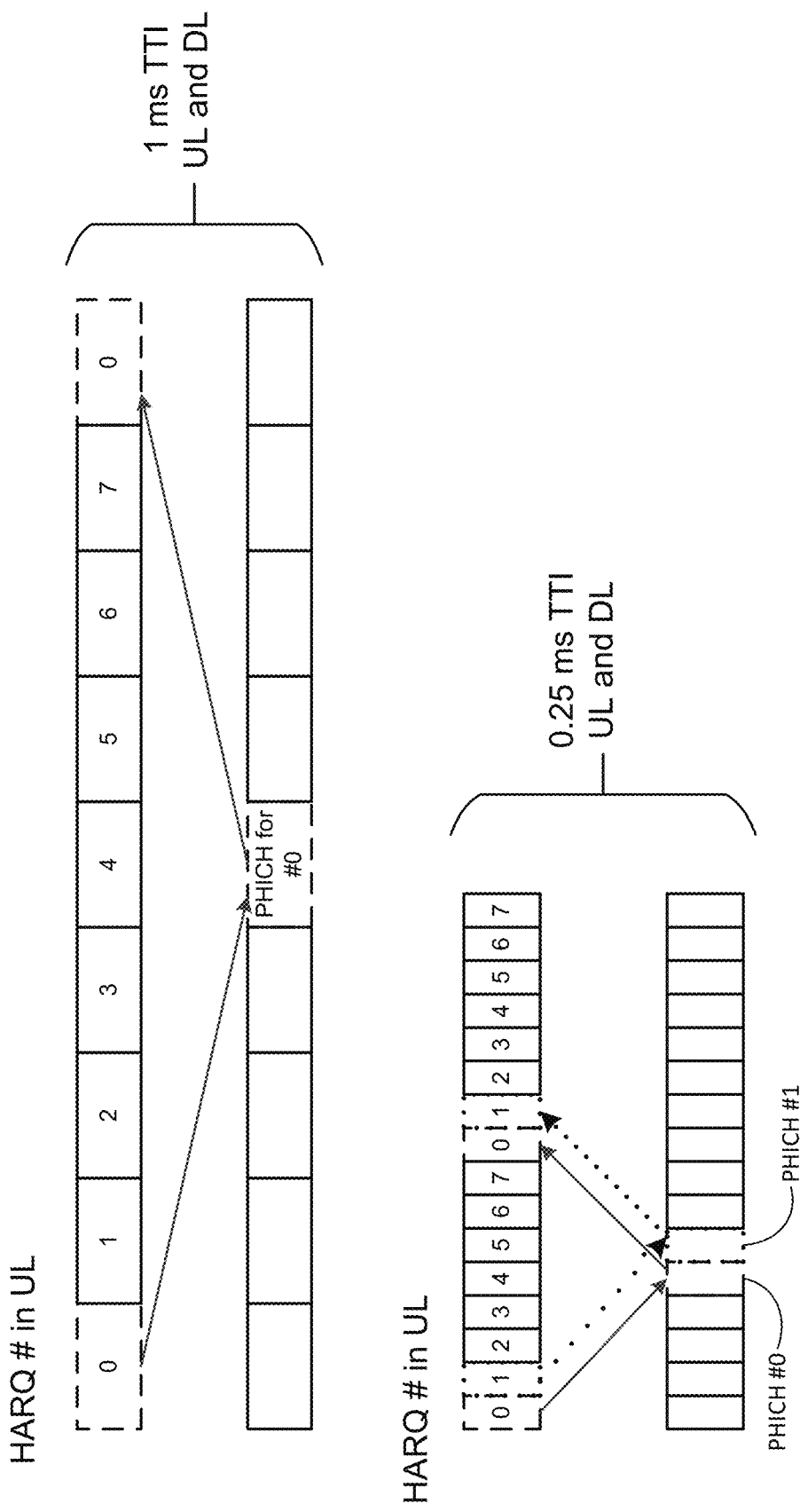
FIG. 14 shows two timing sequences for PHICH response to UL transmissions, one for a short TTI (sTTI) of 1 mS and the other for an sTTI of 0.25 mS.

The solutions in LTE are currently inadequate to address the low latency requirements that 5G seeks to address. Also lacking are solutions to seamlessly multiplex applications different numerologies simultaneously. Because PHICH is transmitted only at a fixed duration following the UL transmission, for example 4 mS in FDD in LTE, the latency of the UL HARQ process is fixed and cannot be reduced further in the current releases of LTE.

sTTIs of smaller duration, as proposed in 3GPP 36.881, may be considered for lowering latency. For example, sTTI of 0.25 mS in the UL can be accompanied with A/N response times of 1 mS in DL, linearly scaled down from legacy LTE. This implies that PHICH has to be signaled every 0.25 mS. FIG. 14 shows the expected timeline for PHICH response to UL transmissions of sTTI durations 1 mS and 0.25 mS according to 3GPP 36.881.

However, currently in LTE, PHICH is signaled only once at the beginning of 1 ms TTI. This cannot address the goal of achieving low latency in A/N signaling. Obviously to maintain low A/N response times, the PHICH transmission has to occur more frequently. But this configuration is not yet defined as part of the SI in 3GPP 36.881. Nor is there any definition of the sTTI durations or HARQ A/N timelines for 5G.

Where sTTI configurations as small as 1 or 2 symbols are to be supported under current schemes, the required number of PHICH resources would increase by a factor between seven and ten. It is desirable for a solution for 5G to address this problem by allocating sufficient resources to support all sTTI numerologies, preferably with minimal control overhead.

Figure 15:
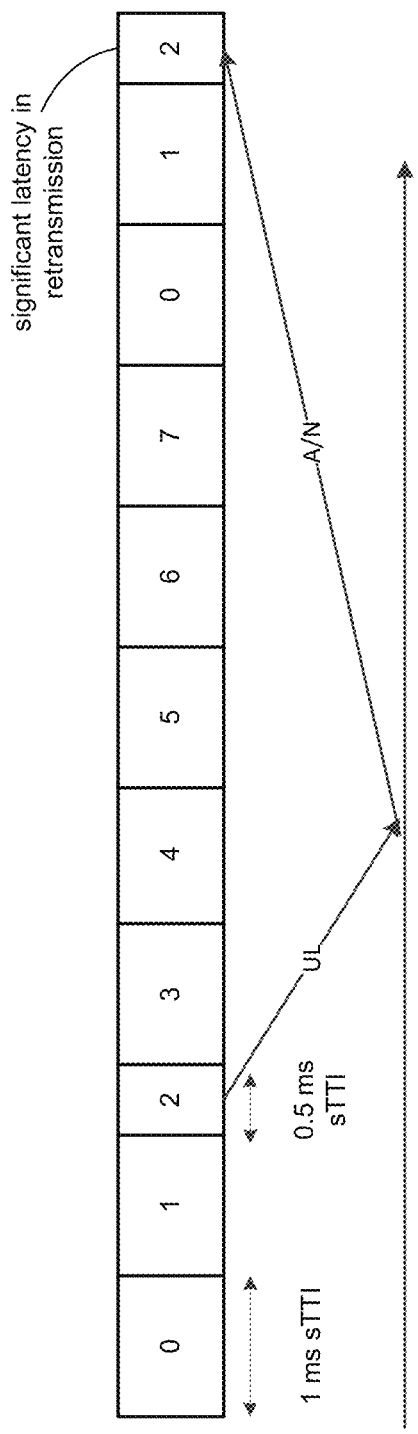
FIG. 15 illustrates a high latency in retransmission for a HARQ process #2 for a 0.5 mS sTTI where other processes are of 1 mS duration.

Another problem is latency with synchronous UL HARQ processes. When sTTIs of multiple lengths are multiplexed together and the UL HARQ processes occur in the predetermined sequence of 0, 1, 2, . . . 7, and subsequently repeat the sequence, latency cannot be reduced for the sTTI. FIG. 15 illustrates the high latency in retransmission for 0.5 mS sTTI of HARQ process #2 when all other processes are of legacy duration of 1 mS. It is desirable to have new solutions that allow synchronous operation and avoid excess control overhead while allowing multiplexed sTTI of different durations.

Figure 16:
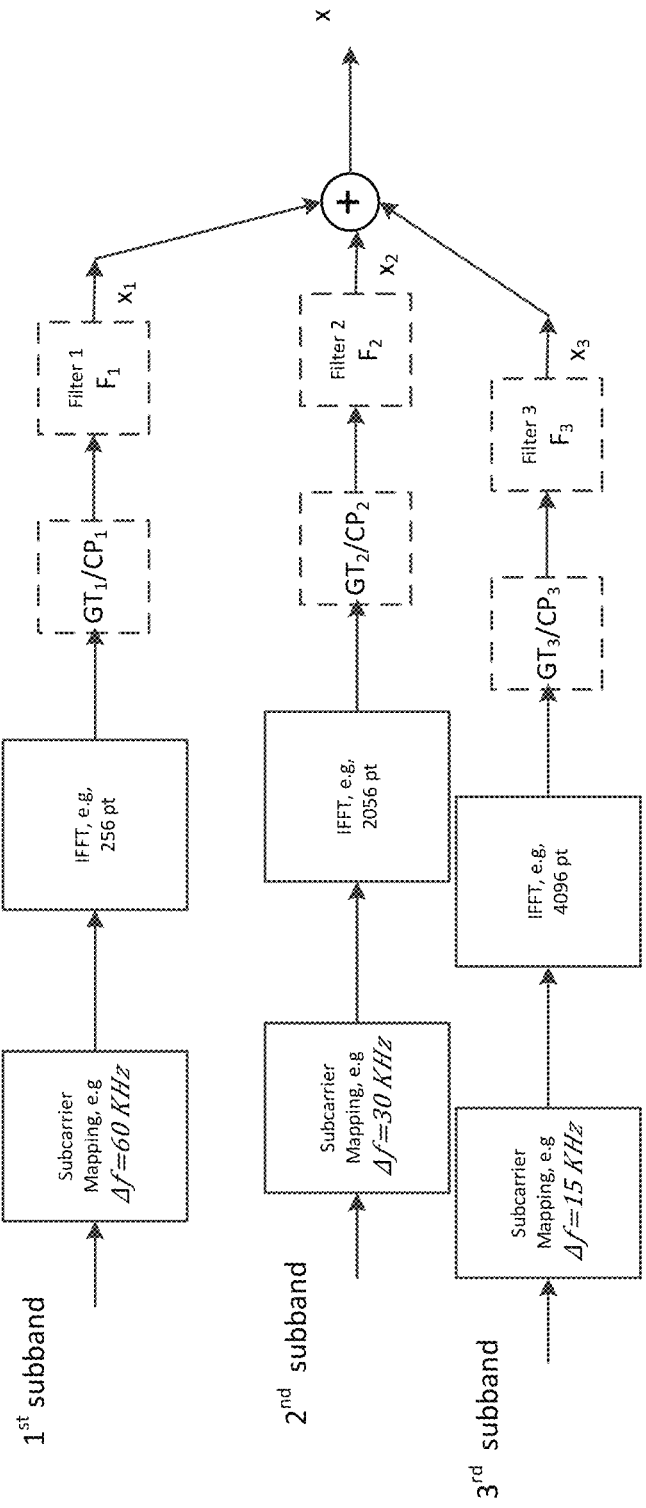
FIG. 16 show an example process flow for multiplexing different numerologies.

5G is expected to support multiple numerologies of TTIs, i.e., CP length, subcarrier spacing (or equivalently symbol duration) and the number of symbols in the TTI. Multiple numerologies may be multiplexed on to the same time-frequency resource grid. An exemplary configuration of a 5G transmitter multiplexing different numerologies is depicted in FIG. 16. The numerologies are described in Table 5.

TABLE 5

Exemplary numerologies supported in 5G

|  | 5G numerology case 1 | 5G numerology case 2 | 5G numerology case 3 |
| --- | --- | --- | --- |
| Subcarrier spacing | $\Delta f = 15$ KHz, with $y = 1$ | $\Delta f = 30$ KHz with $y = 2$ | $\Delta f = 60$ KHz with $y = 4$ |
| $T_{guard}$ (z) | $T_{guard}$ (z = 1) = 4.7 µs | $T_{guard}$ (z = 2) = 2.35 µs | $T_{guard}$ (z = 3) = 1.175 µs |
| Minimum TTI | 71.37 µs | 35.68 µs | 17.57 µs |

Various embodiments described below improve reliability for various scenarios in NR. Example scenarios that are addressed include, without limitation: HARQ transmission methods for higher reliability, lower latency, erasure channels, grantless channels and unequal error protection; improved reliability for control information such as DL control information and A/N; and resource provisioning for low latency and grantless operation.

In an example embodiment, reliability is improved for low latency cases through multiple HARQ retransmissions that may occur prior to reception of ACK and occur until the reception of ACK. Solutions are also provided herein for the eMBB case where a DL transmission may be punctured by a URLL transmission. Here, erased portions of the transport block may be retransmitted, thereby saving resources. In another example embodiment, reliability is provided for UL transmissions by transmitting only portions of the transport block that are in error due to UL interference. A/N is defined herein for UL grantless transmissions through the use of a new grantless access response messaging for Acknowledgement. In accordance with another example embodiment, code-block grouping and providing A/N resources per group is introduced, to allow for selective HARQ retransmission strategies.

Turning now to enhanced HARQ strategies for NR, in one example, retransmission occurs until reception of ACK for low latency. It is recognized herein that, in some cases, NR should support retransmissions of a HARQ process in a pattern that may be predefined in the standards or configured through RRC/MAC CE. For example, HARQ retransmissions may occur with periodicity P, where P is predefined in the spec or configured through RRC/MAC CE. The retransmissions may be any of the redundancy versions predefined or configured.

Figure 17:
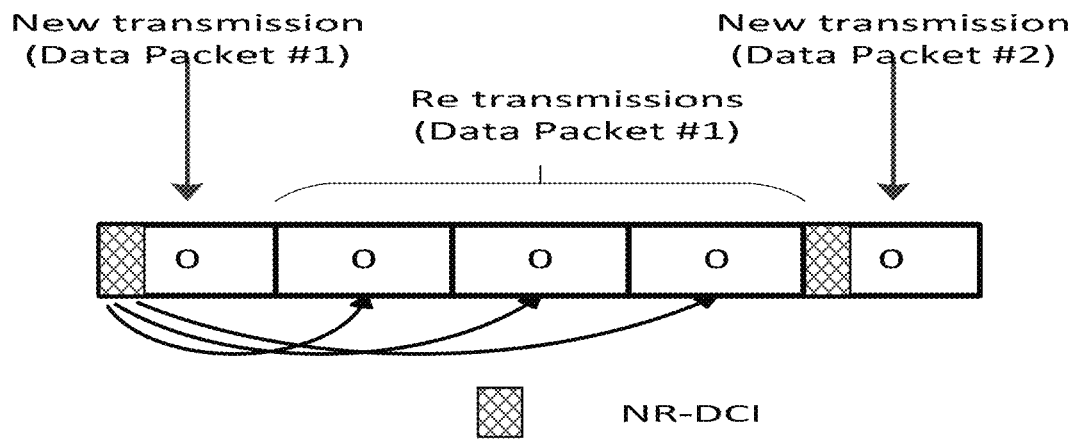
FIG. 17 shows an example of an NR-DCI configuring HARQ retransmissions in multiple subframes.

In some cases, the predefined pattern enables NR Downlink control information (NR-DCI) that provides a grant for the first (UL/DL) transmission to configure the resources and redundancy versions of the retransmissions so that subsequent retransmissions do not require explicit NR-DCI resources. For example, FIG. 17 shows a case where the transmissions of a HARQ process #0 occur with periodicity of 1 (i.e., every transmission time interval) up to a maximum of 4 times. In accordance with the example, the NR-DCI on the 1st transmission configures the resources for remaining 3 retransmissions.

Figure 18:
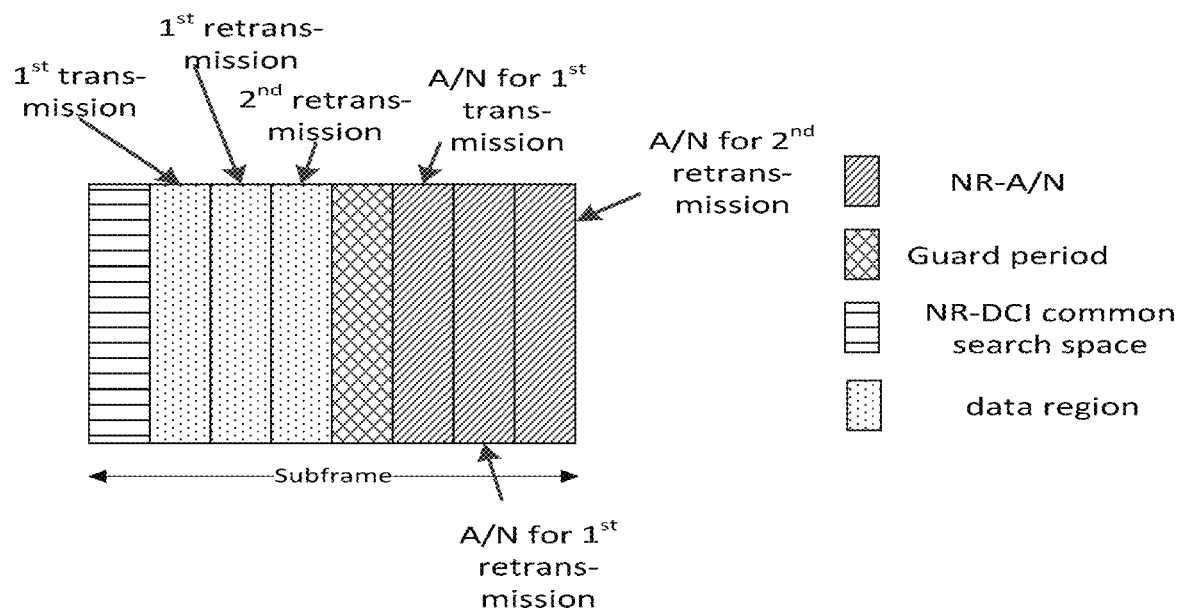
FIG. 18 shows an A/N resource allocation for transmissions and retransmissions in self-constrained subframes.

In another example, referring to FIG. 18, A/N resources are allocated to each HARQ transmission. FIG. 18 shows an example where the A/N resources are allocated for each transmission and retransmission in a self-contained sub-frame.

Figure 19:
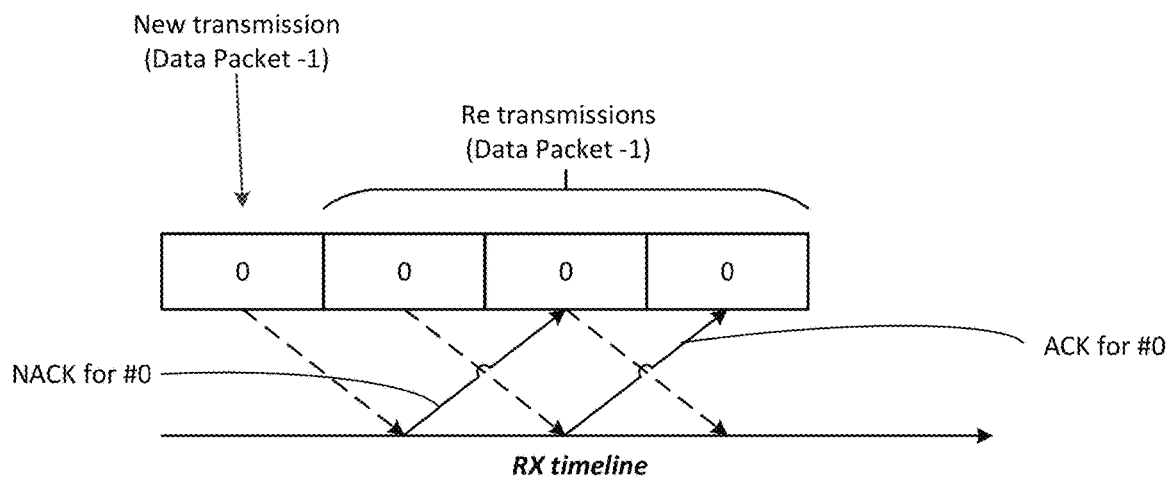
FIG. 19 shows an example of how retransmissions can occur even before an A/N is received.

Referring to FIG. 19, the HARQ retransmissions may occur prior to the expected reception of the first A/N response to the TB. This reduces the latency at the cost of increased redundancy. As seen in FIG. 19, the 1st retransmission of the HARQ process #0 occurs prior to the reception of the A/N for the 1st transmission.

Figure 20:
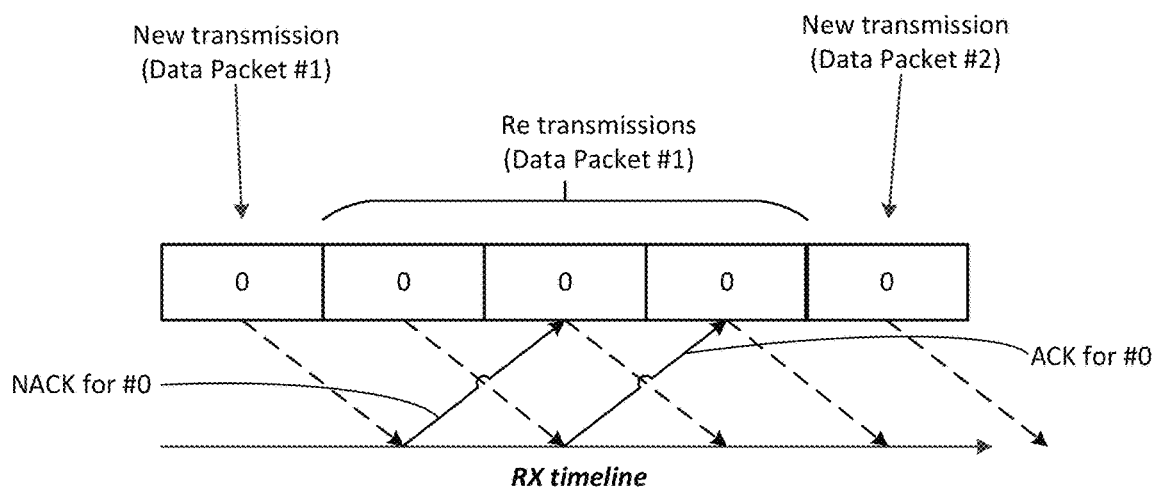
FIG. 20 shows an example of a retransmission being terminated upon receipt of an ACK.
Figure 21:
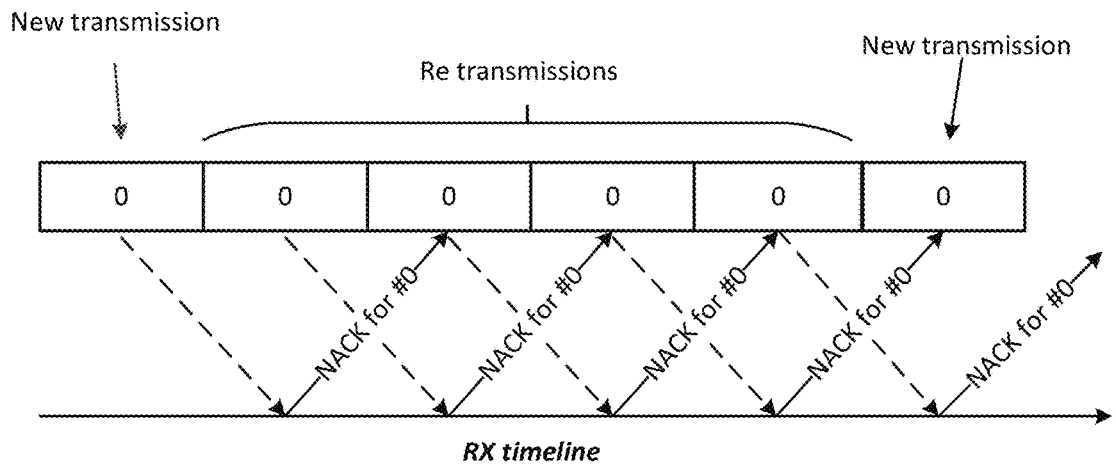
FIG. 21 shows an example of a retransmission being stopped upon reaching a maximum limit.
Figure 22:
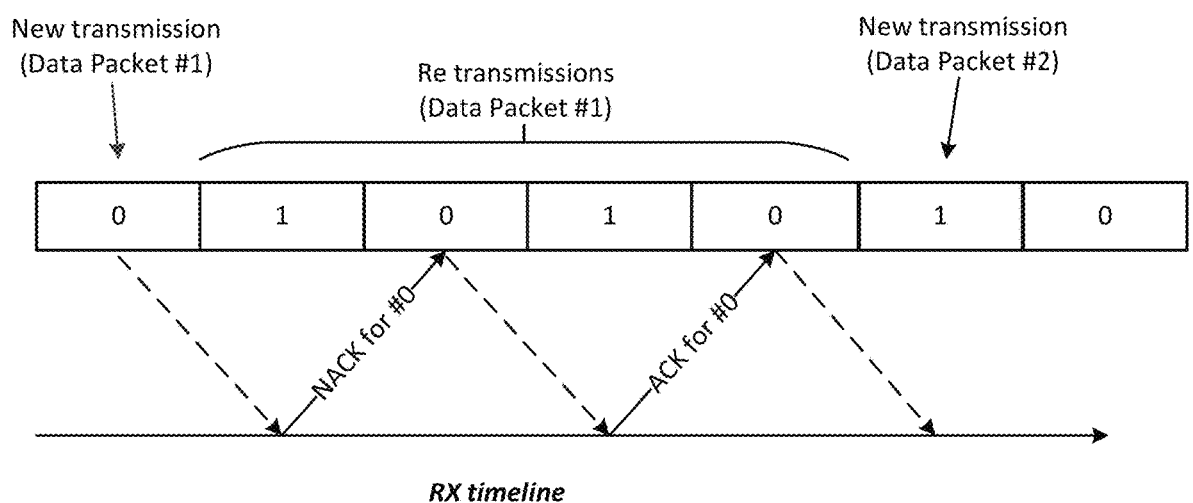
FIG. 22 shows an example retransmission where the period equals 2.

In an example, the HARQ retransmissions occur until an ACK is received or until the maximum limit L on the number of retransmissions is reached. On the reception of an ACK, additional pre-scheduled HARQ retransmissions for that TB may be discontinued. FIG. 20 shows an example where HARQ process #0 is transmitted 4 times. This includes an initial transmission and three retransmissions. When an ACK corresponding to the 1st retransmission arrives, although configured for L=4, the NR-Node stops retransmitting the HARQ and switches to a new transmission. FIG. 21 shows an example where the L=4 and HARQ process #0 is transmitted 5 times. No ACK is received within that duration of those HARQ retransmissions. Note that an A/N may be received after the last HARQ transmission. FIG. 22 shows an example retransmission where the period equals two.

Figure 23:
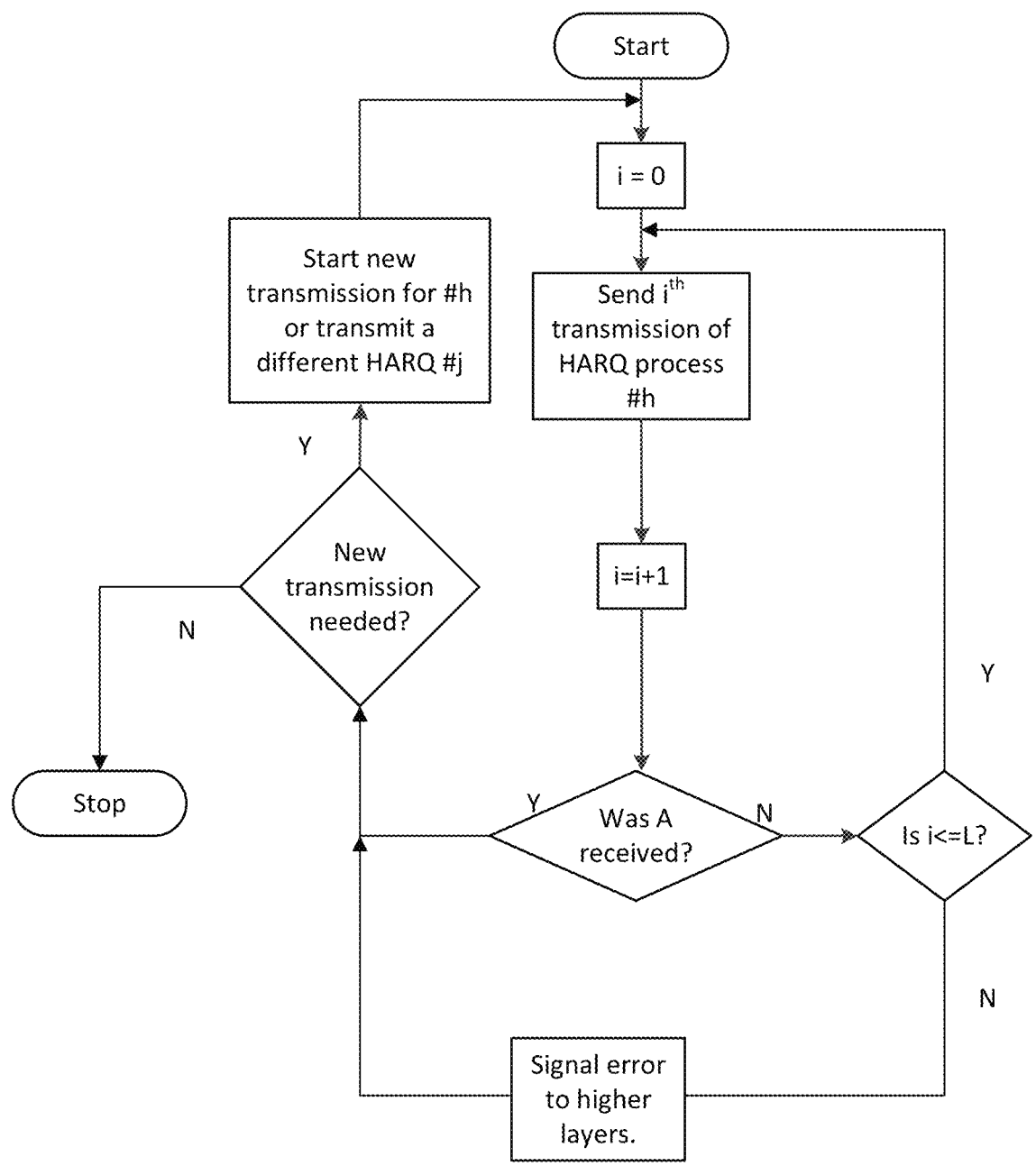
FIG. 23 shows an example method for a UE retransmitting a UL payload.

Referring to FIG. 23, an example UE procedure in the UL is shown. As shown, the UE transmits up to L retransmissions of HARQ process # h. On reception of an ACK, it terminates the retransmission. If it receives a NACK it continues to retransmit until it exceeds its maximum retransmission limit L.

In some cases, the redundancy versions (RVs) in retransmissions may be the same as the 1st transmission or different. Accordingly, the receiver may use chase combining or incremental redundancy to combine the retransmissions. The RVs of a transmission and/or subsequent retransmission may be indicated by a single or more NR-DCIs. For example, the NR-DCI granting the 1st transmission may also indicate the RVs for the retransmissions. Alternatively, separate NR-DCIs occurring in the same or different subframes may indicate a retransmission.

RVs may be predefined for the retransmissions to reduce control signaling overhead. For example, each transmission and retransmission may use the same RV. Alternatively, the RV sequence in time may be predefined (i.e., RV0, RV1, . . . RVN). Additionally, for the UL, in an example, a mode of operation is proposed where the UE may signal the RV for a transmission or retransmission through the control channel.

In an example, retransmissions may occur in numerologies different from that of the 1st transmission or other retransmissions. The numerology may be indicated through appropriate DL control signals.

Figure 24:
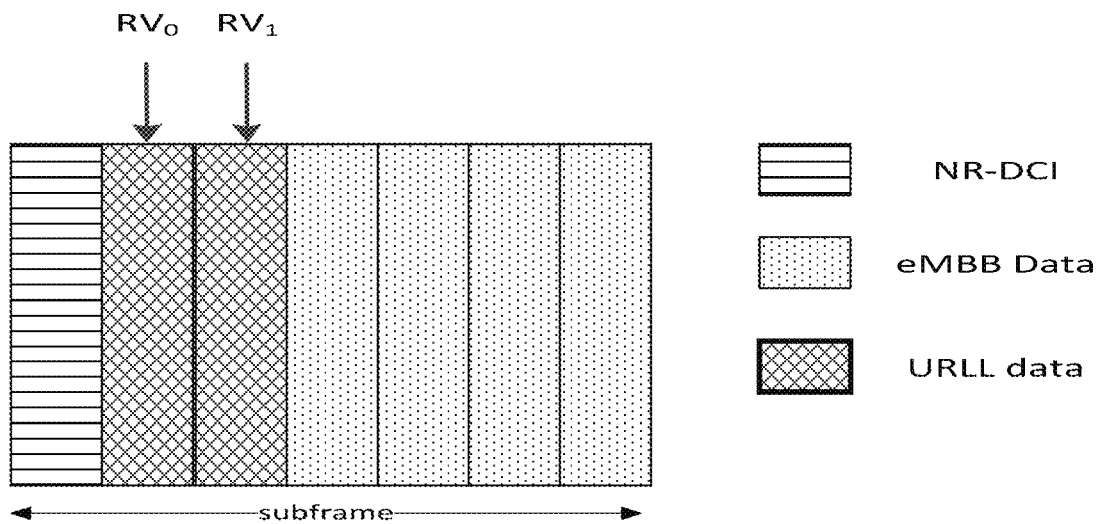
FIG. 24 shows an example of multiple RVs of a HARQ process transmitted in a single subframe.

Referring to FIG. 24, in accordance with the illustrated example, a single subframe in NR may be configured to carry multiple redundancy versions of the same HARQ process. This solution may be especially suitable in scenarios where multiple use cases such as URLLC and eMBB are multiplexed. The NR-DCI may signal this configuration to the UE. It may do so by indicating the symbols or PRBs and RV for each HARQ retransmission. Alternatively, to save control signaling overhead for example, the resources for retransmissions for a URLLC UE may be determined according to a predefined rule (e.g., the resources for L retransmissions following the new data transmission may be specified in the specification).

In the frequency domain resources, location can vary from symbol to symbol (used by each retransmission) to obtain more frequency diversity. In another example, one or more possible/allowed configurations of URLLC retransmissions can be predefined in the standards or configured by higher layer signaling (such as RRC signaling). For each new data transmission, the NR-DCI may signal the index of the configuration of URLLC retransmission to be used for this URLLC UE.

Figure 25:
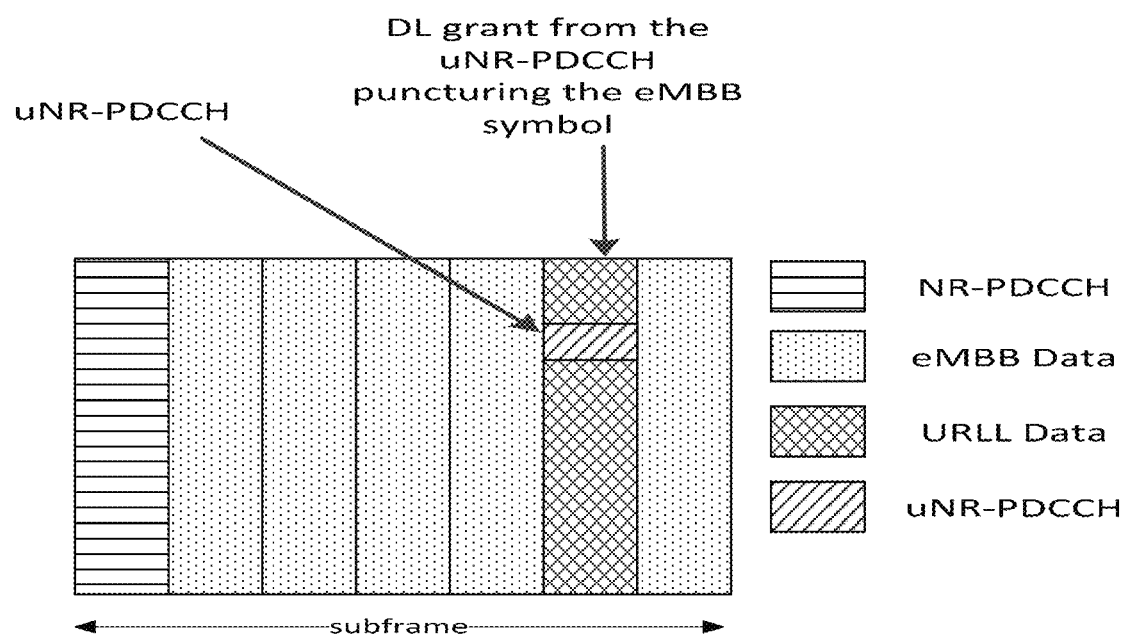
FIG. 25 shows an example of NR-DCI and NR-PDSCH for a URLL user.

Turning now to transmissions in Erasure channels in DL, URLLC grants may require to puncture an ongoing transmission in the DL. For example, FIG. 25 shows an example case where an eMBB transmission has been scheduled and is ongoing when the NR-Node receives a request to transmit a URLLC payload. So it punctures the eMBB transmission and transmits the URLL payload.

For a URLLC transmission to be scheduled in this manner on the DL, the NR-PDCCH has to be defined so that a URLLC UE can monitor its grant. In an example embodiment, user-specific DL control signaling on uNR-PDCCH can be provisioned in resources predefined through the standards and configured by the RRC. Note that uNR-PDCCH resources may be shared between multiple UEs—so a UE may decode its uNR-PDCCH resources and look for its CRC to pass to obtain it NR-DCI.

Figure 26:
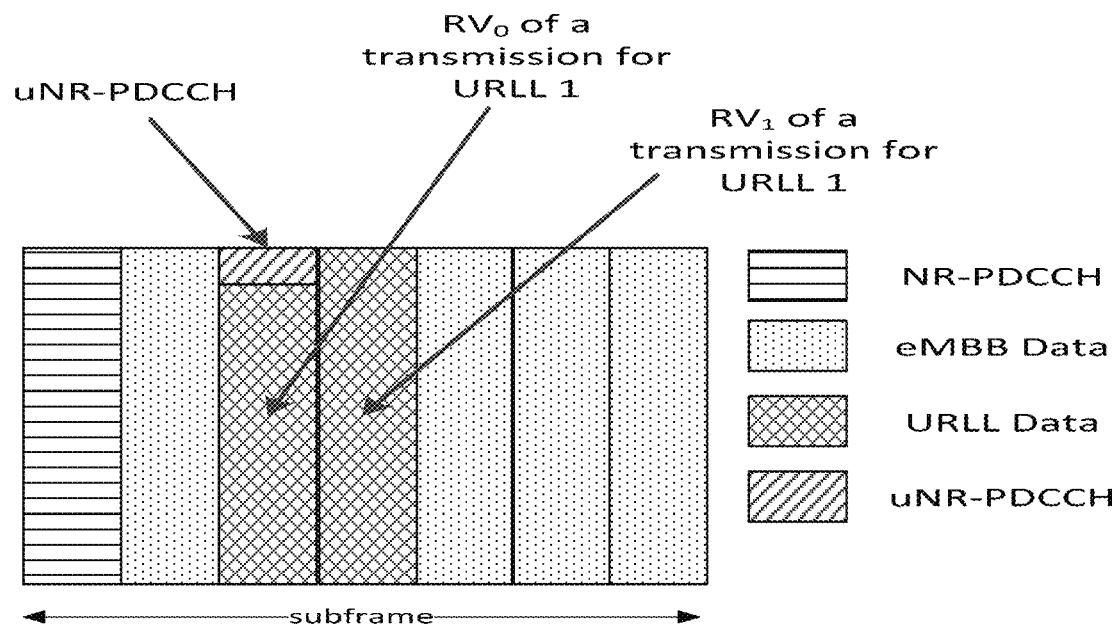
FIG. 26 shows an example of uNR-PDCCH assignments for multiple RVs of a data packet.

The URLL UE monitors its uNR-PDCCH resources and on successfully detecting its NR-PDCCH, it processes its grant. If no NR-PDCCH is scheduled in these locations, the resources are used to carry data for other UEs, otherwise the uNR-PDCCH punctures the eMBB transmission (this may be transparent to the eMBB user who loses a few bits from the puncturing). This is similar to ePDCCH in LTE but the number of symbols over which the NR-PDCCH is allocated should be restricted to as few symbols as possible to reduce latency. FIG. 26 shows an example of the NR-DCI for such a URLL NR-PDCCH transmission. For minimizing latency, the entire URLL transmission is sent in a single symbol as an example—this includes the uNR-PDCCH for the URLL UE.

Figure 27:
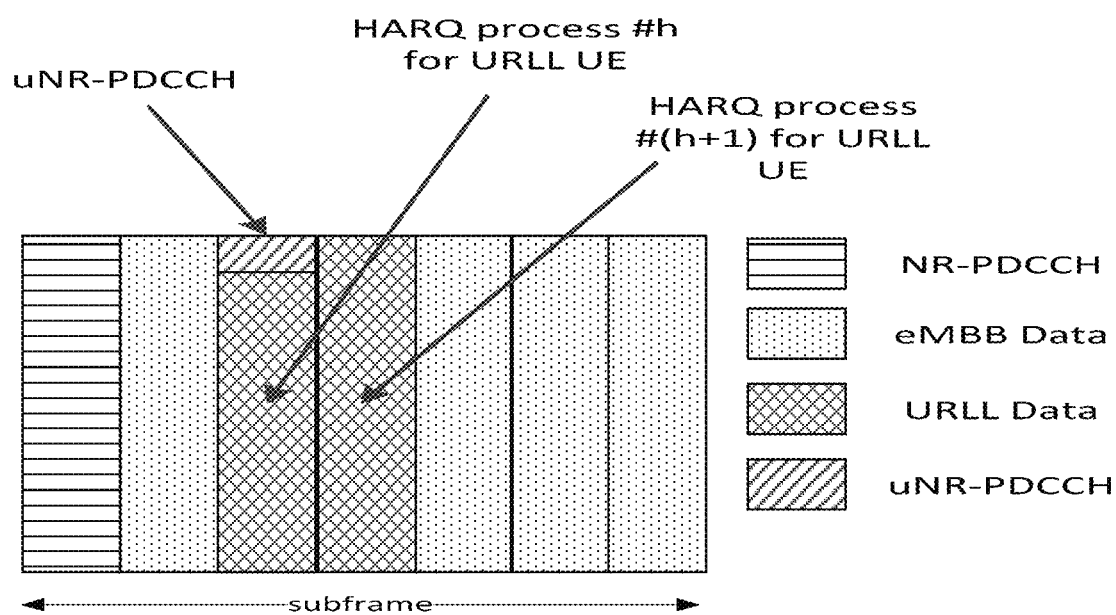
FIG. 27 shows an example of uNR-PDCCH assignments for multiple HARQ processes.
Figure 28:
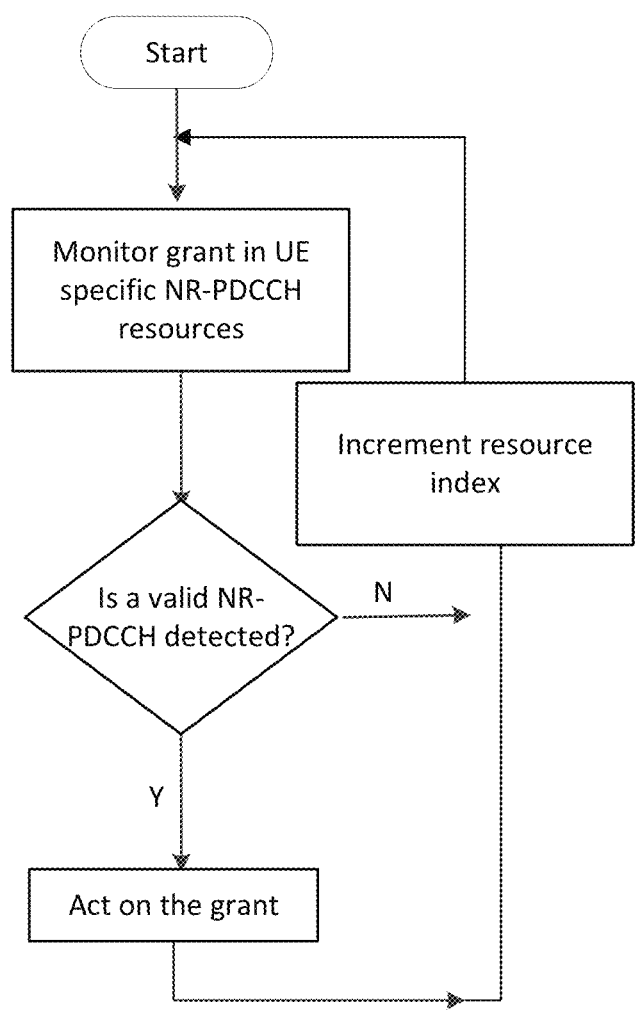
FIG. 28 shows an example of a URLL UE procedure for receiving a grant.

In an example proposed herein, an uNR-PDCCH may assign multiple URLL transmissions in the same or subsequent symbols of the uNR-PDCCH resources. For example, as shown in FIG. 26, an uNR-PDCCH may assign a symbol for a transmission with RV0 and a subsequent symbol for retransmission with RV1. Alternatively, an uNR-PDCH may provide resources for transmitting HARQ process # h and process # (h+1) as shown in FIG. 27. The corresponding URLL UE procedure is shown in FIG. 28. The URLL UE is configured to receive its DL grant in its uNR-PDCCH resources. If it finds a valid NR-DCI grant, it acts on the grant. Otherwise it continues to monitor the next set of user-specific NR-PDCCH resources.

In some cases, the eMBB transmission may be affected due to the puncturing. To solve this problem, for example, the NR-Node may use any of a number of retransmission strategies. For example, the NR-Node may retransmit either the entire TB or a part of the TB containing the punctured portion (such as the punctured RBs or CBs). The NR-Node may retransmit before receiving the A/N response.

Similarly, the NR-Node may indicate information about the retransmission as part of the HARQ information. Some of the signaled NR-DCI information may include, for example, information on what part of the TB the retransmission corresponds to. This could be in terms of parameters such as CBs or PRBs or symbols.

Additionally or alternatively, the information about the retransmission may pertain to which part of the retransmission is subject to erasure. This is important because the UE may know if it should discard the punctured part or chase combine with the corresponding part of the retransmission. This information may be indicated as a puncturing pattern from a set of predefined patterns.

Figure 29:
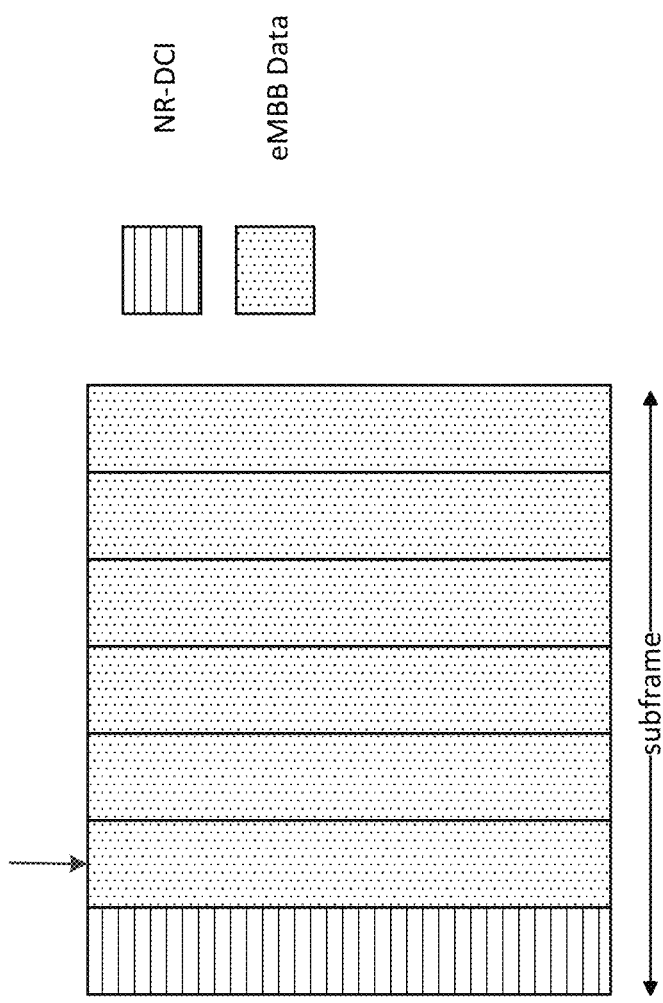
FIG. 29 shows an example of selectively not puncturing some resources to maintain eMBB performance.

In another example, the NR-Node may assign DL URLL grants only on resources that do not puncture locations carrying the MAC CE of eMBB transmissions. This is possible in scenarios, for example, where TB is broken into multiple CBs for large payloads, and the puncturing could be selective to avoid eMBB CBs containing MAC CEs. FIG. 29 shows an example where the NR-Node does not puncture the 1st available data symbol in a subframe as it contains the MAC CE for the eMBB user.

Figure 30:
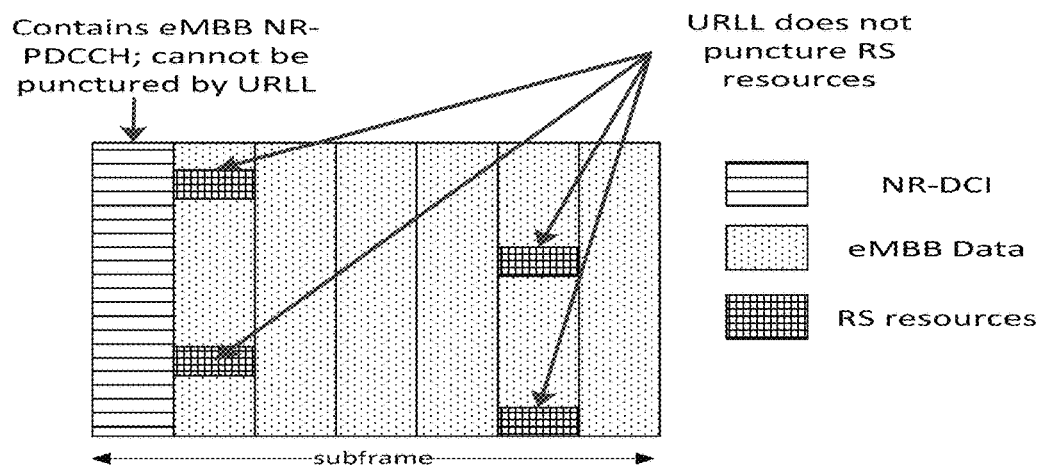
FIG. 30 shows Control and RS signaling not being affected by URLL transmission.

In yet another example, the NR-Node may assign DL URLL grants only on resources that do not puncture NR-DCI and reference signals for other use cases. This may be important because NR aims to have flexible configuration for control signaling and RS. The NR-node may indicate the resources where the control signals and RS are present. Alternatively, the control signals and RS may puncture the URLL transmission and the URLL UE might not know of the presence of the control and RS signals. FIG. 30 shows an example scenario where the URLL transmission's resources do not affect the control and RS signals of the eMBB transmission. In an example, one URLL transmission is not to be punctured by another URLL transmission.

Currently in LTE when a DL transmission must be scheduled, the UE is paged through P-RNTI. Then the UE monitors the DCI for a grant. Idle UEs have to establish RRC to start receiving DL grants as they have to be able to send A/N on the UL. For URLL UEs, this process is slow, as the latency between paging and receiving a DL grant can run into several tens of ms. To resolve this latency problem in NR, in accordance with an example embodiment, it is proposed herein that the subframe carrying the P-RNTI also provide a DL grant to the UE. Note that the DCIs may be different for P-RNTI and the DL grant.

The UE may respond in a number of ways. For example, the UE may send A/N in a grantless UL transmission if RRC connection is not established, whereby the UE establishes RRC and then sends an A/N. The NR-Node may provide A/N resources after sufficient time to enable RRC connection. It will be understood that this solution may work for mMTC UEs as well, as it minimizes the on time by providing a grant along with the paging.

Figure 31:
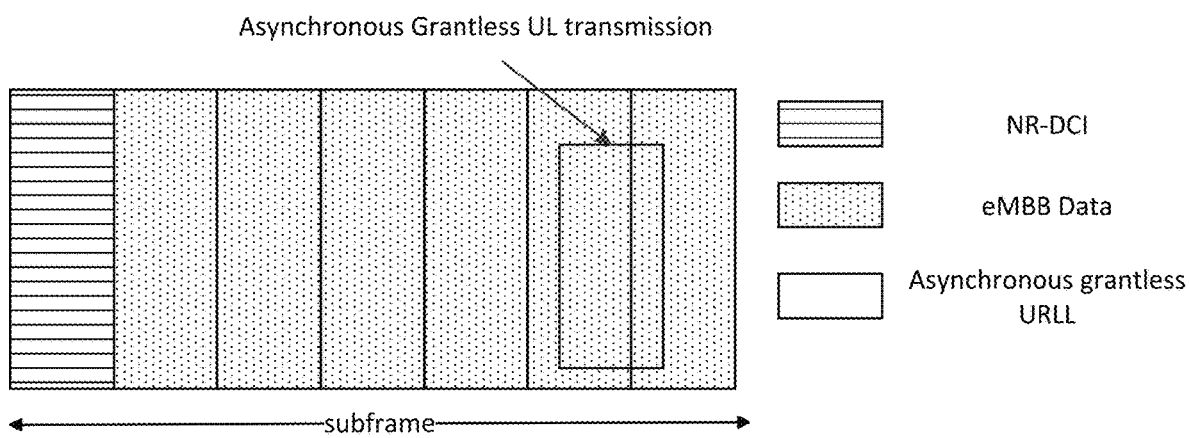
FIG. 31 shows an example of UL grantless transmission interfering with scheduled eMBB subframe.

Turning now to enhanced HARQ procedures for UL grantless transmissions, NR will support asynchronous grantless UL transmissions. It is recognized herein that the resources for grantless transmission may collide with scheduled UL transmissions. So a scheduled transmission may suffer from interference from grantless transmissions. The NR-Node may detect this collision. FIG. 31 shows an example of how the interference may affect the scheduled transmission. In such a scenario, various embodiments described below may enhance HARQ and A/N performance in such a scenario.

In one example, the NR-Node schedules a HARQ retransmission (for example for an eMBB device) asynchronously if it detects a failure on a scheduled transmission due to interference from a grantless transmission (for example from URLL device). In some cases, the NR-Node only transmits the portion of the TB affected by the interference. The NR-Node may do this by transmitting all or part of the affected symbols or CBs or PRBs.

In some cases, the NR-Node may need a mechanism to send an acknowledgment if it correctly receives a grantless transmission. In one example, the NR-Node responds with certain types of NR-DCI as an implicit acknowledgement of the grant-less transmission. For example, certain types of UE-specific NR-DCI may be provided. For example, a new DCI called ACK-DCI may be defined to be a user-specific DCI indicating an ACK. Other existing DCI formats such as those for DL or UL grants may be used to implicitly acknowledge the grantless transmission. Alternatively, new DCI formats using grants piggybacked with the ACK may be used to explicitly indicate the ACK.

In yet another example, the UE may select its signature from a pool of available resources, such as codes or preambles, as RRC connection might not be established and a C-RNTI might not be available to the UE. If the pool of resources is finite, there may be contention and the NR-Node has to provide for contention resolution, in some cases.

In an example, the NR-Node defines a GL-RNTI (Grant-Less RNTI) similar to RA-RNTI to provide a response to the grantless UE. Through the GL-RNTI the NR-Node indicates a PDU carrying the identities or signatures of the UEs whose grantless transmissions were received. FIG. 32 shows an example of the MAC PDU indicated by the GL-RNTI. It consists of several MAC GLARs (GrantLess access response) preceded by a header. Each GLAR may provide one or more of the following information, presented by way of example and without limitation: a signature of the grantless UE; and a timing advance command so that UE can synchronize in the UL for further transmissions.

In an example contention-free system, the user signatures are unique and the UE can be unambiguously determined from its signature. Here, if the UE receives a GLAR containing its signature, it may assume that the transmission was acknowledged. FIG. 33 shows this 2-step process where the UE makes a grantless transmission in Step 1 and is acknowledged with the GLAR in Step 2. However, if contention can occur in the system due to limited resources for example, another step may be required to resolve the contention after which the UE can assume acknowledgement. FIG. 34 shows this example process (similar to the Random access procedure in LTE). The UE makes a grantless transmission in Step 1. It received the GLAR in Step 2 with its signature indicating that the NR-Node received a transmission. But it is possible that other UEs with the same signature also attempted grantless transmissions at the same time as the UE of interest. To resolve this contention, the UE may send its identity through a scheduled UL transmission in Step 3. In the Step 4 the NR-Node transmits a contention resolution message indicating which UE was served during the UL grantless transmission. This provides implicit acknowledgement to the UE.

In an example, this implicit acknowledgement through NR-DCI occurs within some maximum timeframe to meet the latency requirements of the UE. The acknowledgement may be scheduled to be transmitted at fixed time after the reception of the transmission, example 'T µsec/msec' after the reception. Alternatively, it may be sent 'S' subframes following the reception of the UL transmission. In some cases, it may advantageous to schedule this NR-DCI with minimal latency (e.g., as early as possible) for both URLL and mMTC as the wait time and radio on-time at the UE is reduced.

In another example, if the RRC connection is already established prior to the grantless transmission, the NR-Node may acknowledge the grant through an NR-DCI that may make a grant or power control. If the grantless UL transmission is correctly decoded, the NR-Node may indicate an ACK in a new NR-DCI format. This NR-DCI format may provide 1 or more bits to A/N the grantless TBs. If the control information from the grantless transmission is correctly decoded, but data is incorrectly decoded as it fails CRC check, the NR-Node can detect the UE and NACK the transmission.

Alternatively, explicit A/N signaling may be supported for UL grantless transmission. Here, in a manner similar to PHICH in LTE, A/N resources may be allocated in the form of NR-PHICH (New Radio-Physical HARQ Indicator Channel). A/N may be signaled on the Nth (where N is predefined by the spec or configured through system information) DL subframe from the time of transmission in the following ways.

This may be achieved in a number of ways. For example, If RRC is not established, it may be signaled on resources corresponding to the user signature and predefined in the spec. If RRC is already established, it may be signaled on resources preconfigured through RRC or on resources may be implicitly tied to the UL grantless transmission resources. In some cases, these NR-PHICH puncture the data for other use cases so that these resources are not exclusively reserved and unused in the absence of grantless transmissions—this is different from LTE where the PHICH resources are reserved exclusively for PHICH transmission.

Figure 35:
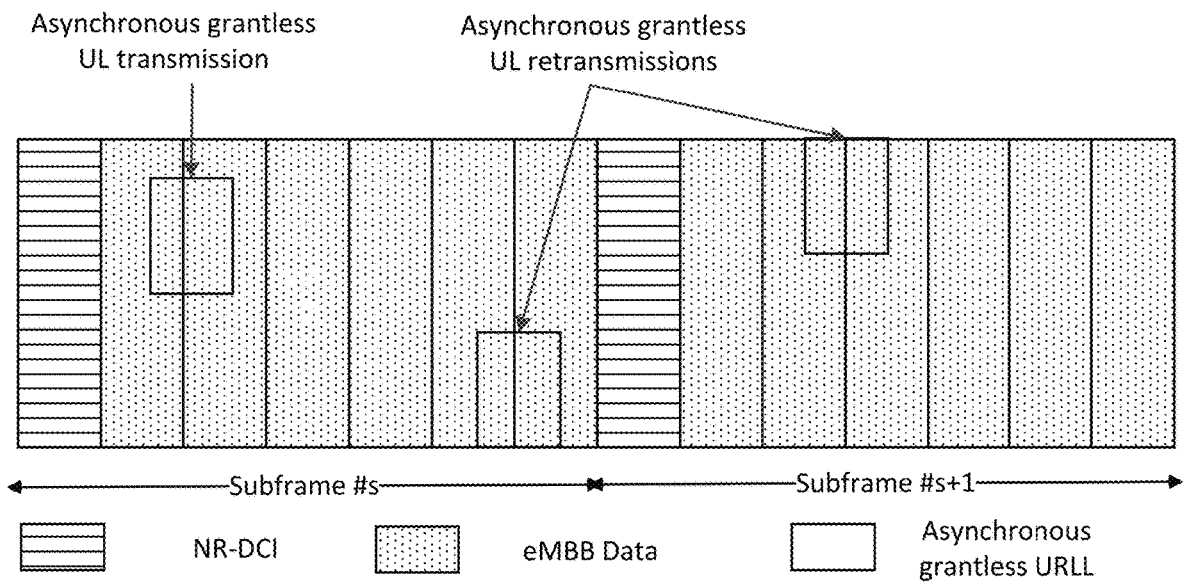
FIG. 35 shows an example of UL Grantless retransmissions over eMBB.

In another example, UL grant-less transmission use a single HARQ process especially when operating in the RRC connectionless mode. In some cases, a grant-less transmission may fail to be decoded by the NR-Node. In this case, the NR-Node might not know that such a transmission occurred and cannot NACK it. For increased reliability, for example, we propose that in some cases the UE retransmit its grantless transmission multiple times until acknowledgement from NR-Node is received or the transmission timer times out (or reaches the maximum allowed number of retransmissions). The resources for the transmission and retransmission may be drawn from a set of predefined resource configurations. The retransmissions may occur on a particular beam or on multiple beams. FIG. 35 shows an example of such retransmissions, which may occur before A/N is received.

In LTE, for the turbo code, RV0 has the highest reliability. The other RVs provide incremental redundancy and are not independently decodable with the same reliability as RV0. However if NR uses a similar design for UL grantless transmission, if the 1st UL grantless transmission is not received by NR-Node, incremental redundancy from subsequent retransmissions might not help. So, in an example embodiment, the codes used for grantless transmission have redundancy versions that are equally decodable with similar reliability. An example of such a configuration is to use a single redundancy version for all retransmissions (e.g., retransmissions are the same as the original transmission).

Figure 36:
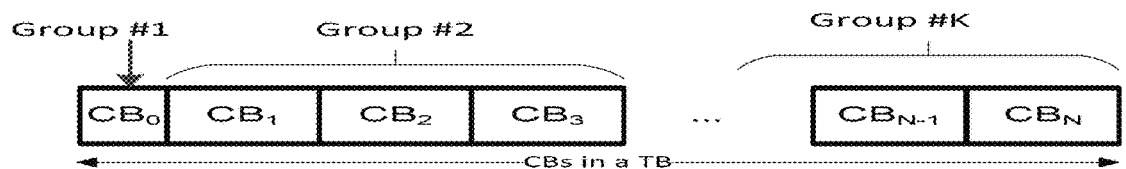
FIG. 36 shows an example of CBs grouped in K groups, each with its own A/N.

Turning now to enhanced A/N signaling and partial retransmission of transport block, in LTE the TB has a 24-bit CRC. If the TB is larger than 6144 bits it is segmented into CBs. One A/N is transmitted by the receiver in response to an entire TB regardless of the number of CBs within it. For large payload applications such as eMBB in NR, in some cases, it is proposed herein that a more fine grained A/N response be used, wherein K bits are provisioned for A/N response to a TB. The K bits correspond to K A/N bits from K groups of CBs. The CBs in the TB may be grouped into K groups as shown in FIG. 36. Each group sends an ACK bit if all CBs in the group were decoded successfully, and each group sends a NACK bit if any one of the CBs in that group is decoded incorrectly. Note that when K=1, the solution reverts to that in LTE. In the extreme case when K is equal to the number of CBs, there is an A/N bit for each CB. For such a case the TB may not be encoded with the outer CRC.

Figure 37:
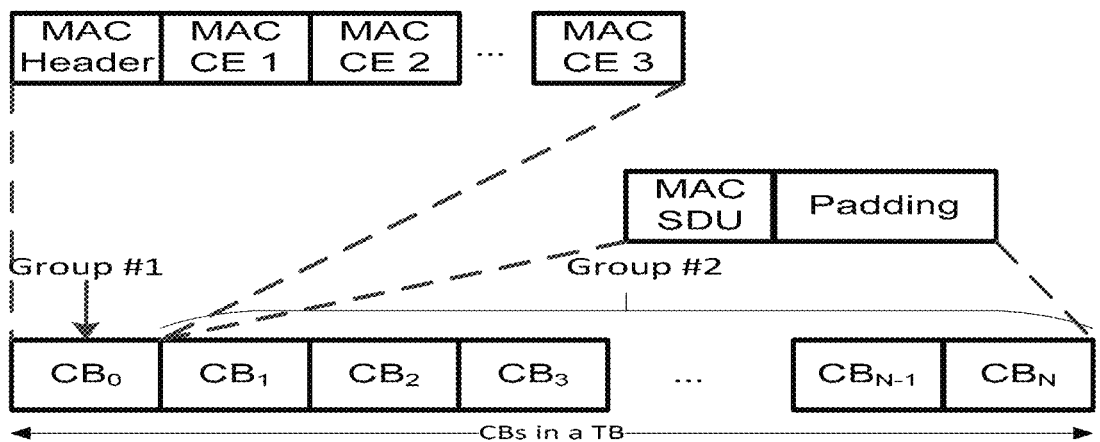
FIG. 37 shows an example of Header and MAC CEs in one group with its own A/N.

In an example embodiment, the groups can contain an unequal number of CBs and unequal number of coded bits. Prior to encoding, the CBs may themselves contain different number of bits. For example, as shown in FIG. 37, one group may be composed of CBs containing only the MAC header and MAC CEs. The other group may contain the MAC SDUs. This configuration requires K=2, which provides finer ability to control the reliability of MAC CE but the additional overhead is small. In an example, the K may be configurable depending on the payload and that NR-Node configures the UE for K through RRC and MAC CE and/or NR-DCI.

Figure 38:
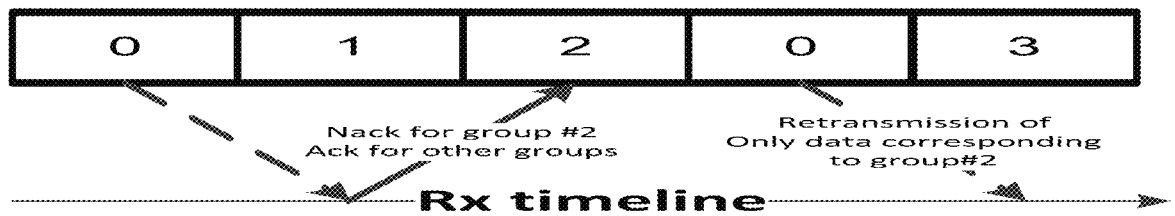
FIG. 38 shows an example of a Retransmission of Nacked CBs.

In an example, the NR-Node responds to the A/N with a retransmission of only the part/parts which responded with a NACK (not transmit the entire TB), thereby utilizing resources more efficiently. As shown in an example in FIG. 38, the retransmission may carry information in the NR-DCI about the parts of the TB that are being retransmitted and the corresponding redundancy versions.

Figure 39:
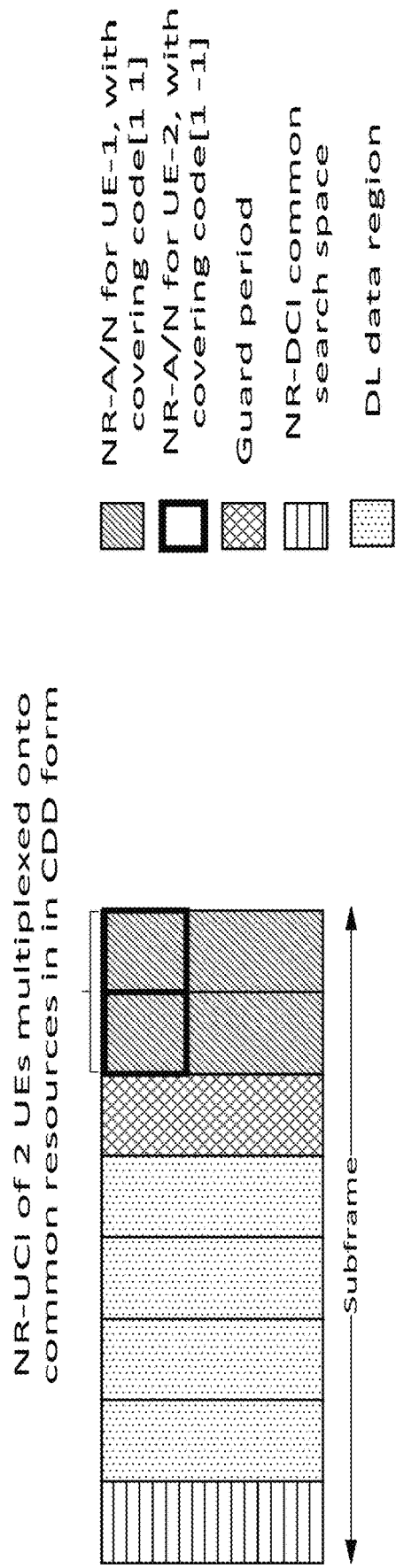
FIG. 39 shows an example of a different number of A/N resources for users multiplexed in CDM.

Turning now to improving A/N performance in UL, in an example, the number of A/N resources allocated to the UE is based on the use case. For example, the resources allocated for URLL A/N may be double or quadruple compared to those for eMBB. In another example, it is proposed that NR support variable A/N resource allocation even within a particular use case. For example, the number of resources may depend on UE power, channel conditions, or the like. FIG. 39 shows an example where the different amounts of A/N resources are provisioned for two users who are multiplexed using CDM. These solutions use resources efficiently to prevent excessive overhead signaling.

Figure 40:
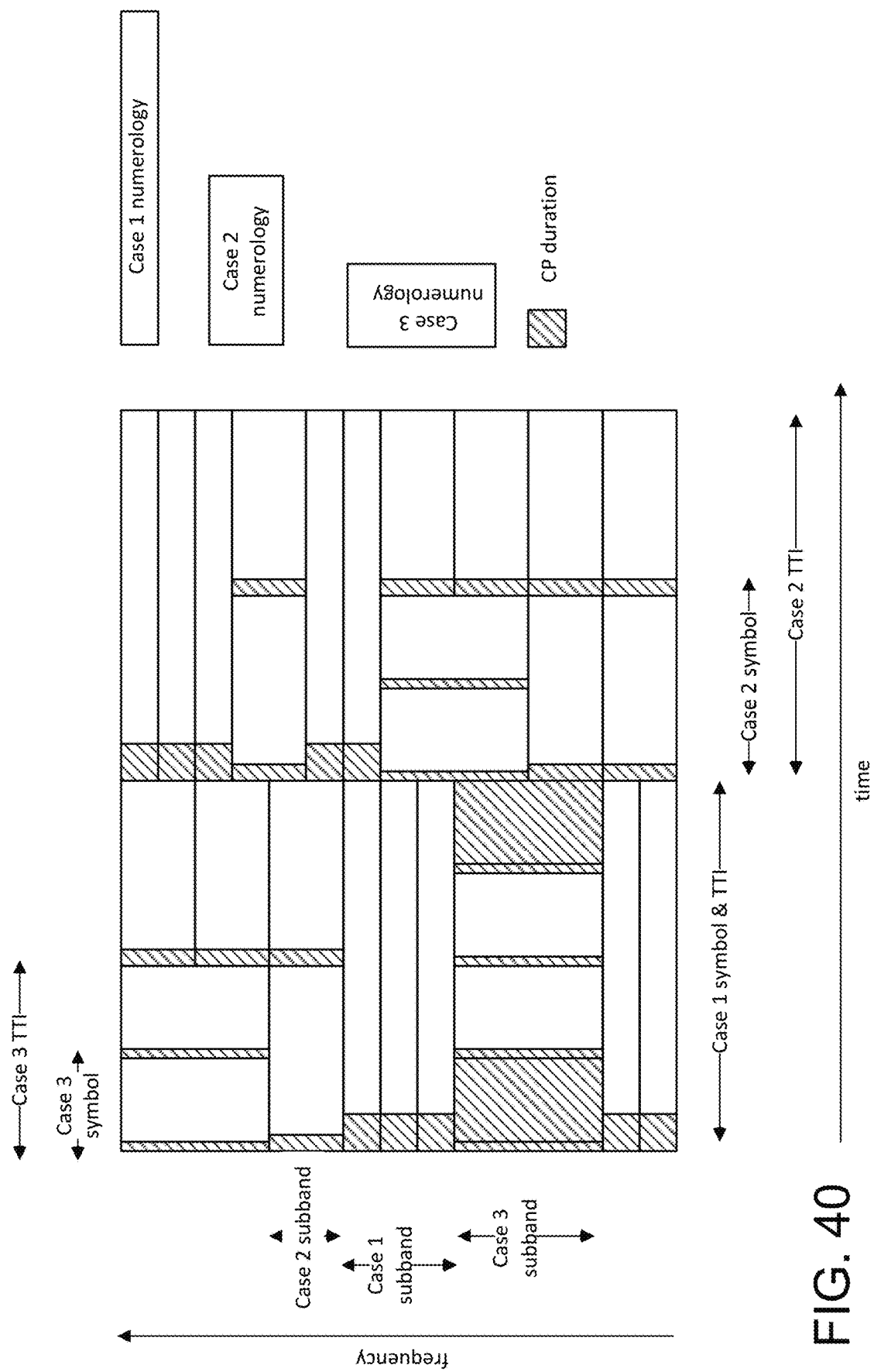
FIG. 40 shows an example resource grid for multiplexed numerologies.

FIG. 40 shows an exemplary configuration of multiplexed numerologies for 5G belonging to numerologies of case-1, case-2 and case-3. The numerology of the PHICH must be known at the terminal in order to successfully decode the A/N. While PHICH numerology may be configured to change dynamically, doing so will increase the control signaling overhead. The problems of latency and resource sufficiency may be addressed through solutions providing additional PHICH resources to support a large number of UL sTTIs and support more frequent PHICH transmissions. For example, UL transmission may support flexible A/N timelines in order to minimize the frequency of PHICH signaling and to accommodate scenarios where the UE processing time may not scale down linearly especially as sTTI duration is reduced to very short lengths. In such a solution, every sTTI duration is associated with a minimum and maximum A/N latency tolerance, e.g., "min_response" and "max_response" respectively according to a predefined mapping. The PHICH response to an UL transmission in the kth signaling time interval is transmitted by the eNodeB within a timing window, referred to herein as a "tolerance window" and defined by the duration between k+minResponse and k+maxResponse. Note that in LTE up to LTE release 13, minResponse=4 ms and maxResponse=4 ms for FDD.

Table 6 shows exemplary configurations of minResponse and maxResponse for different slices for 5G. Here the minResponse and maxResponse times scale linearly as do the sTTI durations and may be expressed as shown Equations 2 and 3 below.

$$\text{maxResponse} = k*\text{sTTI} \qquad \text{Equation 2}$$

$$\text{minResponse} = (k-\Delta)*\text{sTTI} \qquad \text{Equation 3}$$

Therefore, the tolerance window is equal to $\Delta*\text{sTTI}$.

TABLE 6

Exemplary configurations of minResponse and maxResponse for k = 4, Δ = 1

| Example sTTI configuration | sTTI duration | minResponse | maxResponse | Tolerance window |
|---|---|---|---|---|
| 1 LTE symbol | 0.0714 mS | 0.21 mS | 0.3 mS | 0.9 mS |
| 2 LTE symbols | 0.1428 mS | 0.42 mS | 0.6 mS | 0.18 mS |
| LTE slot duration | 0.5 mS | 1.5 mS | 2 mS | 0.5 mS |
| LTE TTI | 1 mS | 3 mS | 4 mS | 1 mS |

Figure 41:
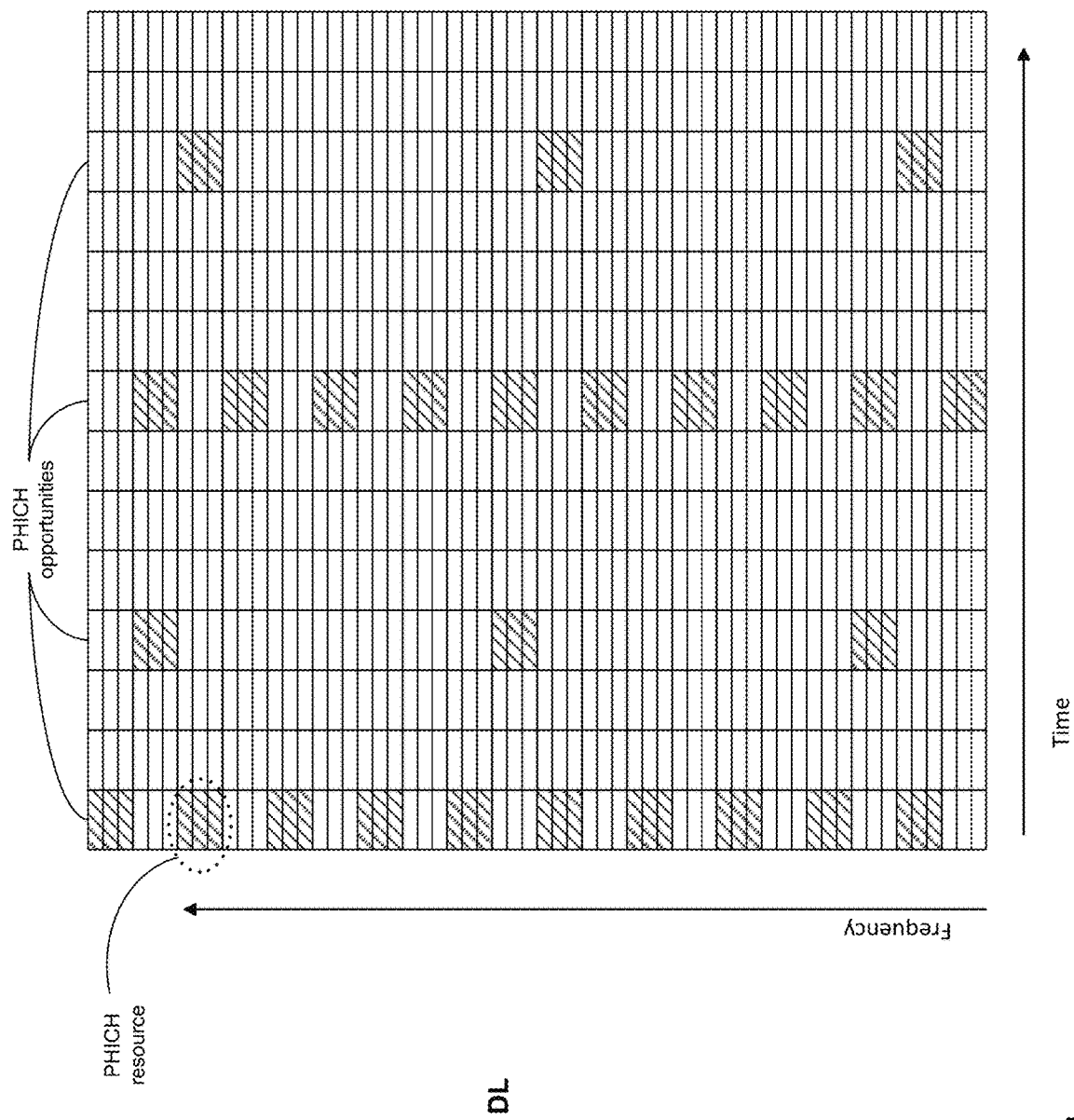
FIG. 41 shows an example resource grid with PHICH opportunities in a DL signaling interval.
Figure 42:
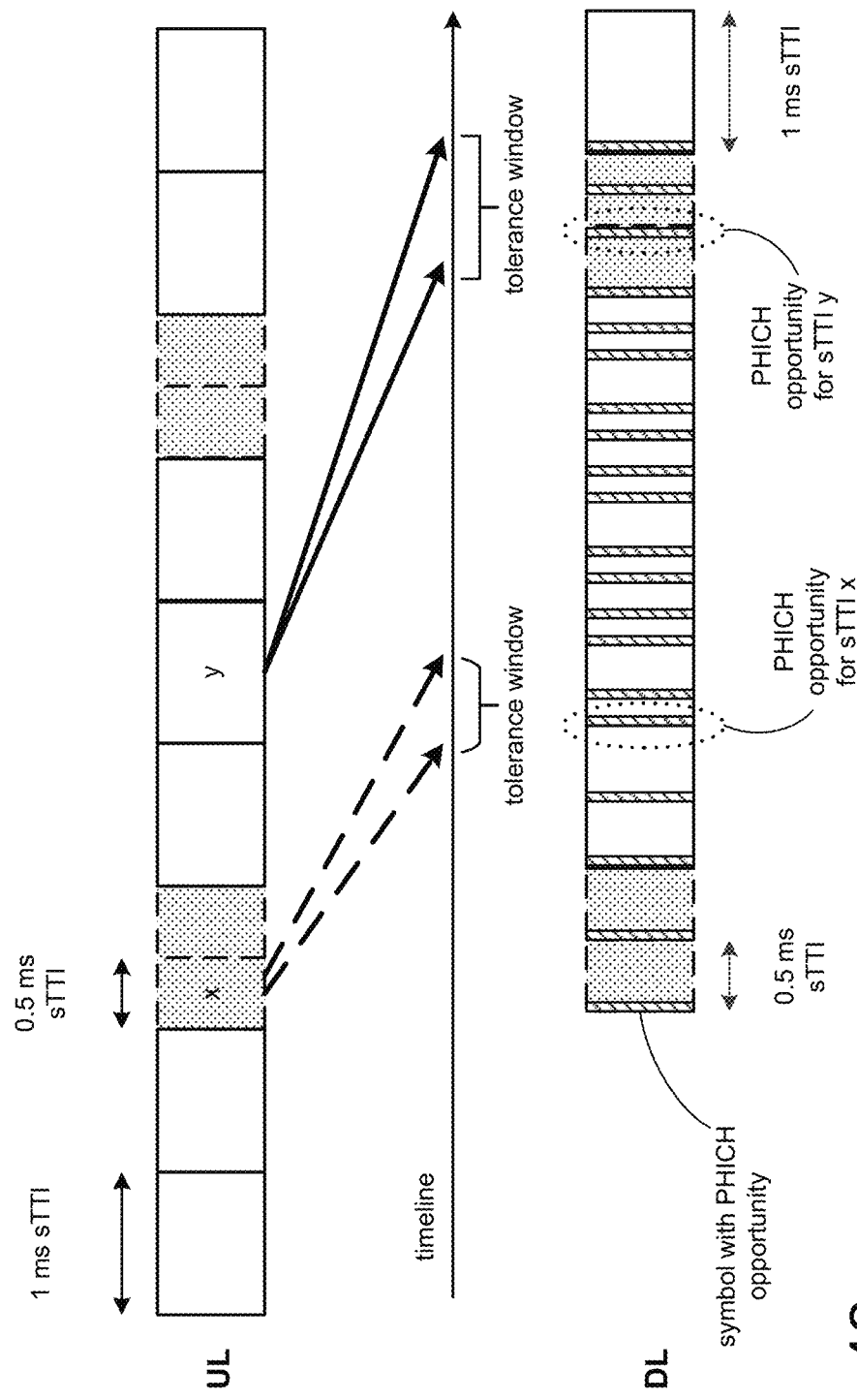
FIG. 42 shows an example timing sequence for ACK/NACK (A/N) signaling using sTTIs of different durations.

Additional PHICH resources with appropriate latency may be provided through a "PHICH opportunity," e.g., a symbol duration when PHICH is signaled in the DL, whereby the terminal expects an A/N for a UL transmission in the $N^{th}$ PHICH opportunity within its tolerance window. In other words, each PHICH opportunity corresponds to a pool of reserved PHICH resources in one or more symbols. FIG. 41 shows an exemplary configuration of PHICH opportunity in a DL signaling interval and FIG. 42 shows an exemplary configuration of A/N signaling using N=1 and sTTIs of different durations and consequently different tolerance windows.

Where a UE obtains knowledge of the parameters N, maxResponse, and minResponse, and the PHICH opportunity configuration, the UE may set its timer to locate its PHICH opportunity for an UL transmission of sTTI of duration S as a symbol occurring at p*S+m starting from its own transmission time, where p denotes the integer number and m denotes the number of symbols, or equivalently denotes the fraction of sTTIs, between the UL transmission time and PHICH opportunity sTTI.

Figure 43:
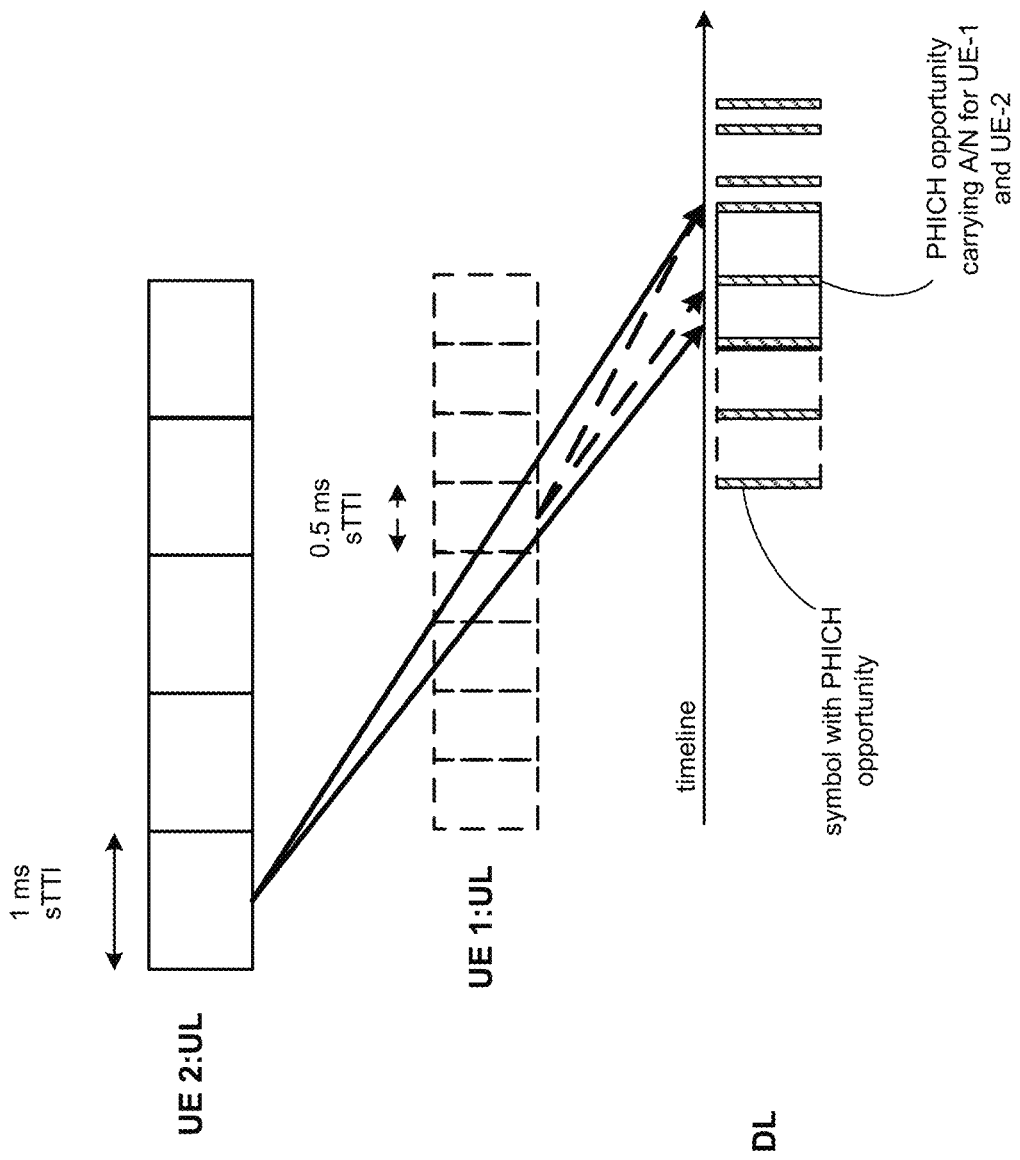
FIG. 43 shows an example timing sequence for ACK/NACK (A/N) signaling for two User Equipment (UE) nodes where the A/Ns are multiplexed.

Multiple UEs may have their A/Ns multiplexed on to the same PHICH opportunity regardless of their sTTIs durations as shown in FIG. 43.

The PHICH opportunity may be configured semi-statically through system information, such as the equivalent of the MIB or SIB in LTE, and be subsequently updated through a MAC's CE. This configuration defines the symbols in which PHICH will be signaled within a TTI and the PHICH resources within that symbol.

In computer code Example 2, PHICH-Symbols lists the symbols in a transmission duration that carry PHICH. PHICH-Resources indicate the resource allocation for each of the symbols in the PHICH-Symbols list.

Example 2

Exemplary Fields for PHICH Opportunity Indication Via MIB or SIB or MAC's CE

| phich-Config ::= | SEQUENCE { |
| --- | --- |
| phich-Symbols | PHICH-Symbols, |
| phich-Resource | PHICH-Resource |
| } | |

Table 7 shows examples of configuration of phich-Symbols and phich-Resource for the proposed solution. For each phich-Symbol carrying the PHICH opportunity, the phich-Resource may be drawn from a set of pre-defined values such as $N_g \in \{1/6, 1/2, 1, 2\}$.

TABLE 7

Exemplary configurations of phich-Symbols and phich-Resource assuming TTI length of 1 mS and 14 symbols in the TTI

| Example # | PHICH-Symbols | PHICH-Resource ($N_g$) | Comment |
| --- | --- | --- | --- |
| 1 | 0 | 1/6 | Currently used in LTE |
| 2 | 0, 7 | 1/6, 1/2 | Exemplary |
| 3 | 0, 3, 7, 10 | 1, 1/6, 1/2, 1/6 | configurations for 5G |

The sTTI parameters N, min_response and max_response for the may be pre-defined in the 5G spec for each sTTI, or alternatively assigned to a terminal via system information such as SIBs in LTE. Computer code Example 3 shows an exemplary configuration of parameters min_response_k and max_response in_k for the $k^{th}$ TTI length in a SIB. Subsequently a MAC's CE may reconfigure the values.

Example 3

Exemplary Assignment of Min_Response and Max_Response Through SIB

| ToleranceWindowInfo ::= | SEQUENCE { |
| --- | --- |
| minResponse_k | MinResponse_k |
| maxResponse_k | MaxResponse_k |
| } | |

Figure 44:
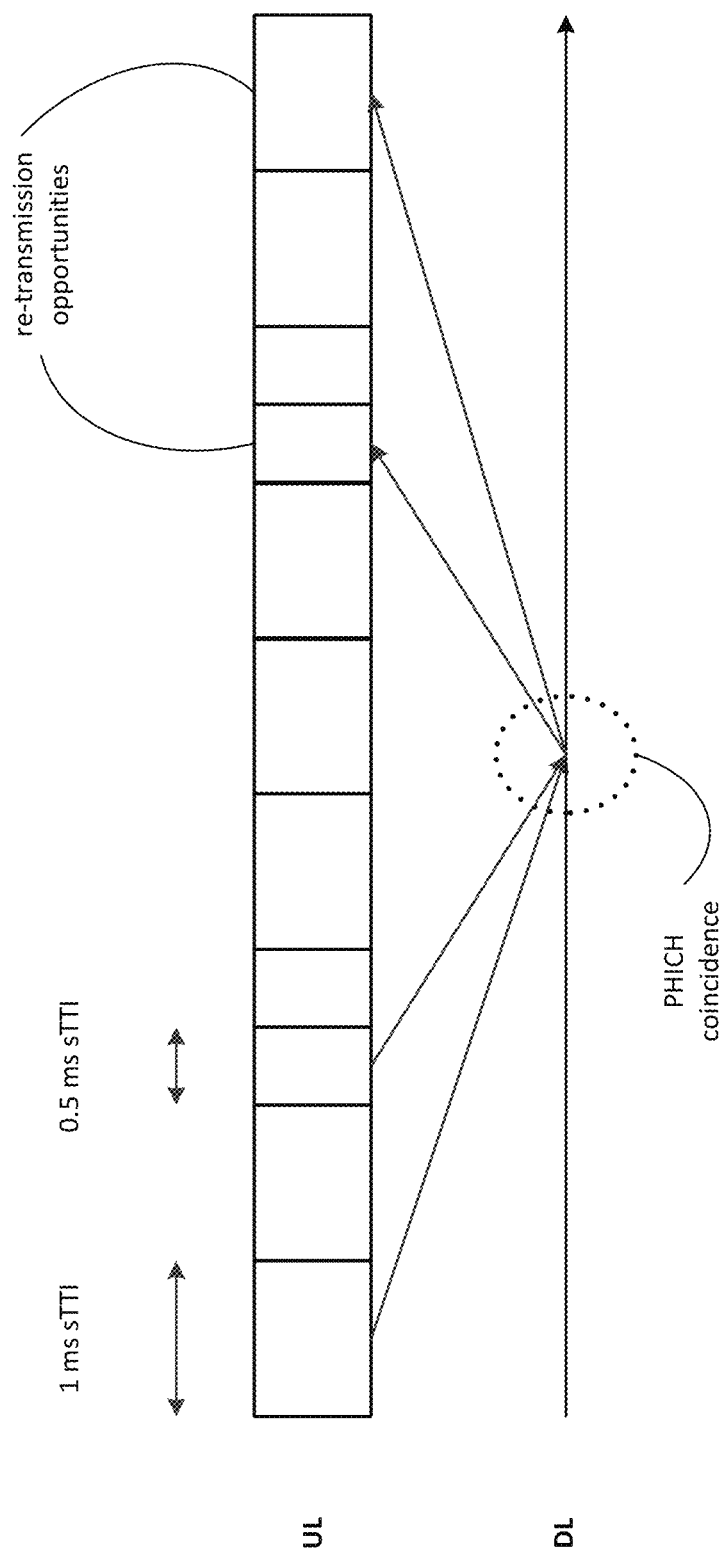
FIG. 44 shows an example timing sequence with PHICH collision.

The location of the PHICH may be implicitly derived from the sTTI length, the RB location, and the DMRS cyclic shift of the UL transmissions. However, PHICH collisions may occur when sTTIs of different duration are multiplexed. FIG. 44 shows an exemplary transmission scenario where the A/N responses of the two different sTTIs occur at the same time, resulting in a PHICH collision.

Collisions may be reduced using a flexible schedule. As shown in Equation 4, the PHICH resource location be expressed as functions of UL PRB location denote as $I_{PRB}$, UL DMRS cyclic shift denoted as $I_{DMRS}$ and supported sTTI duration denote as $I_{sTTI}$. Hence, we can express the PHICH resource as the following relationship:

$$\text{PHICH resource} = (n_{PHICH}^{group}(I_{PRB}, I_{DMRS}, \ldots, I_{sTTI}), n_{PHICH}^{seq}(I_{PRB}, I_{DMRS}, \ldots, I_{sTTI})). \quad \text{Equation 4}$$

where each PHICH resource $n_{PHICH}^{group} \in 0, \ldots, N_{PHICH}^{group}-1$, $n_{PHICH}^{seq} \in 0, \ldots, N_{PHICH}^{seq}-1$ and $N_{PHICH}^{group}$ and $N_{PHICH}^{seq}$ denote the maximum number of PHICH group and DMRS cyclic shifts per PHICH group respectively.

Not all collisions can be avoided in this way. The scheduler must ensure that resources are scheduled in a way that the collision of PHICH resources does not occur.

A/N responses for all terminals may be multiplexed together in commonly configured PHICH resources, referred herein as "common-PHICH" resources. Depending on the UL traffic and consequently the A/N traffic in the DL, not all the common-PHICH resources may be used at all times.

Alternatively, PHICH may be piggy-backed onto PDSCH. For example, the A/N for a terminal may be piggy-backed on to its DL PDSCH assignment when there is ongoing DL transmission to the terminal, to create a "piggy-backed-PHICH." If the $1^{st}$ symbol of a terminal's DL grant is within the tolerance window of its prior UL transmission, the PHICH corresponding to that UL transmission may be piggy-backed on the DL assignment, with no PHICH resources from common-PHICH pool assigned to that terminal.

There is no ambiguity about whether the A/N for a specific grant occurs in the common-PHICH or the piggy-backed-PHICH. This reduces the need for configuring a large number of common-PHICH resources that are reserved when there is not enough A/N traffic to fully utilize them. This provides for dynamic management of resources for delivering A/N traffic to the terminals. This may alleviate some PHICH resource collisions, since some of the PHICH resources that might otherwise collide in the common-PHICH are signaled through separate piggy-backed resources.

Figure 45:
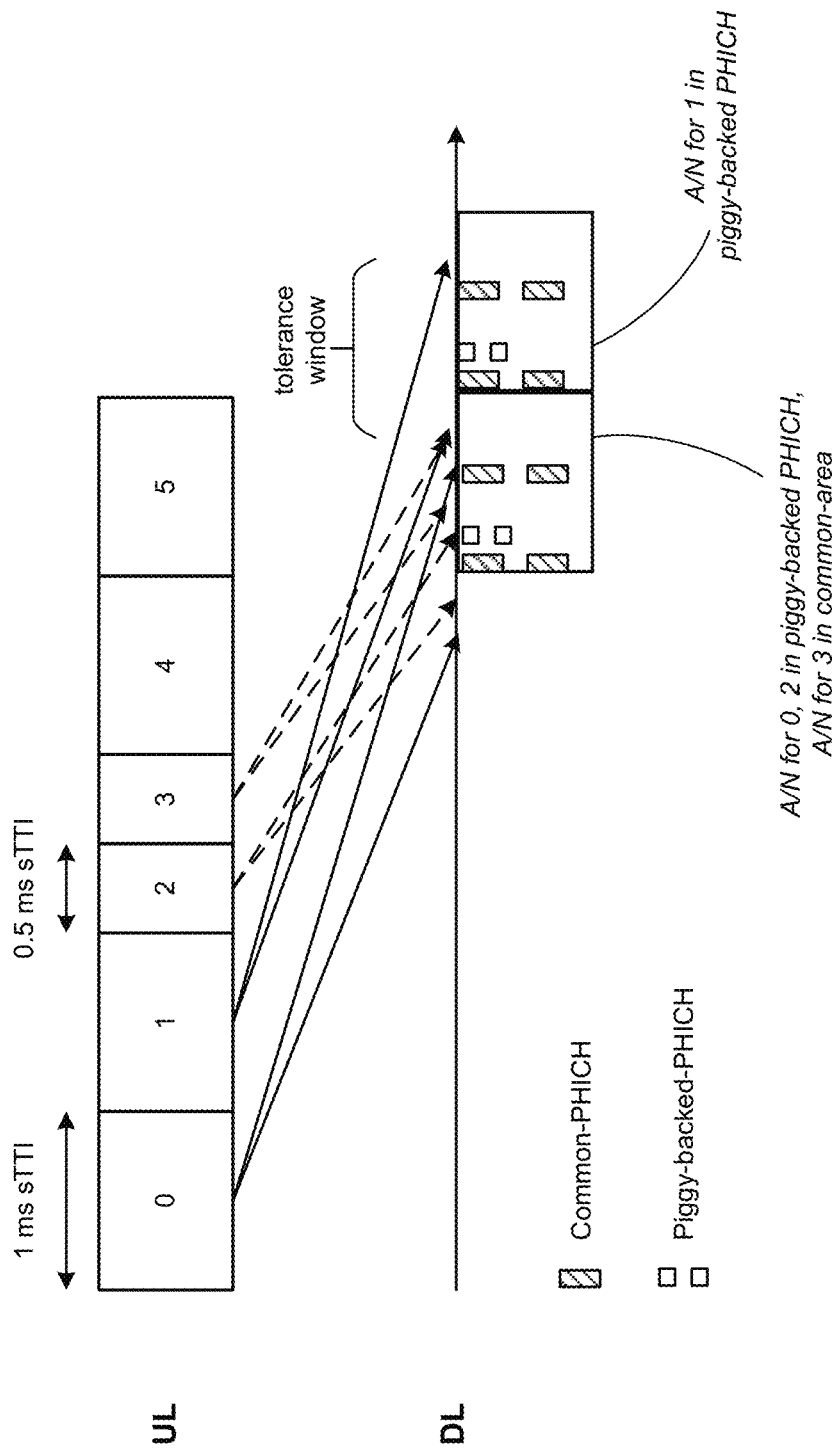
FIG. 45 shows an example timing sequence with piggy-backed-PHICH and common-PHICH where the DL uses 1 ms TTI to signal PHICH.
Figure 46:
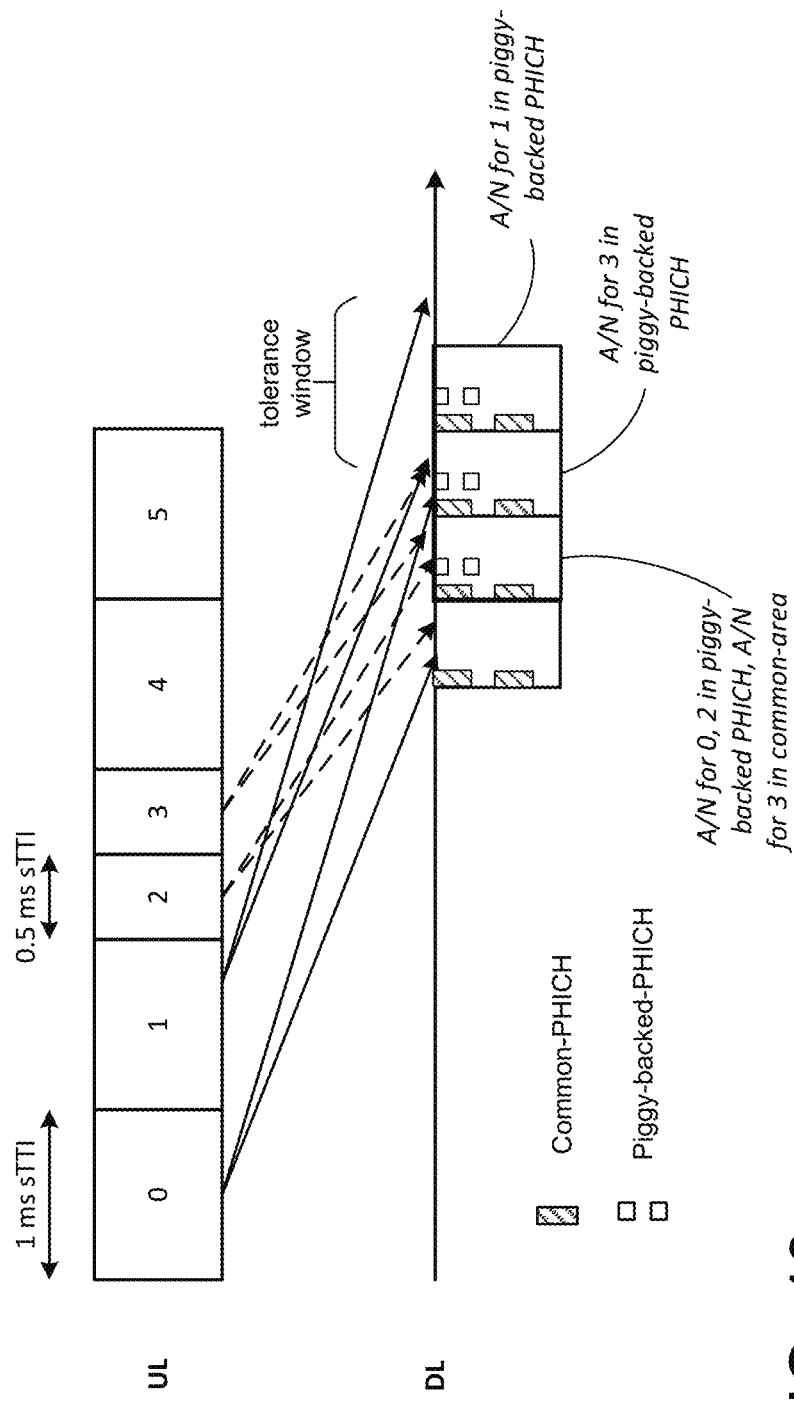
FIG. 46 shows an example timing sequence with piggy-backed-PHICH and common-PHICH where the DL uses 0.5 mS TTI to signal PHICH.

FIG. 45 shows an example timing sequence with piggy-backed-PHICH and common-PHICH where when the DL uses 1 ms TTI to signal PHICH. FIG. 46 shows an example timing sequence with piggy-backed-PHICH and common-PHICH where the DL uses 0.5 mS TTI to signal PHICH.

In both figures, the UL consists of multiplexed sTTIs with different tolerance windows. If the start of the DL sTTI falls inside the tolerance window, the A/N response of that UL grant is piggy-backed. Otherwise it is signaled through the common area in the 1st PHICH opportunity within the tolerance window of the UL grant.

Since a single DL grant can carry multiple A/N responses corresponding to cross carrier aggregation, multiple spatial layers and multiple sTTI durations, the A/Ns may be jointly encoded using an error correction code such as a repetition code, RM code, or convolutional code depending on the number of A/N bits to be sent.

The modulation and number of resources reserved for piggy-backed PHICH may be based on the MCS of the DL grant, and the encoded PHICH may be rate matched to fill the number of reserved resources. The locations where PHICH may be piggy-backed on to the DL grant, be defined as part of a specification, or otherwise provided to a terminal, so that the terminal has prior knowledge of the locations of PHICH opportunities. This ensures that additional control signaling is not required to indicate the location of the PHICH resources.

Figure 47:
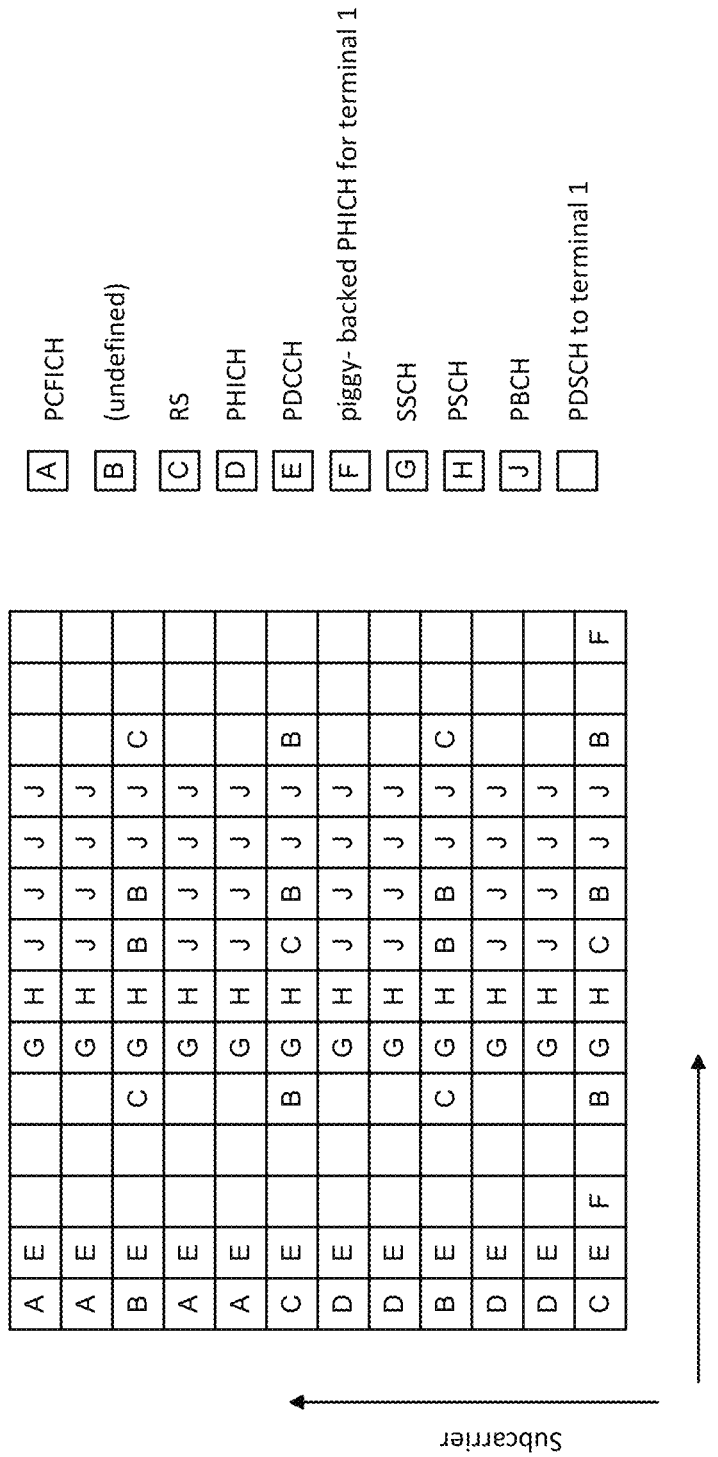
FIG. 47 shows an example resource grid with PHICH piggy-backed on the DL PDSCH grant.

Additionally, the PDSCH may be rate matched to fit in to the reduced number of available resources since the allocation for piggy-backed PHICH. FIG. 47 shows an exemplary configuration of PHICH piggy-backed on the DL PDSCH grant.

Figure 48:
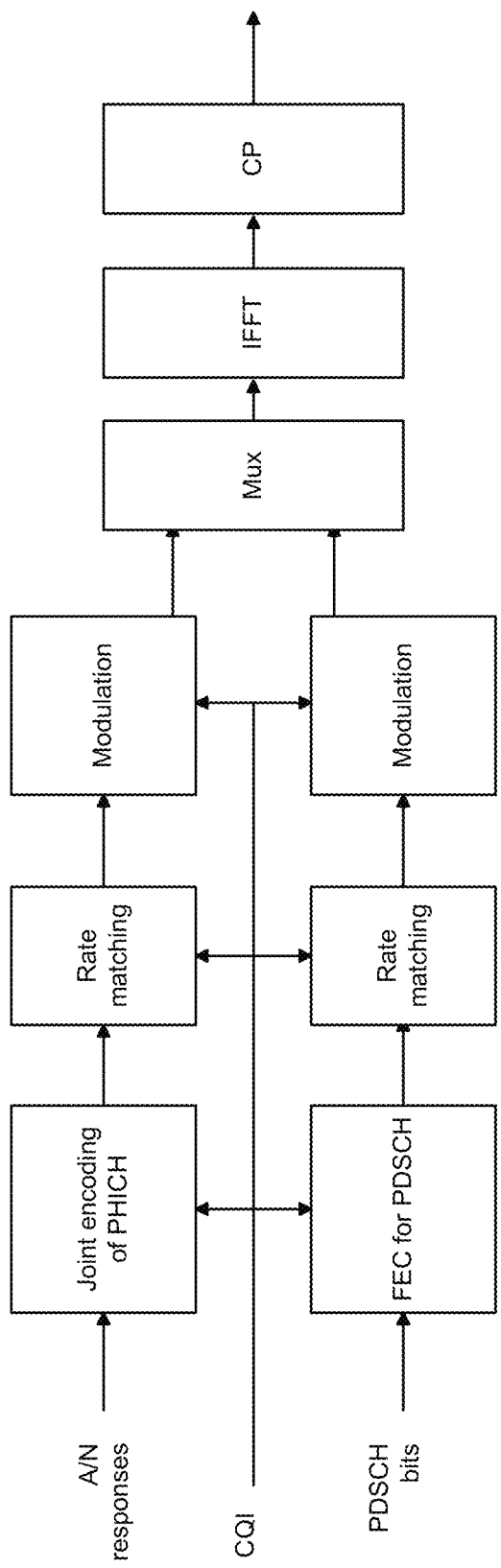
FIG. 48 shows an example process flow for a DL transmission chain that piggy-backs PHICH on PDSCH and generates an OFDM symbol with CP for transmission.

FIG. 48 shows an exemplary configuration of the DL transmission chain that piggy-backs PHICH on PDSCH and generates an OFDM symbol with CP for transmission.

The problem of delayed HARQ retransmission in UL may be addressed by having the eNodeB configure the maximum number of HARQ processes, e.g., in a parameter called maxHarqProcessUL, and the duration of those HARQ processes, e.g., in a parameter called harqULProcessDuration, for a terminal through RRC signaling. Table 8 shows a table of example durations with an index of processes.

TABLE 8

Exemplary Configuration of HarqULProcessDuration

| harqULProcessIndex | 0 | 1 | 2 | 3 | 4 | 5 | 6 | 7 |
|---|---|---|---|---|---|---|---|---|
| harqULProcessDuration (mS) | 0.5 | 0.5 | 0.5 | 0.5 | 1 | 1 | 1 | 1 |

Subsequent reconfigurations may be performed through a MAC's CE. The configuration of the UL HARQ may be performed through the parameters, as is shown in computer code Example 4.

Example 4

Exemplary MAC-MainConfig Information with Parameters for UL HARQ to Maintain Synchronous Operation with Multiplexed sTTIs

```
-- ASN1START
MAC-MainConfig ::=                    SEQUENCE {
    ul-SCH-Config                     SEQUENCE {
        maxHARQ-Tx                    ENUMERATED {
                                      n1, n2, n3, n4, n5, n6, n7, n8,
                                      n10, n12, n16, n20, n24, n28,
                                      spare2, spare1}            OPTIONAL,        -- Need ON
        periodicBSR-Timer             PeriodicBSR-Timer-r12 OPTIONAL,             -- Need ON
        retxBSR-Timer                 RetxBSR-Timer-r12,
        ttiBundling                   BOOLEAN
        maxHarqProcessUL              INTEGER (0..15)
        harqULProcessDuration         SEQUENCE (SIZE
(1..maxHarqULProcess)) OF HarqULProcessDuration
    }                                                 OPTIONAL,   -- Need ON
    drx-Config                        DRX-Config      OPTIONAL,                   -- Need ON
    timeAlignmentTimerDedicated       TimeAlignmentTimer,
    phr-Config                        CHOICE {
        release                       NULL,
        setup                         SEQUENCE {
            periodicPHR-Timer         ENUMERATED {sf10, sf20, sf50, sf100,
                                      sf200,
                                      sf500, sf1000, infinity},
            prohibitPHR-Timer         ENUMERATED {sf0, sf10, sf20, sf50,
                                      sf100,
                                      sf200, sf500, sf1000},
            dl-PathlossChange         ENUMERATED {dB1, dB3, dB6, infinity}
        }
    }                                                 OPTIONAL,   -- Need ON
    ...,
    [[sr-ProhibitTimer-r9             INTEGER (0..7)                 OPTIONAL    --
Need ON
    ]],
    [[mac-MainConfig-v1020            SEQUENCE {
        sCellDeactivationTimer-r10    ENUMERATED {
                                      rf2, rf4, rf8, rf16, rf32, rf64, rf128,
                                      spare}          OPTIONAL,   -- Need OP
        extendedBSR-Sizes-r10         ENUMERATED {setup}                          OPTIONAL,
-- Need OR
        extendedPHR-r10               ENUMERATED {setup}             OPTIONAL    --
Need OR
    }                                                 OPTIONAL -- Need ON
    ]],
    [[stag-ToReleaseList-r11          STAG-ToReleaseList-r11                      OPTIONAL,
    -- Need ON
```

```
            stag-ToAddModList-r11           STAG-ToAddModList-r11              OPTIONAL,        --
Need ON
            drx-Config-v1130                DRX-Config-v1130                   OPTIONAL         -- Need ON
    ]],
    [[ e-HARQ-Pattern-r12                   BOOLEAN                            OPTIONAL,        -- Need ON
        dualConnectivityPHR                 CHOICE {
            release                             NULL,
            setup                               SEQUENCE {
                phr-ModeOtherCG-r12                 ENUMERATED {real, virtual}
            }
        }                                   OPTIONAL,           -- Need ON
        logicalChannelSR-Config-r12         CHOICE {
            release                             NULL,
            setup                               SEQUENCE {
                logicalChannelSR-ProhibitTimer-r12              ENUMERATED {sf20, sf40,
sf64, sf128, sf512, sf1024, sf2560, spare1}
            }
        }                                   OPTIONAL            -- Need ON
    ]],
    [[ extendedPHR2-r13                     ENUMERATED {setup}                 OPTIONAL,
-- Need ON
        eDRX-Config-CycleStartOffset-r13                       CHOICE {
            release                             NULL,
            setup
                                            CHOICE {
                sf5120                          INTEGER(0..1),
                sf10240                         INTEGER(0..3)
            }
        }                                   OPTIONAL -- Need ON
    ]]
}
MAC-MainConfigSCell-r11 ::=                 SEQUENCE {
    stag-Id-r11                             STAG-Id-r11                        OPTIONAL,        -- Need OP
    ...
}
DRX-Config ::=                              CHOICE {
    release                                     NULL,
    setup                                       SEQUENCE {
        onDurationTimer                             ENUMERATED {
                                                    psf1, psf2, psf3, psf4, psf5, psf6,
                                                    psf8, psf10, psf20, psf30, psf40,
                                                    psf50, psf60, psf80, psf100,
                                                    psf200},
        drx-InactivityTimer                         ENUMERATED {
                                                    psf1, psf2, psf3, psf4, psf5, psf6,
                                                    psf8, psf10, psf20, psf30, psf40,
                                                    psf50, psf60, psf80, psf100,
                                                    psf200, psf300, psf500, psf750,
                                                    psf1280, psf1920, psf2560, psf0-v1020,
                                                    spare9, spare8, spare7, spare6,
                                                    spare5, spare4, spare3, spare2,
                                                    spare1},
        drx-RetransmissionTimer                     ENUMERATED {
                                                    psf1, psf2, psf4, psf5, psf6, psf8, psf16,
                                                    psf24, psf33},
        longDRX-CycleStartOffset                CHOICE {
            sf10                                INTEGER(0..9),
            sf20                                INTEGER(0..19),
            sf32                                INTEGER(0..31),
            sf40                                INTEGER(0..39),
            sf64                                INTEGER(0..63),
            sf80                                INTEGER(0..79),
            sf128                               INTEGER(0..127),
            sf160                               INTEGER(0..159),
            sf256                               INTEGER(0..255),
            sf320                               INTEGER(0..319),
            sf512                               INTEGER(0..511),
            sf640                               INTEGER(0..639),
            sf1024                              INTEGER(0..1023),
            sf1280                              INTEGER(0..1279),
            sf2048                              INTEGER(0..2047),
            sf2560                              INTEGER(0..2559)
        },
        shortDRX                                SEQUENCE {
            shortDRX-Cycle                          ENUMERATED {
                                                    sf2, sf5, sf8, sf10, sf16, sf20,
                                                    sf32, sf40, sf64, sf80, sf128, sf160,
                                                    sf256, sf320, sf512, sf640},
```

```
        drxShortCycleTimer                    INTEGER (1..16)
    }      OPTIONAL                                                      -- Need OR
    }
}
DRX-Config-v1130 ::=                          SEQUENCE {
    drx-RetransmissionTimer-v1130                          ENUMERATED {psf0-v1130}
    OPTIONAL,  --Need OR
    longDRX-CycleStartOffset-v1130                         CHOICE {
        sf60-v1130                            INTEGER(0..59),
        sf70-v1130                            INTEGER(0..69)
    }                                                      OPTIONAL,       --Need OR
    shortDRX-Cycle-v1130                      ENUMERATED {sf4-v1130}                        OPTIONAL
    --Need OR
}
PeriodicBSR-Timer-r12 ::=                     ENUMERATED {
                                        sf5, sf10, sf16, sf20, sf32, sf40, sf64,
sf80,
                                        sf128, sf160, sf320, sf640, sf1280, sf2560,
                                        infinity, spare1}
RetxBSR-Timer-r12 ::=                         ENUMERATED {
                                        sf320, sf640, sf1280, sf2560, sf5120,
                                        sf10240, spare2, spare1}
STAG-ToReleaseList-r11 ::=SEQUENCE (SIZE (1..maxSTAG-r11)) OF STAG-Id-
r11
STAG-ToAddModList-r11 ::= SEQUENCE (SIZE (1..maxSTAG-r11)) OF STAG-
ToAddMod-r11
STAG-ToAddMod-r11 ::=          SEQUENCE {
    stag-Id-r11                STAG-Id-r11,
    timeAlignmentTimerSTAG-r11TimeAlignmentTimer,
    ...
}
STAG-Id-r11::=                 INTEGER (1..maxSTAG-r11)
HarqULProcessDuration ::=                     SEQUENCE {
harqULProcessIndex                            INTEGER (1..maxHarqULProcess)
harqULProcessDura                             ENUMERATED (0.25, 0.5, 1, 2)
}
-- ASN1STOP
```

Each valid HarqULProcessDuration vector may be mapped to a pre-defined sequence of HARQ processes which repeats itself and is known a priori to the terminals. Computer code Example 2 shows mappings to the transmission order of the HARQ processes.

TABLE 9

Mapping of HARQ process number and sTTI to HARQ process transmission order

| EG. | MAXHARQ-PROCESSUL | HARQULPROCESSDURATION | | | | | | | | HARQ TRANSMISSION ORDER (PRE-DEFINED MAPPING) |
|---|---|---|---|---|---|---|---|---|---|---|
| 1 | 8 | 0 | 1 | 2 | 3 | 4 | 5 | 6 | 7 | {0, 1, 2, 3, 4, 0, 1, 5, |
|   |   | 0.5 | 0.5 | 0.5 | 0.5 | 1 | 1 | 1 | 1 | 6, 0, 1, 2, 3, 4, 0, 1, 7} |
| 2 | 8 | 0 | 1 | 2 | 3 | 4 | 5 | 6 | 7 | {0, 1, 2, 3, 4, 5, 0, 1, |
|   |   | 0.25 | 0.25 | 0.5 | 0.5 | 0.5 | 1 | 1 | 1 | 2, 3, 6, 7} |

Once the duration of the HARQ processes is established by the eNodeB through RRC, the terminal obtains the sequence of the HARQ process transmissions from the pre-defined mapping. No additional control signaling is required. Synchronous operation may be maintained without additional control overhead while ensuring acceptable latency for the retransmission for all TTI lengths.

Figure 49:
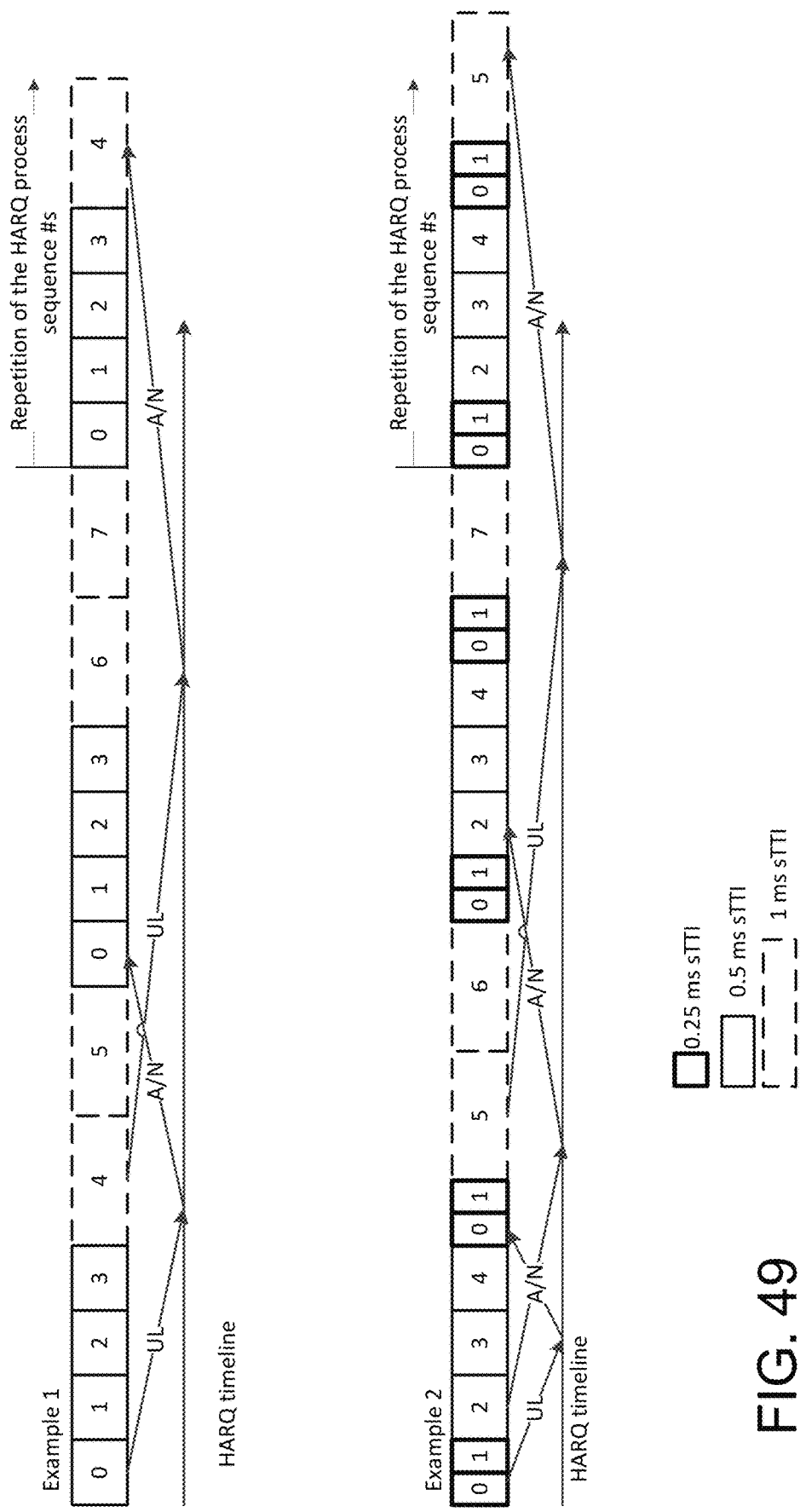
FIG. 49 shows two example HARQ process timing sequences.

FIG. 49 shows the HARQ process transmission sequence in computer code Example 2. The TTIs of different durations get an opportunity to retransmit with an approximate latency of 8 to 9 times their length.

Figure 50:
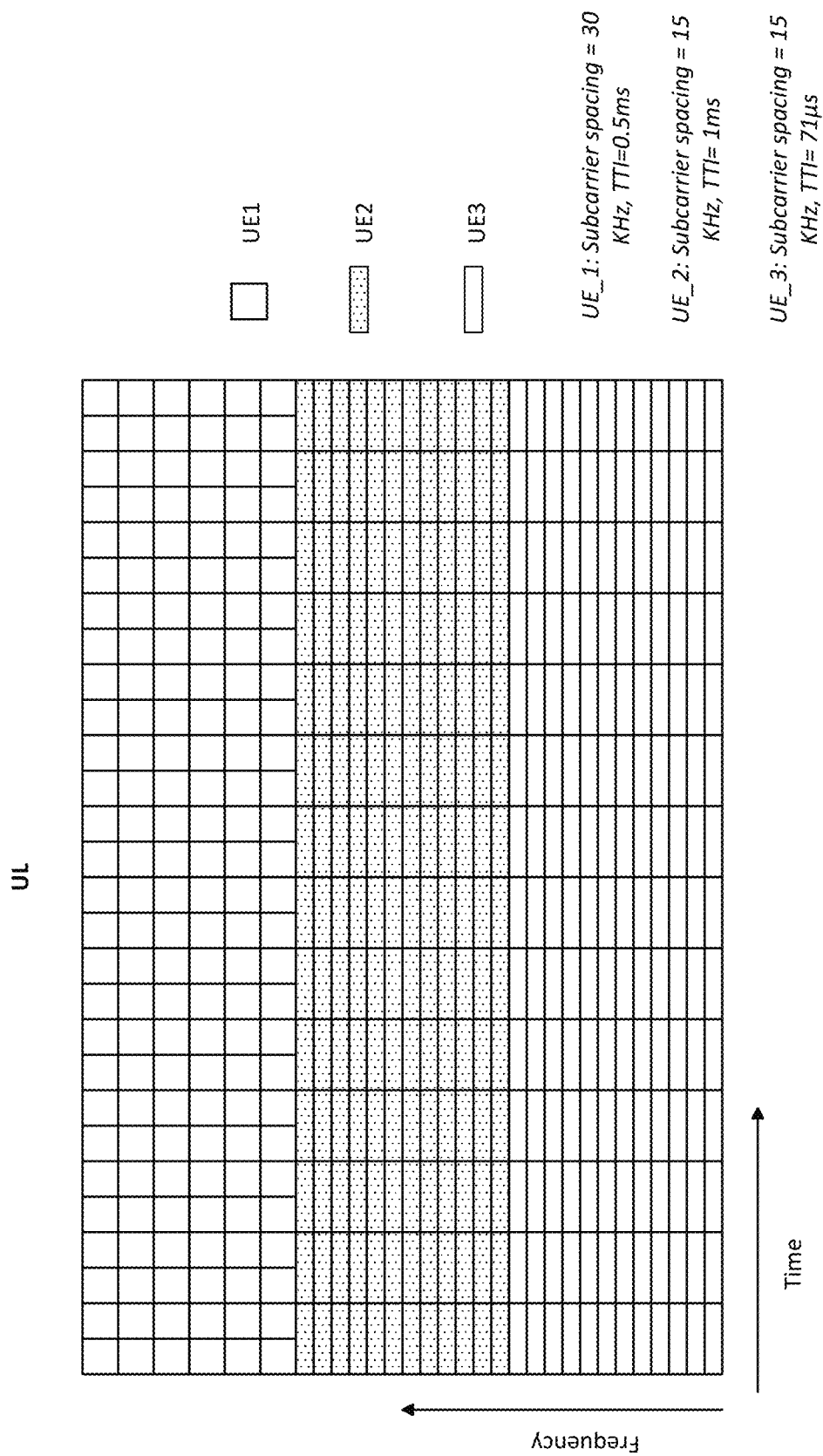
FIG. 50 shows an example resource grid for UL where numerologies for three UEs are multiplexed.
Figure 51:
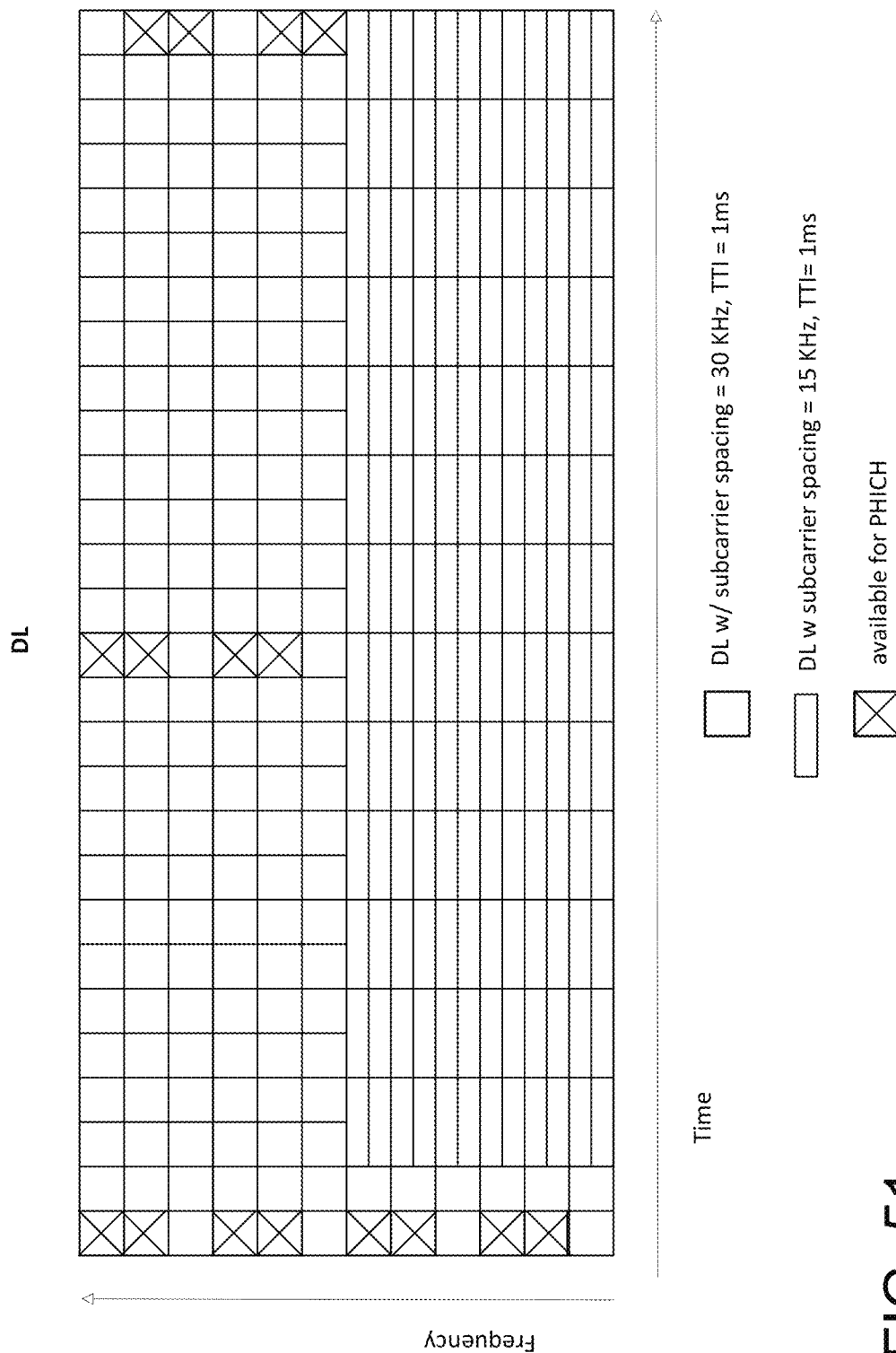
FIG. 51 shows an example resource grid for DL where the DL carries a common PHICH numerology for the UEs depicted in FIG. 24.

Multiple numerologies with different subcarrier spacing, and consequently different symbols durations, and different CP durations may be multiplexed in the UL and the DL, where PHICHs are transmitted on a single "common-PHICH-numerology" numerology in the DL. FIGS. 50 and 51 show exemplary configurations of UL and DL which multiplex various numerologies. The DL carries all PHICH for UEs 1, 2 and 3 in a common Common-PHICH-numerology through the three configured PHICH opportunities. Here the Common-PHICH-numerology is set to the largest possible subcarrier spacing and the smallest possible symbol duration. This meets the latency requirement of the most stringent sTTI. The resources for these PHICH opportunity may be allotted, for example, via MIB or by a RB and DMRS.

The Common-PHICH-numerology may be conveyed to the UE through critical system information such as the MIB in LTE and can be updated semi-statically or reconfigured through a MAC's CE. Such a common numerology for all PHICHs, regardless of the numerology of the UL transmission, allows the PHICHs to be multiplexed in the DL without complexity or additional signaling overhead relating to the DL numerologies.

Computer code Example 5 shows an exemplary configuration of the MIB where a "common-PHICH-numerology" field is added to convey the numerology for the PHICHs. This field may be set to a value "Common-PHICH-numerology" whose exemplary configuration is given in Table 10.

Example 5

Common-PHICH-Numerology in MasterInformationBlock (MIB) in LTE

```
-- ASN1START
MasterInformationBlock ::= SEQUENCE {
    dl-Bandwidth              ENUMERATED {
        n6, n15, n25, n50, n75, n100},
    phich-Config              PHICH-Config,
    common-PHICH-numerology Common-PHICH-numerology,
    systemFrameNumber         BIT STRING (SIZE (8)),
    spare                     BIT STRING (SIZE (10))
}
-- ASN1STOP
```

TABLE 10

Exemplary configuration of Common-PHICH-numerology parameter for system information or a MAC's CE

| Common-PHICH-numerology |
|---|
| cpConfig-k = 1.18 (µs) |
| subcarrierSpacing-k = 60 (kHz) |

Figure 52:
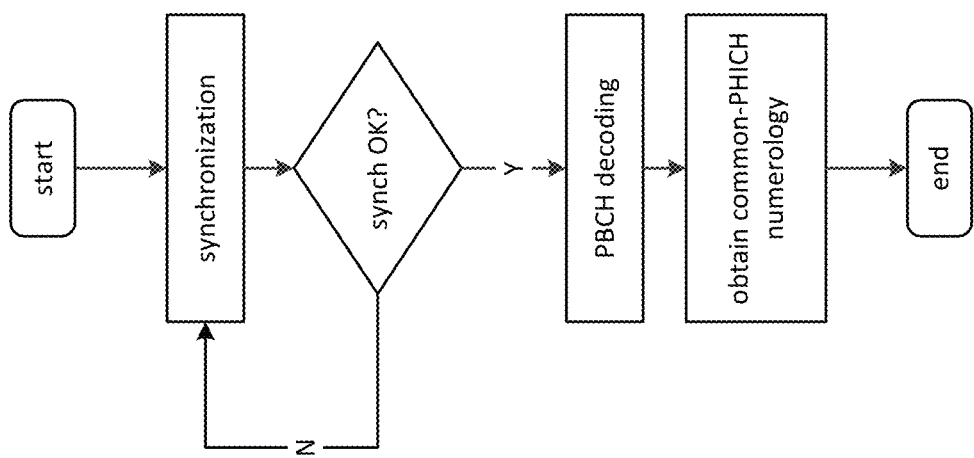
FIG. 52 shows a flow chart for an example method by which a UE may obtain a PHICH.

FIG. 52 shows an example UE procedure to obtain the PHICH numerology. The UE obtains synchronization to the cell by obtaining the Physical Cell Identity (PCI) acquiring and frame timing acquisition. The UE then decodes the PBCH for the MIB from which it obtains the Common-PHICH-numerology.

In some scenarios it is not desirable to use a Common-PHICH-numerology. For example, narrow band IOT terminals may have low sampling rates and be capable of operating only with the lowest subcarrier spacing numerology and only on a fraction of the DL bandwidth of the cell. To support such cases, 5G may support PHICH signaling for a number of different network slices and/or different UL numerologies on different DL numerologies and/or different locations in the DL bandwidth. For example, a numerology PHICH-numerology-k may be configured as shown in Table 11, where K is a number of network slices, PHICH-Numerology-k is a numerology for supporting the kth DL numerology or network slice, and k=1, 2, . . . K.

TABLE 11

Exemplary configuration of PHICH-numerology-k parameters for system information or a MAC's CE

| PHICH-numerology-k |
|---|
| cpConfig-k = 4.7 (µs) |
| subcarrierSpacing-k = 15 (kHz) |

Figure 53:
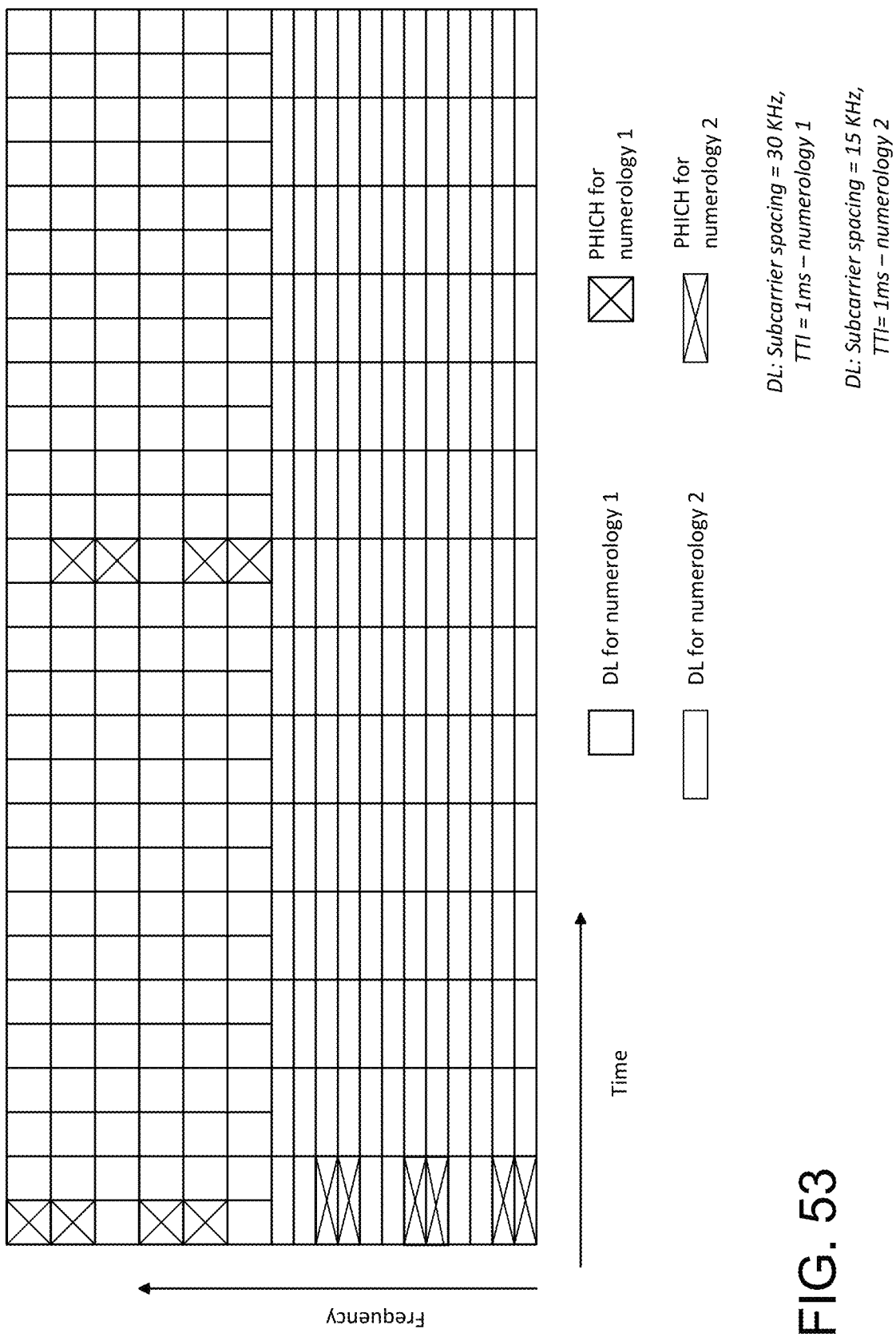
FIG. 53 shows an example resource grid for the allocation of PHICH to two numerologies.

FIG. 53 shows the allocation of PHICH to PHICH-numerology-1 and PHICH-numerology-2 in an exemplary configuration where the DL supports two numerologies. A single UE may support UL transmission on multiple numerologies in 5G, whereby the UE receives its PHICH for the different slices on multiple numerologies.

The PHICH-numerology-k may be conveyed to the UE through critical system information such as the MIB in LTE, and be updated semi-statically or reconfigured through a MAC's CE. The resources for the PHICH transmitted using PHICH-numerology-k be allocated, for example, via MIB or by a RB and DMRS.

5G may support a configuration where the resources for PHICH on PHICH-numerology-k are restricted to some RBs of the DL. Herein such RBs are referred to as "PHICH-RB-numerology-k." The parameters for PHICH-RB-numerology-k may be configured through system information and updated through a MAC's CE. For example, PHICH-RB-numerology-k may be defined by the first and last RB numbers of the section of the DL bandwidth supporting the PHICH resources and using PHICH-numerology-k.

Figure 54:
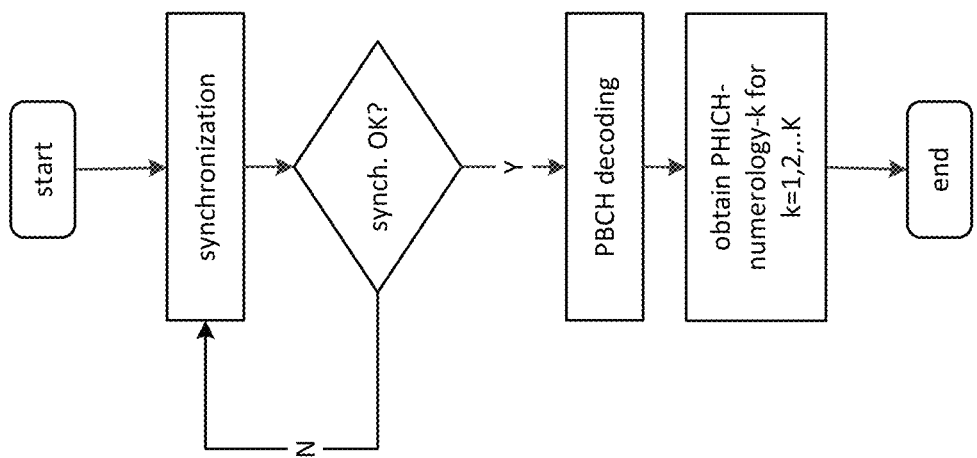
FIG. 54 shows a flow chart of another example method by which a UE may obtain a PHICH numerology.

FIG. 54 shows an example UE procedure to obtain a PHICH numerology. In the example of FIG. 54, the UE obtains synchronization to the cell by obtaining the Physical Cell Identity (PCI) acquiring and frame timing acquisition. The UE then decodes the PBCH for the MIB from which it obtains the Common-PHICH-numerology.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 55:
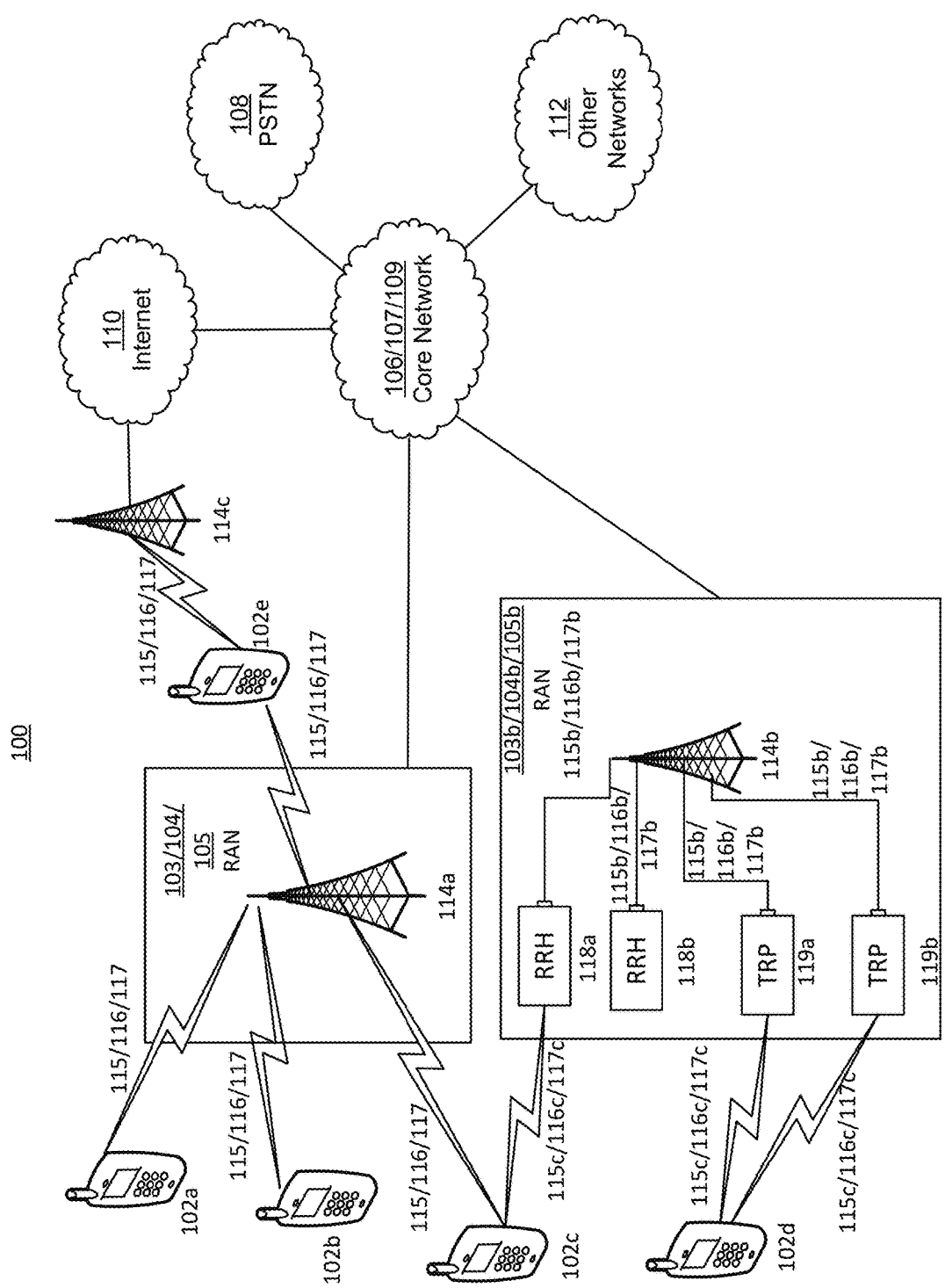
FIG. 55 illustrates an example communications system.

FIG. 55 illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 55-59 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 55 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 55, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 55, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 55 may be configured to communicate with the base station 114a, which may employ a cellular-based radio technology, and with the base station 114c, which may employ an IEEE 802 radio technology.

Figure 56:
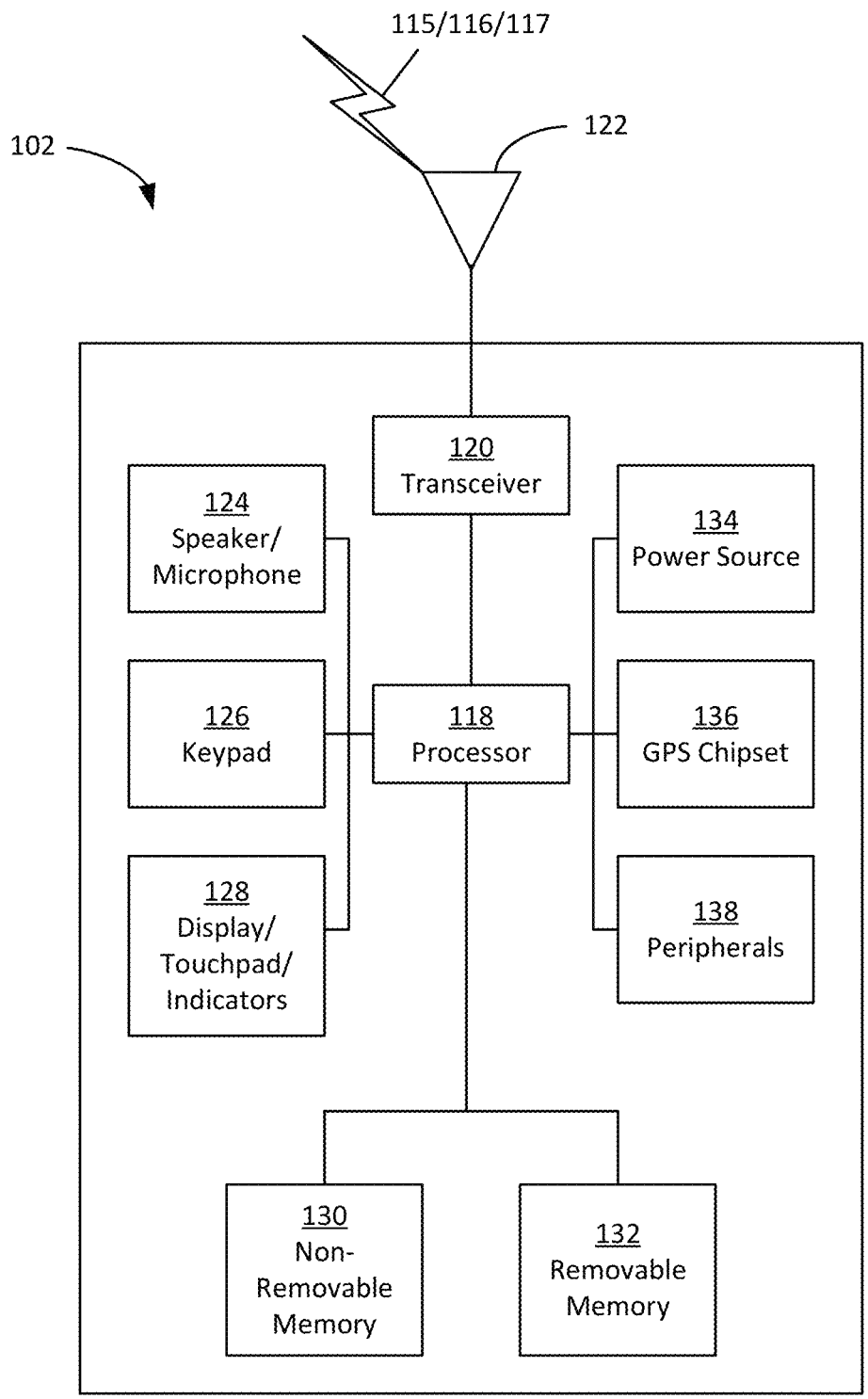
FIG. 56 is a block diagram of an example apparatus or device configured for wireless communications such as, for example, a wireless transmit/receive unit (WTRU).

FIG. 56 is a block diagram of an example apparatus or device configured for wireless communications in accordance with the embodiments illustrated herein, such as for example, a WTRU 102. As shown in FIG. 56, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 56 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 56 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 55, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 55 may be configured to communicate with the base station 114a, which may employ a cellular-based radio technology, and with the base station 114b, which may employ an IEEE 802 radio technology.

FIG. 56 is a block diagram of an example apparatus or device configured for wireless communications in accordance with the embodiments illustrated herein, such as for example, a WTRU 102. As shown in FIG. 56, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 56 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 56 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 56 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 57:
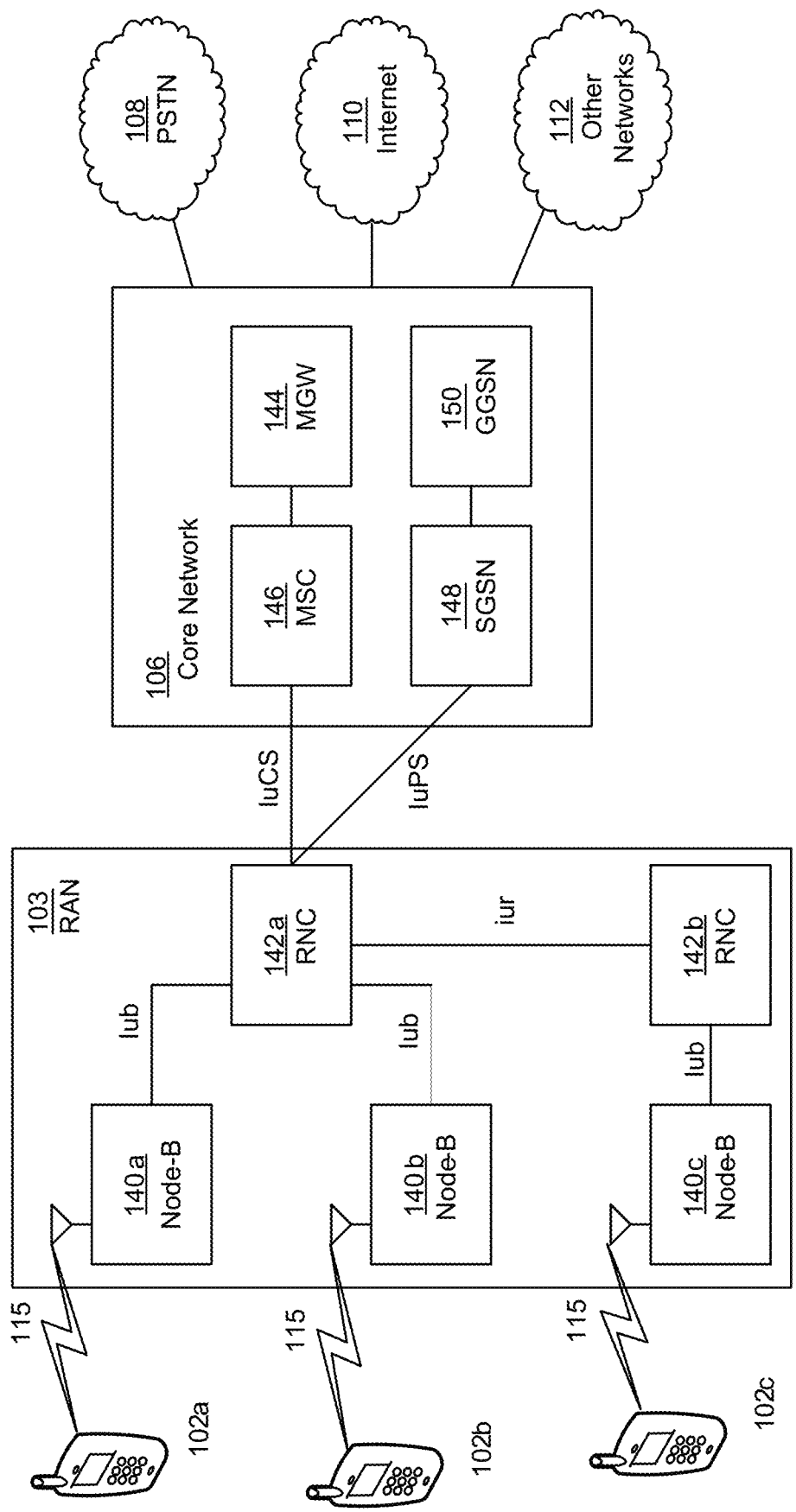
FIG. 57 is a system diagram of a first example radio access network (RAN) and core network.

FIG. 57 is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 57, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 57, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 57 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 58:
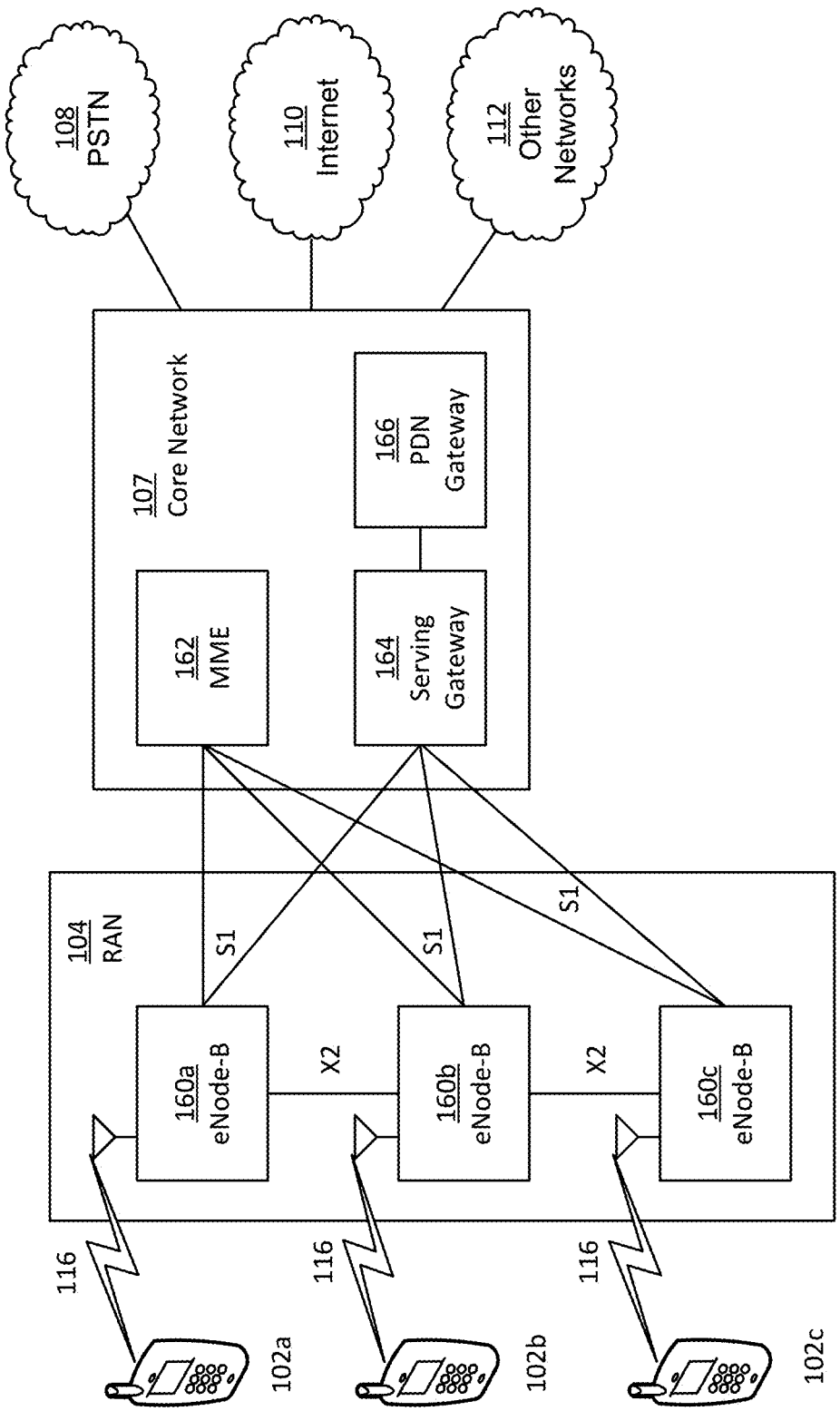
FIG. 58 is a system diagram of a second example radio access network (RAN) and core network.

FIG. 58 is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 58, the eNode-Bs 160a, 160b, 160c may communicate with one another over an X2 interface.

The core network 107 shown in FIG. 58 may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 59:
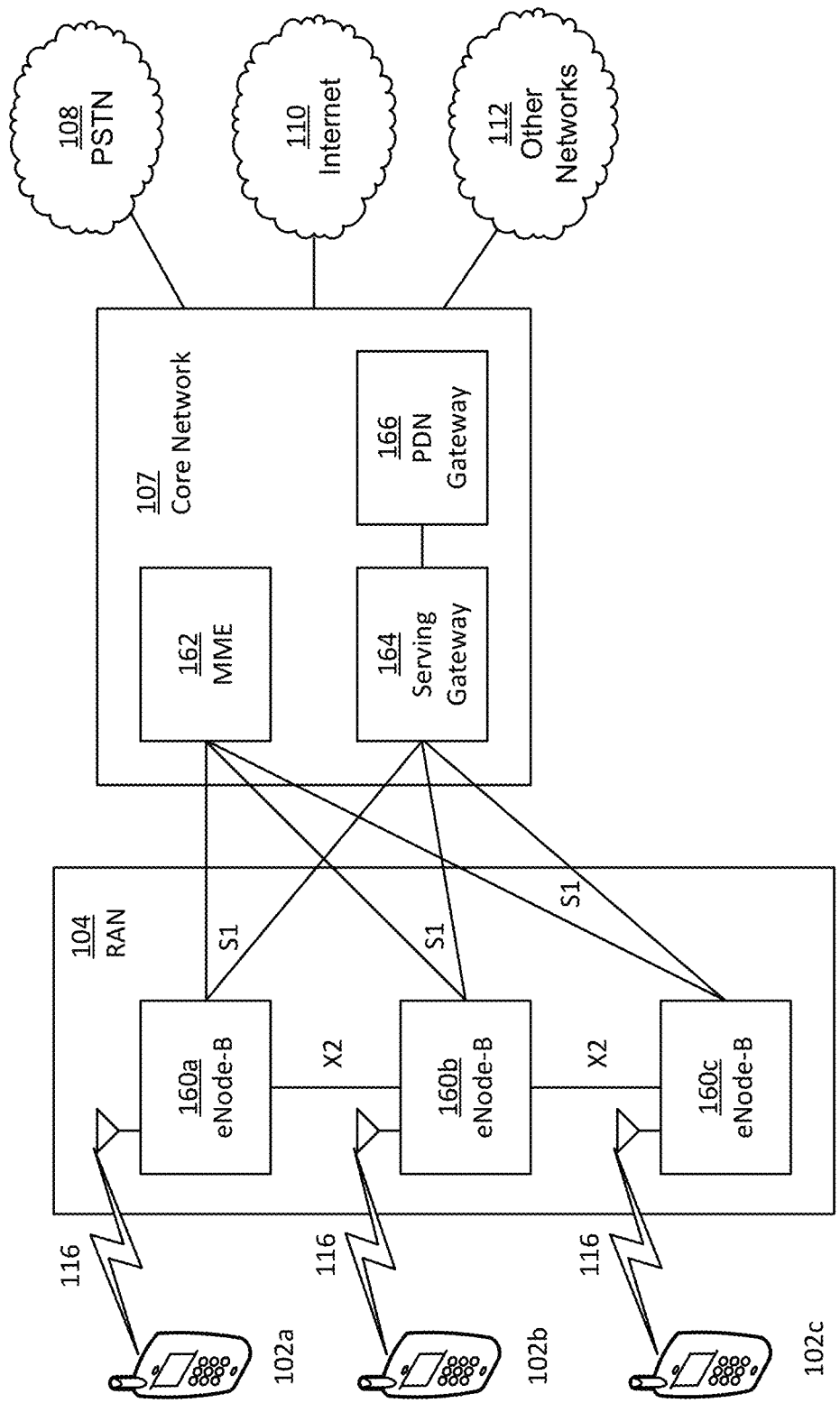
FIG. 59 is a system diagram of a third example radio access network (RAN) and core network.

FIG. 59 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 59, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 59, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 59, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 55, 57, 58, and 59 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 55-59 are provided by way of example only, and it is understood that the subject matter disclosed and claimed herein may be embodied or implemented in any similar communication system, whether presently defined or defined in the future.

Figure 60:
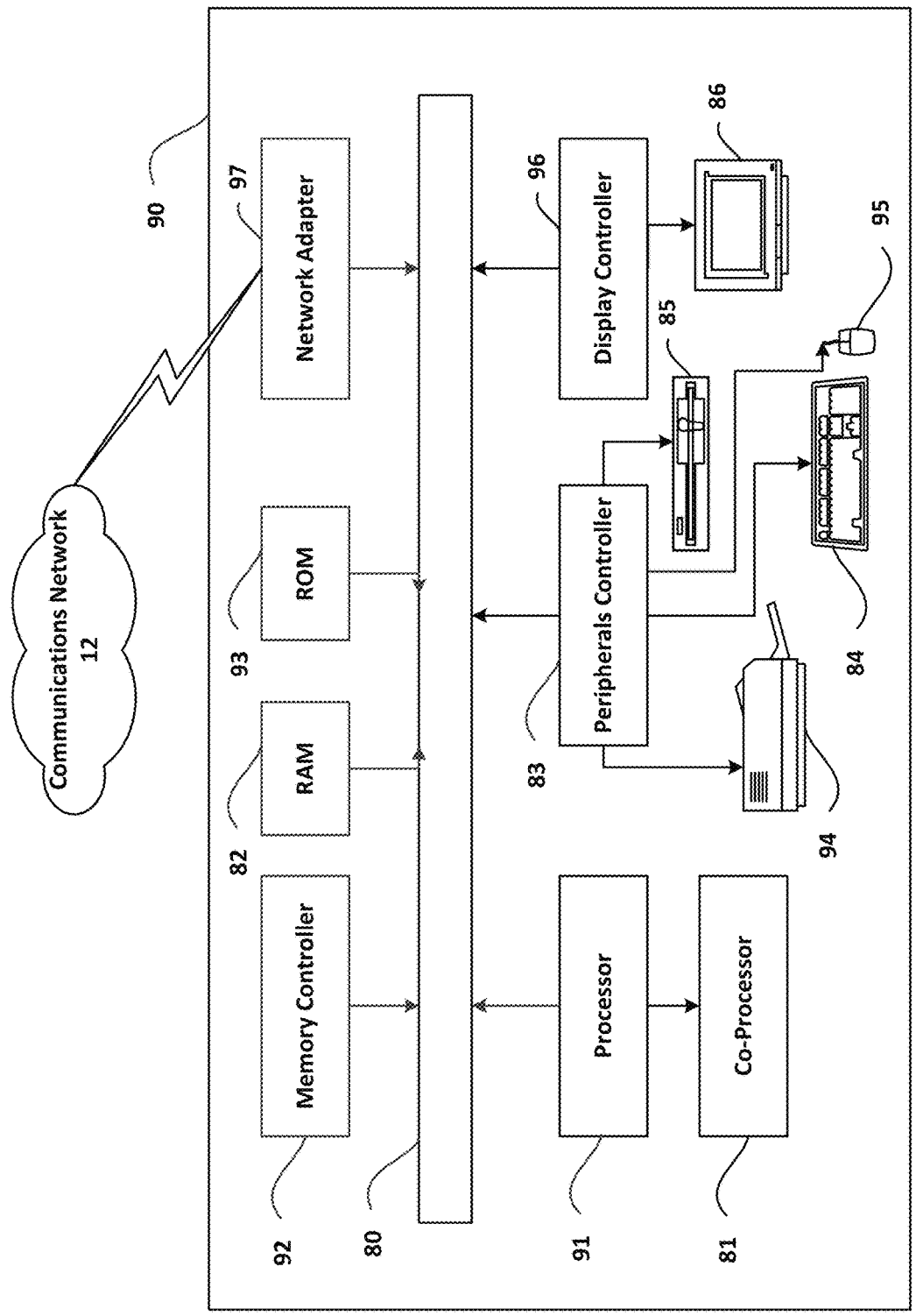
FIG. 60 is a block diagram of an exemplary computing system in which one or more apparatuses of communications networks may be embodied, such as certain nodes or functional entities in the RAN, core network, public switched telephone network (PSTN), Internet, or other networks

FIG. 60 is a block diagram of an exemplary computing system 90 in which one or more apparatuses of the communications networks illustrated in FIGS. 55, 57, 58, and 59 may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 55-59, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

What is claimed is:

1. A first apparatus comprising a processor, a memory, and communication circuitry, the first apparatus being connected to a network via its communication circuitry, the first apparatus further comprising computer-executable instructions stored in the memory, when executed by the processor, cause the first apparatus to perform operations comprising:
receiving, from a second apparatus via resources that are pre-configured for the second apparatus, a grantless transmission, the grantless transmission comprising a hybrid automatic repeat request process;
receiving, from the second apparatus via a control channel, a first redundancy version of the hybrid automatic repeat request process;
sending a response to the grantless transmission, the response to the grantless transmission comprising an acknowledgement in a downlink control information, and wherein the downlink control information comprises one or more acknowledgement bits for multiple transport blocks and a grantless radio network temporary identifier; and
if the first apparatus does not send a positive acknowledgement of the grantless transmission, receiving, from the second apparatus and indicated via a control channel, a second redundancy version of a retransmission.

2. The first apparatus of claim 1, wherein the operations further comprise receiving multiple redundancy versions of multiple retransmissions.

3. An apparatus comprising a processor, a memory, and communication circuitry, the apparatus being connected to a network via its communication circuitry, the apparatus further comprising computer-executable instructions stored in the memory, when executed by the processor, cause the apparatus to perform operations comprising:
sending, via resources that are pre-configured for the apparatus, a grantless transmission, the grantless transmission comprising a hybrid automatic repeat request process;

indicating, through a control channel, a first redundancy version for the hybrid automatic repeat request process;

receiving a response to the grantless transmission, the response to the grantless transmission, the response to the grantless transmission comprising an acknowledgement in a downlink control information, and wherein the downlink control information comprises one or more acknowledgement bits for multiple transport blocks and a grantless radio network temporary identifier; and if a positive acknowledgement is not received:
selecting a second redundancy version for a first retransmission, the first retransmission comprising the hybrid automatic repeat request process;
sending, via the resources that are pre-configured for the apparatus, the first retransmission; and
indicating, through a control channel, the second redundancy version for the hybrid automatic repeat request process.

4. The apparatus of claim 3, wherein the operations further comprise:
selecting multiple redundancy versions for multiple retransmissions, the second retransmission comprising the hybrid automatic repeat request process;
indicating, through the control channel, the multiple redundancy versions; and
sending, via the resources that are pre-configured for the apparatus, the multiple retransmissions.

5. The apparatus of claim 3, wherein the operations further comprise:
transmitting a hybrid automatic repeat request process;
retransmitting the hybrid automatic repeat request process until a positive acknowledgment is received.

6. The apparatus of claim 5, wherein the apparatus is configured to retransmit the hybrid automatic repeat request process at a specific periodicity.

7. The apparatus of claim 5, wherein the apparatus is configured to retransmit the hybrid automatic repeat request process until a pre-determined limit for the number of retransmissions is met or a positive acknowledgment is received.

8. The apparatus of claim 7, wherein the pre-determined limit for the number of retransmissions is two or more.

9. The apparatus of claim 7, wherein the operations further comprise:
receiving a negative acknowledgement; and
retransmitting the hybrid automatic repeat request process a number of times after receiving the negative acknowledgement up to the pre-determined limit for the number of retransmissions.

10. The apparatus as recited in claim 5, wherein retransmission commences prior to expected reception of an acknowledge response.

11. The apparatus of claim 3, wherein the operations further comprise:
transmitting a first transport block comprising a first set of groups of code blocks;
receiving a multibit ACK-NACK response for the first transport block, the multibit ACK-NACK response for the first transport block comprising an ACK-NACK response for each group of code blocks in the first transport block; and
transmitting a second transport block comprising a second set of groups of code blocks, the second set of groups of code blocks comprising only those groups of code blocks of the first set of code blocks for which no ACK response was received in the multibit ACK-NACK response.

12. The apparatus of claim 11, wherein the number of bits in the multibit ACK-NACK response is equal to the number of groups of code blocks in the first set of groups of code blocks.

13. The apparatus of claim 11, wherein the number of bits in the multibit ACK-NACK response is equal to the number of code blocks in the first transport block.

14. The apparatus of claim 11, wherein the second transport block further comprises link control information comprising information about the groups of code blocks that are included in the second transport block.

15. The apparatus of claim 14, wherein the link control information is downlink control information.

16. The apparatus of claim 11, wherein the first set of groups of code blocks comprises a first group and a second group comprising a different numbers of code blocks.

* * * * *